US009500519B2

(12) United States Patent
Tang et al.

(10) Patent No.: US 9,500,519 B2
(45) Date of Patent: Nov. 22, 2016

(54) SUPERCONDUCTING SINGLE PHOTON DETECTOR

(71) Applicant: YALE UNIVERSITY, New Haven, CT (US)

(72) Inventors: Hongxing Tang, Orange, CT (US); Wolfram Pernice, New Haven, CT (US); Carsten Schuck, New Haven, CT (US)

(73) Assignee: Yale University, New Haven, CT (US)

( * ) Notice: Subject to any disclaimer, the term of this patent is extended or adjusted under 35 U.S.C. 154(b) by 252 days.

(21) Appl. No.: 14/095,516

(22) Filed: Dec. 3, 2013

(65) Prior Publication Data
US 2014/0299751 A1 Oct. 9, 2014

Related U.S. Application Data

(60) Provisional application No. 61/732,500, filed on Dec. 3, 2012.

(51) Int. Cl.
G01J 1/04 (2006.01)
G02B 6/02 (2006.01)
B82Y 20/00 (2011.01)
G02B 6/12 (2006.01)
G01J 1/44 (2006.01)

(52) U.S. Cl.
CPC .............. *G01J 1/0425* (2013.01); *B82Y 20/00* (2013.01); *G02B 6/0229* (2013.01); *G02B 6/12004* (2013.01); *G01J 2001/442* (2013.01); Y10S 977/954 (2013.01)

(58) Field of Classification Search
CPC ....................... G01J 1/0425; G02B 6/12; G02B 6/0229

USPC ........... 250/227.11, 214.1; 505/160; 977/954
See application file for complete search history.

(56) References Cited

U.S. PATENT DOCUMENTS

2013/0172195 A1* 7/2013 Bellei ................. G01J 1/42
505/160
2014/0094372 A1* 4/2014 Englund ............... G01J 1/42
505/181

OTHER PUBLICATIONS

Achilles et al., 2003, "Fiber-assisted detection with photon number resolution," Opt. Lett., 28(23): 2387-2389.
Akhlaghi, et al., 2012, "Reduced dark counts in optimized geometries for superconducting nanowire single photon detectors," Opt. Express, 20(21): 23610.
Annunziata et al., 2010, "Reset dynamics and latching in niobium superconducting nanowire single-photon detectors," J. Appl. Phys., 108: 084507.
Barnoski and Jensen, 1976, "Fiber waveguides: a novel technique for investigating attenuation characteristics," Appl. Opt., 15: 2112.
Barnoski et al., 1977, "Optical time domain reflectometer," Appl. Opt., 16: 2375.

(Continued)

*Primary Examiner* — Kevin Pyo
(74) *Attorney, Agent, or Firm* — Riverside Law LLP

(57) ABSTRACT

The present invention provides a device and system for high-efficiency and low-noise detection of single photons within the visible and infrared spectrum. In certain embodiments, the device of the invention can be integrated within photonic circuits to provide on-chip photon detection. The device comprises a traveling wave design comprising a waveguide layer and a superconducting nanowire atop of the waveguide.

26 Claims, 24 Drawing Sheets

(56) References Cited

OTHER PUBLICATIONS

Bartolf et al., 2010, "Current-assisted thermally activated flux liberation in ultrathin nanopatterned NbN superconducting meander structures," Phys. Rev. B., 81(2): 024502.
Bauters et al., 2011, "Planar waveguides with less than 0.1 dB/m propagation loss fabricated with wafer bonding," Opt. Exp., 19(24) 24090-24101.
Bonneau et al., 2012, "Fast path and polarisation manipulation of telecom wavelength single photons in lithium niobate waveguide devices," Phys. Rev. Lett., 108(5): 053601-1-053601-5.
Bonneau et al., 2012, "Quantum interference and manipulation ofentanglement in silicon wire waveguide quantum circuits," New J. Phys., 14: 045003.
Correa et al., 2012, "Single Photon Counting from Individual Nanocrystals in the Infrared," Nano Lett, 12(6): 2953-2958.
Dalla Mora et al., 2012, "Afterpulse-like noise limits dynamic range in time-gated applications of thin-junction silicon single-photon avalanche diode," Appl. Phys. Lett., 100: 241111.
Delacour et al., 2012, "Quantum and Thermal Phase Slips in Superconducting Niobium Nitride (NbN) Ultrathin Crystalline Nanowire: Application to Single Photon Detection," Nano Lett., 12(7): 3501-3506.
Diamanti et al., 2006, "1.5 m photon-counting optical time-domain reflectometry with a single-photon detector based on upconversion in a periodically poled lithium niobate waveguide," Opt. Lett., 31: 727.
Divochiy et al., 2008, "Superconducting nanowire photon-number-resolving detector at telecommunication wavelengths," Nat. Photon., 2(5): 302-306.
Dorenbos et al., 2008, "Low noise superconducting single photon detectors on silicon," Appl. Phys. Lett., 93(13): 131101.
Eisaman et al., 2011, "Invited Review Article: Single-photon sources and detectors," Rev. Sci. Instrum., 82(7): 071101.
Eraerds et al., 2010, "Photon Counting OTDR: Advantages and Limitations," Lightwave Technol., 28(6): 952-964.
Fong et al., 2010, "High Q optomechanical resonators in silicon nitride nanophotonic circuits," Appl. Phys. Lett., 97: 073112.
Fujiwara et al., 2010, "Afterpulse-like phenomenon of superconducting single photon detector in high speed quantum key distribution system," Opt. Express, 18: 22199.
Gaggero et al., 2010, "Nanowire superconducting single-photon detectors on GaAs for integrated quantum photonic applications," Appl. Phys. Lett., 97(15): 151108.
Ghamsari & Majedi, 2008, "Superconductive Traveling-Wave Photodetectors: Fundamentals and Optical Propagation," IEEE J. Quantum Elect., 44(7): 667-675.
Gisin et al., 2002, "Quantum cryptography," Rev. Mod. Phys., 74(1): 145-195.
Gol'tsman et al., 2001, "Picosecond superconducting single-photon optical detector," Appl. Phys. Lett., 79(6): 705-707.
Gol'tsman et al., 2007, "Middle-Infrared to Visible-Light Ultrafast Superconducting Single-Photon Detectors," IEEE Trans. Appl. Supercond., 17(2): 246-251.
Hadfield et al., 2005, "Single photon source characterization with a superconducting single photon detector," Opt. Express. 13(26): 10846-10853.
Hadfield, 2009, "Single-photon detectors for optical quantum information applications," Nat. Photon., 3(12) 696-705.
Healey, 1984, "Optical time domain reflectometry—a performance comparison of the analogue and photon counting techniques," Opt. Quantum Electron., 16: 267.
Henrich et al., 2012, "Geometry-induced reduction of the critical current in superconducting nanowires," Phys. Rev. B., 86(14): 144504.
Hortensius et al., 2012, "Critical-current reduction in thin superconducting wires due to current Crowding," Appl. Phys. Lett., 100(18): 182602.

Hu et al., 2009, "Efficiently Coupling Light to Superconducting Nanowire Single-Photon Detectors" IEEE Trans. Appl. Supercond., 19(3): 336-340.
Hu et al., 2012,"Photon-Counting Optical Time-Domain Reflectometry Using a Superconducting Nanowire Single-Photon Detector," Lightwave Technol., 30: 2583.
Knill et al., 2001, "A scheme for efficient quantum computation with linear optics," Nature, 409(6816): 46-52.
Korneev et al., 2005, "Quantum Efficiency and Noise Equivalent Power of Nanostructured, NbN, Single Photon Detectors in the Wavelength Range From Visible to Infrared," IEEE Trans. Appl. Supercond., 15(2): 571-574.
Korneev et al., 2007, "Single-photon detection system for quantum optics applications," IEEE J. Sel. Top. Quantum Electron., 13(4): 944-951.
Legré et al., 2007, "High resolution optical time domain reflectometer based on 1.55µm up-conversion photon-counting module," Opt. Express, 15: 8237.
Li et al., 2008, "Harnessing optical forces in integrated photonic circuits," Nature, 456(7221) 480-484.
Li et al., 2009, "Tunable bipolar optical interactions between guided lightwaves," Nat. Photon., 3(8): 464-468.
Marsili et al., 2011, "Single-Photon Detectors Based on Ultranarrow Superconducting Nanowires," Nano Lett., 11(5): 2048-2053.
Marsili et al., 2012, "Efficient Single Photon Detection from 500 nm to 5 µm Wavelength," Nano Lett., 12(9): 4799-4804.
Marsili et al., 2013, "Detecting single infrared photons with 93% system efficiency," Nat. Photon., 7: 210-214.
Matsuda et al., 2012, "A monolithically integrated polarization entangled photon pair source on a silicon chip," Sci. Rep., 2: 817.
Miki et al., 2009, "Superconducting NbTiN Nanowire Single Photon Detectors with Low Kinetic Inductance" Appl. Phys. Express, 2: 075002.
Minaeva et al., 2012, Frontiers in Optics 2012/Laser Science XXVII, OSA Technical Digest (Optical Society of America); paper FW3A.39.
Natarajan et al., 2010, "Operating quantum waveguide circuits with superconducting single-photon detectors," Appl. Phys. Lett., 96(21): 211101-1-211101-3.
Natarajan et al., 2012, "Superconducting nanowire single-photon detectors: Physics and applications," Supercond. Sci. Technol., 25(6): 063001-1-063001-16.
O'Brien, 2007, "Optical Quantum Computing," Science, 318(5856): 1567-1570.
Pernice et al. 2011, "High Speed Travelling Wave Single-Photon Detectors With Near-Unity Quantum Efficiency," ArXiv: 1108.5299v1.
Pernice et al., 2012, "High-speed and high-efficiency travelling wave single-photon detectors embedded in nanophotonic circuits," Nat. Commun., 3: 1325.
Peruzzo et al., 2010, "Quantum Walks of Correlated Photons," Science, 329(5998): 1500-1503.
Politi et al., 2009, "Integrated Quantum Photonics," IEEE J. Sel. Topics Quantum Electron., 15(6): 1673-1684.
Reithmaier et al, 2013, "On-chip time resolved detection of quantum dot emission using integrated superconducting single photon detectors," arxiv:1302.3807.
Schaeff et al., 2012, "Scalable fiber integrated source for higher dimensional path-entangled photonic quNits," Opt. Exp., 20(15) 16145-16153.
Schuck et al., 2013, "Waveguide integrated low noise NbTiN nanowire single-photon detectors with milli-Hz dark count rate," Sci. Rep. 3: 1893.
Schuck et al., 2013, "NbTiN superconducting nanowire detectors for visible and telecom wavelengths single photon counting on Si3N4 photonic circuits" Appl. Phys. Lett., 102(5): 051101.
Schuck et al. 2013, "Optical time domain reflectometry with low noise waveguide-coupled superconducting nanowire single-photon detectors," Appl Phys Lett, 102: 191104.
Schuck et al., 2013, "Matrix of Integrated Superconducting Single-Photon Detectors With High Timing Resolution" IEEE Trans on Applied Superconductivity, 23(3): 2201007.

(56) References Cited

OTHER PUBLICATIONS

Semenov et al., 2003, "Ultimate performance of a superconducting quantum detector," Eur Phys J AP., 21: 171.

Shadbolt et al., 2012, "Generating, manipulating and measuring entanglement and mixture with a reconfigurable photonic circuit," Nat. Photon., 6(1): 45-49.

Slysz et al., 2006, "Fiber-coupled single-photon detectors based on NbN superconducting nanostructures for practical quantum cryptography and photon-correlation studies," Appl. Phys. Lett., 88(26): 261113-1-261113-3.

Sprengers et al., 2011, "Waveguide superconducting single-photon detectors for integrated quantum photonic circuits," Appl. Phys. Lett., 99(18): 181110-1-181110-3.

Stellari et al., 2011, "Single Photon Detectors for Ultra Low Voltage Time Resolved Emission Measurements," IEEE J. Quantum Electron., 47(6): 841-848.

Taillaert et al., 2004, "Compact efficient broadband grating coupler for silicon-on-insulator waveguides," Opt. Lett., 29(23): 2749-2751.

Takesue et al., 2007, "Quantum key distribution over a 40-dB channel loss using superconducting single-photon detectors," Nat. Photon., 1(6): 343-348.

Tanner et al., 2010, "Enhanced telecom wavelength single-photon detection with NbTiN superconducting nanowires on oxidized silicon," Appl. Phys. Lett., 96: 221109.

Tanner et al., 2011, "High-resolution single-mode fiber-optic distributed Raman sensor for absolute temperature measurement using superconducting nanowire single-photon detectorsa)," Appl. Phys. Lett., 99: 201110.

Tanner et al., 2012, "A superconducting nanowire single photon detector on lithium niobate," Nanotechnology, 23: 505201.

Tarkhov et al., 2008, "Ultrafast reset time of superconducting single photon detectors," Appl. Phys. Lett., 92(24): 241112.

Verevkin et al., 2002, "Detection efficiency of large-active-area NbN single-photon superconducting detectors in the ultraviolet to near-infrared range," Appl. Phys. Lett., 80(25): 4687-4689.

Wang et al., 1996, "Superconducting properties and crystal structures of singlecrystal niobium nitride thin films deposited at ambient substrate temperature," J Appl Phys, 79: 7837.

Warburton et al., 2007, "Subcentimeter depth resolution using a single-photon counting time-of-flight laser ranging system at 1550 nm wavelength," Opt. Lett., 32: 2266.

Wegmuller et al., 2004, "Photon-counting Otdr for local birefringence and fault analysis in the metro environment," Lightwave Technol., 22: 390.

Yamashita et al., 2011, "All-optical fabrication of three-dimensional photonic crystals in photopolymers by multiplex-exposure holographic recording," Appl. Phys. Lett., 99(13): 131105.

Ziegler et al., 2013, "Superconducting niobium nitride thin films deposited by metal organic plasma-enhanced atomic layer deposition,"Supercond. Sci. Technol. 26: 025008.

\* cited by examiner

SUPERCONDUCTING SINGLE PHOTON DETECTOR

CROSS-REFERENCE TO RELATED APPLICATIONS

This application claims priority to U.S. Provisional Application Ser. No. 61/732,500, filed Dec. 3, 2012, the contents of which are incorporated by reference herein in their entirety

STATEMENT REGARDING FEDERALLY SPONSORED RESEARCH OR DEVELOPMENT

This invention was made with government support under 0846919 awarded by the National Science Foundation. The government has certain rights in the invention.

BACKGROUND OF THE INVENTION

Low dark count rate, high detection efficiency and accurate timing resolution are the three most desired features of a single-photon detector (Hadfield, 2009, Nat. Photon., 3(12): 696-705; Eisaman et al., 2011, Rev. Sci. Instrum., 82(7): 071101) These characteristics can be combined to one figure-of-merit for single-photon detectors, for example the noise equivalent power (NEP). Detectors with low noise performances are increasingly sought after for applications in both quantum and classical technology. In particular, linear optics quantum information processing crucially relies on the availability of low dark count rate single-photon detectors (Hadfield, 2009, Nat. Photon., 3(12): 696-705; Natarajan et al., 2010, Appl. Phys. Lett., 96(21): 211101; Gaggero et al., 2010, Appl. Phys. Lett., 97(15): 151108; Knill et al., 2001, Nature, 409(6816): 46-52). Most prominently, quantum key distribution implementations (Takesue et al., 2007, Nat. Photon., 1(6): 343-348; Gisin et al., 2002, Rev. Mod. Phys., 74(1): 145-195) are currently limited in rate and range by imperfect detector characteristics. Other applications which would greatly benefit from improved single-photon detection systems include the characterization of quantum emitters (Hadfield et al., 2005, Opt. Express. 13(26): 10846-10853; Correa et al., 2012, Nano Lett, 12(6): 2953-2958; Korneev et al., 2007, IEEE J. Sel. Top. Quantum Electron., 13(4): 944-951; Reithmaier et al, 2013, arxiv:1302.3807), optical time domain reflectometry (Eraerds et al., 2010, Lightwave Technol., 28(6): 952-964) as well as picosecond imaging circuit analysis (Stellari et al., 2011, IEEE J. Quantum Electron., 47(6): 841-848).

One of the most promising technologies to achieve low noise detector characteristics are nanowire superconducting single-photon detectors (SSPDs) (Gol'tsman et al., 2001, Appl. Phys. Lett., 79(6): 705-707). SSPDs are well suited for the integration with nanophotonic circuitry and offer superior performance compared to more traditional detector technologies. The detection mechanism relies on single-photon induced hotspot creation in a superconducting nanowire which is current biased close to its critical current (Natarajan et al., 2012, Supercond. Sci. Technol., 25(6): 063001). The detection process is characterized by a fast recovery time and high quantum efficiency both for visible and infrared wavelength photons (Hadfield, 2009, Nat. Photon., 3(12): 696-705; Gol'tsman et al., 2007, IEEE Trans. Appl. Supercond., 17(2): 246-251; Marsili et al., 2013, Nat. Photon., 7: 210-214). Until recently most state-of-the-art SSPDs however, were stand-alone units absorbing fiber-coupled photons using meander wires of superconducting thin film, where photons are absorbed under normal incidence. These types of devices limit their usefulness for large scale integrated photon counting applications.

Interfacing optical circuitry and high-efficiency single photon detectors with low loss is one of the key challenges of quantum photonic technologies (O'Brien, 2007, Science, 318: 1567; Natarajan et al., 2010, Appl. Phys. Lett., 96: 211101). Ideally, these components are integrated with non-classical light sources on a scalable monolithic platform (Politi et al., 2009, IEEE J. Sel. Top. Quantum Electron., 15: 1673). Integrated single photon detectors are key components for enabling functionality in nanophotonics and on-chip quantum optical technology. In particular, quantum information processing requires efficient interfacing of photonic circuitry with single photon detectors for scalable implementations (O'Brien, 2007, Science, 318(5856): 1567-1570). On the one hand, optical waveguide technology is one of the most promising routes to build complex quantum optical systems on-chip (Politi et al., 2009, IEEE J. Sel. Topics Quantum Electron., 15(6): 1673-1684; Schaeff et al., 2012, Opt. Exp., 20(15) 16145-16153). On the other hand, SSPDs are emerging as the photon-counting technology best suited for integrated quantum information technology (Hadfield, 2009, Nat. Photon., 3(12) 696-705). High timing accuracy, low noise and high sensitivity at telecom wavelengths show the potential to satisfy the demands of quantum technology (Natarajan et al., 2012, Supercond. Sci. Technol., 25(6): 063001-1-063001-16).

Most of today's SSPDs are, however, designed for stand-alone operation and typically consist of a single detector device coupled to a single mode optical fiber (Slysz et al., 2006, Appl. Phys. Lett., 88(26): 261113-1-261113-3; Korneev et al., 2007, IEEE J. Sel. Topics Quantum Electron., 13(4) 944-951). While the compatibility of quantum waveguide circuits and SSPDs has been successfully demonstrated (Natarajan et al., 2010, Appl. Phys. Lett., 96(21): 211101-1-211101-3), the coupling of photons from a chip to a separate detector limits the performance of this approach. More complex (Shadbolt et al., 2012, Nat. Photon., 6(1): 45-49) or larger scale (Peruzzo et al., 2010, Science, 329 (5998): 1500-1503) nanophotonic networks thus require a complementary detector architecture—ideally embedded directly into the waveguide circuitry.

Thus, there is a need in the art for improved devices and systems for single photon detection. The present invention satisfies this unmet need.

SUMMARY OF THE INVENTION

The present invention includes a device for the detection of single photons in the visible and infrared spectrum. The device includes a waveguide layer on a substrate and a superconducting nanowire positioned atop of the waveguide layer, wherein the superconducting nanowire comprises NbTiN. In one embodiment, the waveguide layer is made of a material selected from the group of silicon nitride, aluminum nitride, gallium nitride, sapphire, diamond, silicon, gallium phosphide, silicon oxide, and magnesium oxide. In another embodiment, the superconducting nanowire comprises two longitudinal segments running along the length of the waveguide and wherein the longitudinal segments are attached to each other at one end by a curved region, thereby forming a U-shaped nanowire. In another embodiment, the nanowire has a thickness of about 0.5 nm to about 100 nm. In another embodiment, the length of the nanowire is about 1 μm to about 200 μm. In another embodiment, the width of at least one of the longitudinal segments is about 30 nm to about 100 nm. In another embodiment, the substrate is a wafer comprising an insulator layer. In another embodiment, the thickness of the waveguide layer is about 10 nm to about 5000 nm. In another embodiment, the width of the waveguide layer is about 10 nm to about 5000 nm. In another embodiment, the device comprises at least one grating coupler for coupling of an optical fiber to the device. In another embodiment, the nanowire is connected to an electrode. In another embodiment, the device is integrated within a photonic chip.

The present invention also includes a device for the detection of single photons in the visible and infrared spectrum, where the device includes a silicon nitride waveguide layer on a substrate and a superconducting nanowire positioned atop of the waveguide layer, where the superconducting nanowire is composed of a material selected from the group of NbN, NbTiN, MgB2, High Tc cubrates including YBCO, and iron based superconductors.

The present invention also includes a device for the detection of single photons in the visible and infrared spectrum, the device comprising a buried waveguide layer in a substrate and a superconducting nanowire. In one embodiment, the substrate comprises a cavity exposing at least a portion of the buried waveguide layer, and wherein the superconducting nanowire is positioned atop the exposed portion of the buried waveguide layer. In another embodiment, the device further comprises a surface waveguide layer evanescently coupled to the buried waveguide layer, and wherein the superconducting nanowire is positioned atop the surface waveguide layer.

The present invention also includes a device for the detection of single photons in the visible and infrared spectrum, where the device comprises a substrate layer having a cavity. The device also includes a silicon nitride layer atop the substrate layer and cavity, a superconductor nanowire atop the silicon nitride layer, wherein the nanowire is positioned above the cavity, an insulator layer atop the superconducting nanowire, and a reflector layer atop the insulator layer. In one embodiment, the superconducting nanowire is composed of a material selected from the group of NbN, NbTiN, MgB2, High Tc cubrates including YBCO, and iron based superconductors. In one embodiment, the cavity comprises a geometry such that an optical fiber self-aligns to the superconducting nanowire when inserted into the cavity such that light from the optical fiber passes through the silicon nitride layer and to the superconducting nanowire.

The present invention also includes a system for the detection of single photons in the visible and infrared spectrum. The system includes at least one device for detecting a photon, the at least one device comprising a waveguide layer on a substrate and a superconducting nanowire positioned atop of the waveguide layer, at least one optical fiber optically coupled to a waveguide of the at least one device, and a tool for measuring the output of the superconducting nanowire of the at least one device. In one embodiment, the waveguide layer is made of a material selected from the group of silicon nitride, aluminum nitride, gallium nitride, sapphire, diamond, silicon, gallium phosphide, silicon oxide, and magnesium oxide. In another embodiment, the superconducting nanowire is made of a material selected from the group of NbN, NbTiN, MgB2, High Tc cubrates including YBCO, and iron based superconductors. In another embodiment, the superconducting nanowire comprises two longitudinal segments running along the length of the waveguide and wherein the longitudinal segments are attached to each other at one end by a curved region, thereby forming a U-shaped nanowire. In another embodiment, the nanowire is connected to an electrode. In another embodiment, the at least one device is integrated within a photonic chip. In another embodiment, the system comprises an external current source for delivering a bias current to the superconducting nanowire. In another embodiment, the system comprises an RF-probe for detecting the output of the nanowire. In another embodiment, the at least one device is housed within a cryostat.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 1A through FIG. 1C, depicts an exemplary device of the present invention. FIG. 1A: Silicon nitride photonic circuits comprising calibration couplers, 50:50 splitters, and low loss waveguides are fabricated on the same chip for operation in the telecom band (left) and visible (right) wavelength regime. The inset shows the detector region for the telecom band photonic circuit, where a U-shaped NbTiN nanowire is patterned on top of the SiN-waveguide. The nanowire ends are connected via NbTiN patches to a pair of electrode pads for electrical access. FIG. 1B: Infrared light spectrum obtained by sending light from a tunable laser source into the grating coupler input port (right on infrared device) and recording the power transmitted at the reference output port (left on infrared device). FIG. 1C: Visible light spectrum obtained by sending light from a tunable laser source into the grating coupler input port (left on visible device) and recording the power transmitted at the reference output port (right on visible device).

FIG. 2A through FIG. 2G, depicts an exemplary detector design and results of example experiments. FIG. 2A: Schematic of the traveling wave detector design. The SiN waveguide has a width of 600 nm in the visible light design and 1 μm in the infrared design. The NbTiN wire of 8 nm height and 75 nm wire width is patterned directly on top of the waveguide to sense the evanescent light field over a length of 40 μm. FIG. 2B: simulated electrical field distribution (normalized) of the optical mode (TE, E x) for 775 nm wavelength in the bare 600 nm wide SiN waveguide. FIG. 2C: simulated electrical field distribution (normalized) of the optical mode (TE, E x) for 775 nm wavelength in the NbTiN nanowire covered region of the 600 nm wide SiN waveguide. FIG. 2D: FDTD simulation of the absorption in the NbTiN nanowire covered waveguide region (600 nm width) for 775 nm. FIG. 2E: FDTD simulation of the absorption in the NbTiN nanowire covered waveguide region (1 μm) for 1550 nm. FIG. 2F: simulated electrical field distribution (normalized) of the optical mode (TE, E x) for 1550 nm wavelength in the bare 1 μm wide SiN waveguide. FIG. 2G: simulated electrical field distribution (normalized) of the optical mode (TE, E x) for 1550 nm wavelength in the NbTiN nanowire covered region of the 1 μm wide SiN waveguide. Light intensities are shown in linear color scale.

FIG. 4A through FIG. 4C, depicts a schematic of an exemplary device of the invention comprising a NbTiN-nanowire patterned directly on top of SiN waveguides, and the dark rate count of the exemplary devices. FIG. 4A: false-color scanning electron micrograph of a waveguide integrated SSPD. FIG. 4B: nanowire geometry with width $w_{nw}$ varied from 60 nm to 90 nm and length $l_{nw}$ varied between 25 μm and 40 μm. The nanowire is 8 nm thick. The gap between the wires is designed to be 120% of the respective nanowire width. The waveguides are 330 nm high at a width of $w_{wg}$=600 nm for visible light and 1 μm for telecom wavelength light. FIG. 4C: Dark count rate as a function of normalized bias current erase. To mimic realistic measurement conditions the fiber array was aligned to the on-chip waveguides ("mounted" detector) and cap the fiber input. The resulting dark count rate at minimal ambient light levels ("dark") is at a temperature of 1.6 K and at 5 K. The curve for dark rate when the ambient light level is increased to daylight conditions ("light") at 1.6 K is also shown. Displacing the fiber array from the chip reduces the stray light guided to the detector ("unmounted" detector) and the curve for dark rate at 1.6 K under low ambient light levels was observed.

FIG. 5A and FIG. 5B, depicts the on-chip detection efficiency as a function of normalized bias current for NbTiN nanowires of varying lengths and widths for visible (768 nm) photons (FIG. 5A) and for infrared (1542 nm) photons (FIG. 5B). Insets are zoom-in linear plots of detection efficiency in the bias current regime closed to $I_c$.

FIG. 7A through FIG. 7C, depicts the results of example experiments. FIG. 7A: output pulse (normalized) of an NbTiN nanowire SSPD: single shot trace (blue), averaged trace (red) and bi-exponential fit (green) from which a decay time of 1.2 ns is extracted. FIG. 7B: asymmetric S-shape of the rising edge of the (averaged) output voltage pulse (0.61 mV before amplification) and its derivative (green, ΔVp/Δt×100, see inset for logarithmic scale), illustrating the origin of the enhanced contribution to higher pulse jitter values at the trailing part of the pulse distribution. FIG. 7C: histogram of the SSPD output pulse jitter. A Gaussian fit (red) to the data reveals a FWHM jitter value of 48.4 (+/−1.0) ps. Weighting the Gaussian fit with the derivative of the rising slope of the output pulse (see FIG. 7B) and accounting for a noise background leads to a slightly increased jitter value of 51.5 ps (green curve).

FIG. 8A through FIG. 8D, depicts schematics of a matrix or grid of single photon detectors. FIG. 8A: SSPD grid of NbN-nanowire detectors. An individual waveguide/detector element of the matrix is shown in top and side view as an inset. It comprises three main components: grating couplers (FIG. 8B) to guide light from an optical fiber into a Si-waveguide as also shown in the side-view, a waveguide splitter (FIG. 8C) to direct 50% of the light to the SSPD and the other half toward a reference output for detector calibration purposes, and the NbN-nanowire SSPD (FIG. 8D), which absorbs incident photons traveling in a Si-waveguide (FIG. 8D). The electrical output pulse is read out by engaging an RF probe to the electrode pads (FIG. 8D).

FIG. 10A through FIG. 10D, is a set of SEM and AFM images depicting the surface morphology of a NbN-nanowire detector on top of a Si-waveguide. (FIG. 10A) a resist-covered NbN-nanowire of 85 nm width is visible on top of a 750-nm-wide silicon waveguide; (FIG. 10B) zoom-in of the detector region where photons are incident on the U-shaped nanowire; (FIG. 10C) AFM scan of the deposited NbN thin-film showing RMS roughness of 1.6 Å; and (FIG. 10D) AFM image of a section of the nanowire detector protected by resist (HSQ).

FIG. 13A and FIG. 13B, depicts the results of experiments. FIG. 13A depicts the setup for the ballistic photon transport measurement with single photon detectors. FIG. 13B depicts the transmission spectrum of undercoupled and overcoupled ring resonators.

FIG. 14, comprising FIG. 14A: time-domain trace of the transmission in the through port for the overcoupled case; and FIG. 14B: time-domain trace of the photons detected by the SSPD in the drop port for the overcoupled case. An exponential fit to the data yields a decay time of 19 ps. FIG. 14C: time-domain trace of the transmission in the through port for the undercoupled case; and FIG. 14D: time-domain trace of the photons detected by the SSPD in the drop port for the undercoupled case. An exponential fit to the data yields a decay time of 38 ps; Bottom: ring resonator in the undercoupled case (200 nm gap). The ring circumference is 5.8 mm, which corresponds to a photon round trip time of 73 ps.

FIG. 16A: False-color SEM image of an integrated nanowire SSPD on a SiN photonic waveguide. The 40 µm long U-shaped NbTiN nanowire is patterned directly on top of a 330 nm×1 µm SiN waveguide (inset) and absorbs photons in the waveguide along their direction of propagation. FIG. 16B: System noise equivalent power ($NEP_{sys}$) as a function of bias current ($I_{bias}$) in units of critical current ($I_{crit}$), taking into account the fiber-to-waveguide coupling efficiency for daylight conditions (top trace) and minimal ambient light conditions (bottom trace). The dot represents the conditions during the ν-OTDR measurements. FIG. 16C: Output of the pulse generator in burst mode (top graph, bottom trace) applied to the DFB laser diode (50 ns width, 150 ns period). Optical output pulses as detected with a fast photodiode (top graph, top trace). Backscattered signal from the FUT at around 111 km as detected with the SSPD after 10 min data acquisition (FIG. 16C, bottom graph) showing a spatial resolution of approximately 10 m.

DETAILED DESCRIPTION

Definitions

Figure 1:
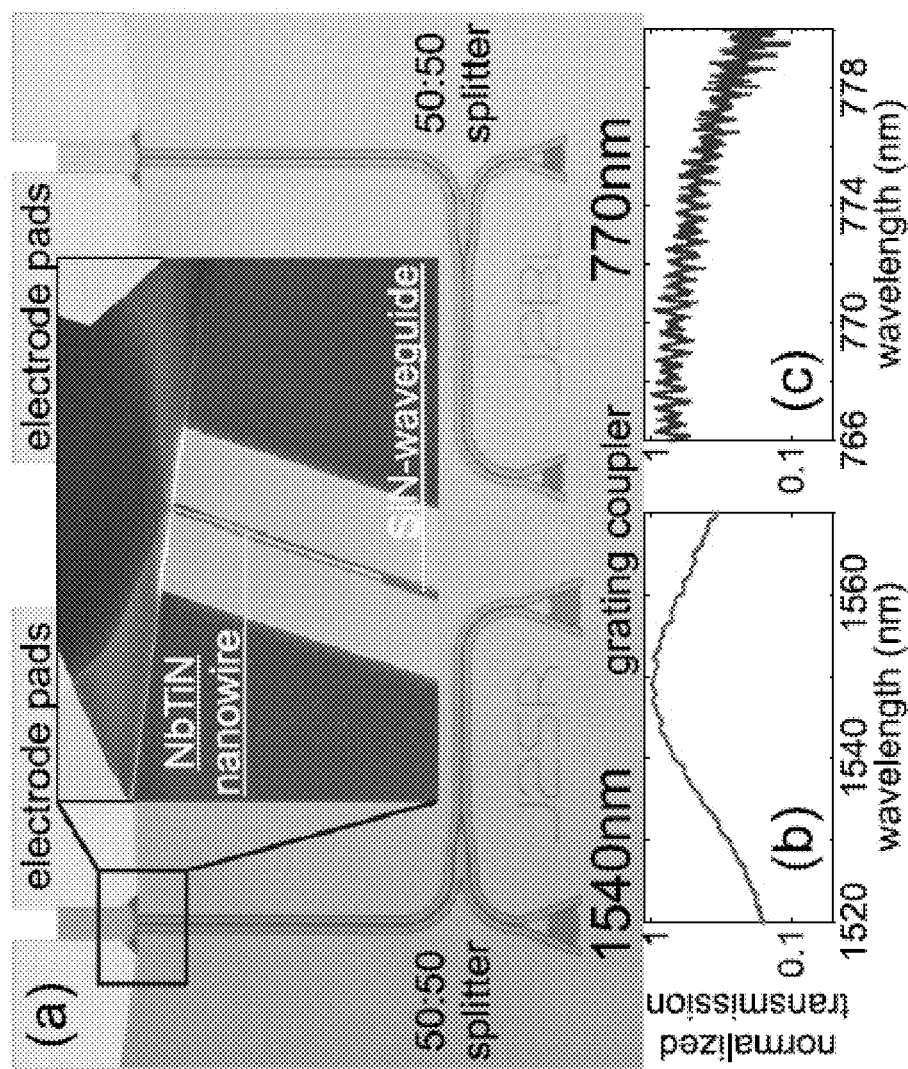
FIG. 1, comprising
Figure 2:
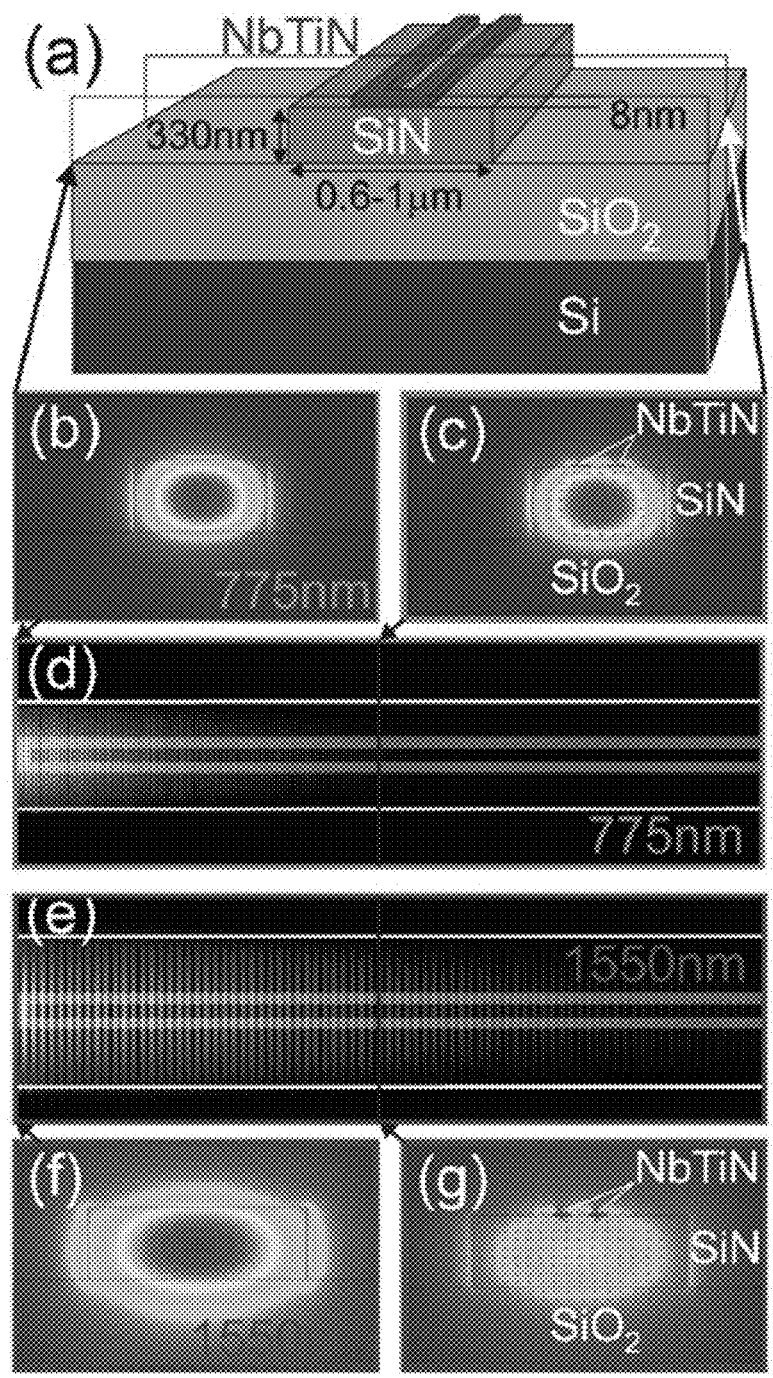
FIG. 2, comprising

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

The present invention relates to devices, systems, and methods for single photon detection. For example, the present invention provides highly efficient and low-noise detection of single photons for a wide range of applications, including, but not limited to optical time domain reflectometry, quantum information processing, imaging circuit analysis, and medical diagnostics.

In one embodiment, the present invention includes a device for single photon detection. The device, referred to herein as a superconducting single-photon detector (SSPD) allows for single photon detection with high efficiency, high timing resolution, and low noise.

The device allows for the detection of photons of any particular wavelength, including, but not limited to visible or infrared photons. For example, in certain embodiments, the device operates to detect a particular wavelength or a range of wavelengths. In one embodiment, the wavelength of photons detected by the device of the present invention is about 300 nm to about 1 mm. In one embodiment, the device detects photons of telecom wavelengths.

In certain embodiments, the device is integrated directly on-chip, thereby providing on-chip detection of single photons directly on photonic circuits. In one embodiment, the device is a stand-alone device that may be temporarily coupled with a circuit or fiber.

In certain embodiments, the device comprises a traveling wave design, where the device comprises a superconducting nanowire atop of a waveguide (for example, as shown in FIG. 2A, FIG. 4A, FIG. 4B, and FIG. 18). The waveguide component guides or transmits the light to be detected while the nanowire component serves to detect the guided light. In certain embodiments, the wave travels substantially parallel to the detecting nanowire. The detection mechanism is based on the superconducting to normal state transition of the nanowire, induced by the absorption of a single photon creating a localized hot-spot (Gol'tsman et al., 2001, Appl. Phys. Lett., 79: 705). This state transition produces a change in a detectable output of the nanowire, for example current, which can then be detected using additional components.

In one embodiment, the device comprises an optical waveguide for transmission of the photons to be detected. In certain embodiments, the waveguide receives light from a coupled light source and transmits the light through the waveguide with low-loss. For example, in certain instances, waveguides guide a wave through total internal reflection.

Figure 18:
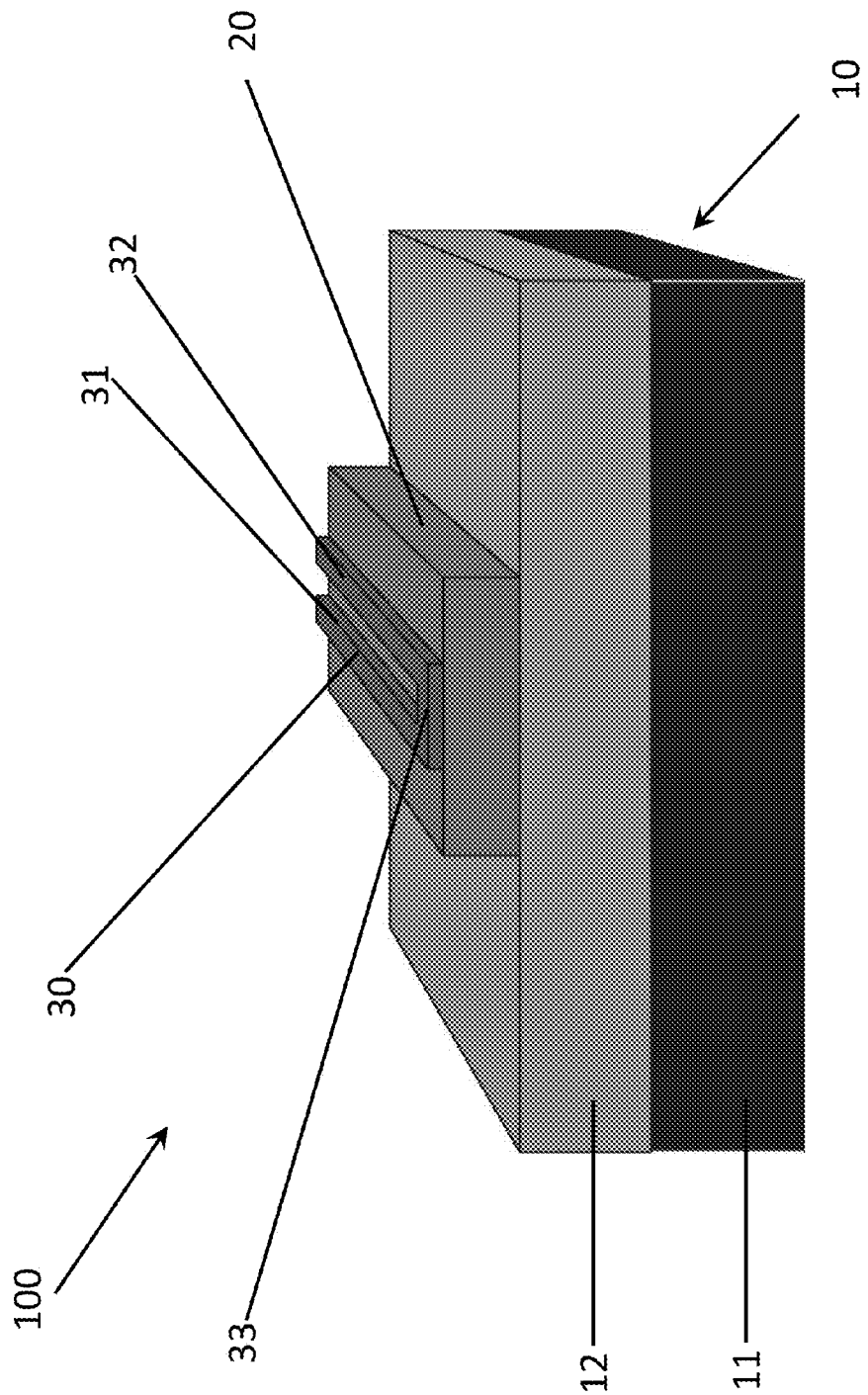
FIG. 18 is a perspective view of an exemplary device of the present invention.

FIG. 18 depicts an exemplary detector device 100 of the present invention, comprising a waveguide layer 20 positioned on a substrate 10 and a superconducting nanowire 30 positioned on the waveguide layer 20.

In one embodiment, substrate 10 comprises a silicon layer 11 and an insulator layer 12. Insulator layer 12 may be any suitable insulator, including, but not limited to silicon dioxide ($SiO_2$) and sapphire.

Waveguide layer 20 may be made from any suitable material known in the art, including, but not limited to silicon nitride, aluminum nitride, gallium nitride, sapphire, diamond, silicon, gallium phosphide, silicon oxide, magnesium oxide, or any other dielectric material. Waveguide layer 20 has a thickness (e.g., height) and width suitable for transmission of light at the desired wavelength. For example, in certain embodiments, the width of waveguide layer 20 is dependent upon the wavelength of the photons desired to be detected. In one embodiment, the thickness of waveguide layer 20 is about 10 nm to about 5000 nm. In one embodiment, the width of waveguide layer 20 is about 10 nm to about 5000 nm. In one embodiment, for detection of visible light, waveguide layer 20 has a width of about 600 nm. In one embodiment, for the detection of infrared light, the waveguide layer has a width of about 1000 nm.

In one embodiment, device 100 comprises superconducting nanowire 30 positioned on top of waveguide layer 20. The positioning of nanowire 30 on top of waveguide layer 20 allows for very large interaction lengths of the guided light field within waveguide layer 20 with nanowire 30 on the waveguide surface. For a sufficiently long nanowire, the incoming photons are fully absorbed. This is in contrast to traditional fiber-coupled meander-type SSPDs which absorb photons in a few nanometer thin film under normal incidence. Thus, the present invention provides for significantly improved photon detection efficiency for both visible and infrared photons.

In one embodiment, nanowire 30 of the device is U-shaped, having at least a first longitudinal segment 31 and a second longitudinal segment 32, where segments 31 and 32 are attached at one end by a connecting region 33. In one embodiment, nanowire 30 is positioned on waveguide layer 20 such that the first contact of the guided wave with nanowire 30 is at connecting region 33.

In one embodiment, connecting region 33 is a curved connecting region, and thus nanowire 30 is devoid of any sharp-angled bends. When current flows around a bend it will crowd at the inner edge, leaving the outer side of the bend with less current density (Akhlaghi, et al., 2012, Opt. Express, 20(21): 23610; Hortensius et al., 2012, Appl. Phys. Lett., 100(18): 182602; Henrich et al., 2012, Phys. Rev. B., 86(14): 144504). In sharp-angled bend-geometries, the current density is particularly low at outside corners. In contrast, in certain instances the U-shaped wire geometry in the present device minimizes regions of the nanowire which contribute to photon absorption but do not carry enough current to drive the corresponding wire section into a normal-resistive state and trigger an output pulse.

Nanowire 30 may be made of any suitable superconducting material known in the art, including, but not limited to NbN, NbTiN, MgB2, High Tc cubrates including YBCO, and iron based superconductors. In one embodiment, nanowire 30 has a thickness of about 0.5 nm to about 100 nm. In one embodiment, nanowire 30 has a thickness of about 8 nm. As described herein, the length of nanowire 30, and the width of segments 31 and 32 of nanowire 30 influences the overall performance of device 100. For example, in certain instances, the absorption rate is dependent upon the length. Further, in certain instances, the detection efficiency is dependent upon the width.

In one embodiment, the length of nanowire 30 is about 0.01 μm to about 1000 μm. In one embodiment, the length of nanowire 30 is about 1 μm to about 200 μm.

In one embodiment, the width of longitudinal segments 31 and 32 is about 10 nm to about 500 nm. In one embodiment, the width of longitudinal segments 31 and 32 is about 30 nm to about 100 nm.

As described elsewhere herein, the precise dimensions of nanowire 30 is dependent upon the eventual use or application of device 100, the wavelength of the photons being detected, material of waveguide layer 20, and material of nanowire 30. For example, in certain embodiments, the device may be optimized to provide higher efficiency, lower noise, lower dark rate count, and the like.

In certain instances, the functional characteristics of the device are fundamentally determined by substrate and superconducting material properties. For example, high quantum efficiency is easier achieved in low energy gap superconductors (Marsili et al., 2013, Nat. Photon., 7: 210-214). In one embodiment, the device of the invention comprises a NbTiN nanowire atop of a silicon nitride waveguide. In certain instances, NbTiN nanowires provide low noise performance. NbTiN thin films or wires are attractive because they can be deposited with high homogeneity and are more versatile in growth conditions as compared to other superconducting materials (Dorenbos et al., 2008, Appl. Phys. Lett., 93: 131101; Tanner et al., 2010, Appl. Phys. Lett., 96: 221109; Miki et al., 2009, Appl. Phys. Express, 2: 075002). This also allows for achieving lower dark count rates with NbTiN SSPDs as compared to NbN nanowire detectors at similar detection efficiency (Dorenbos et al., 2008, Appl. Phys. Lett., 93: 131101; Tanner et al., 2010, Appl. Phys. Lett., 96: 221109; Akhlaghi et al., 2012, Opt. Express, 20: 23610). Furthermore, NbTiN may be a preferable material choice over NbN for achieving higher detector speed (Miki et al., 2009, Appl. Phys. Express, 2: 075002; Annunziata et al., 2010, J. Appl. Phys., 108: 084507). For example, it is shown herein that ultra-low dark count rates can be achieved with amorphous NbTiN-on-SiN nanowire single-photon detectors. As described elsewhere herein, the NbTiN-on-SiN devices demonstrate improved functionality of several orders of magnitude over SSPDs made from NbN (Table 2) which typically only achieve low dark count rates ($R_{dc}$) when the bias current is set far below the critical current (Natarajan et al., 2010, Appl. Phys. Lett., 96(21): 211101; Pernice et al., 2012, Nat. Comm., 3: 1325; Korneev et al., 2005, IEEE Trans. Appl. Supercond., 15(2): 571-574; Yamashita et al., 2011, Appl. Phys. Lett., 99(13): 131105). That is, in certain instances NbTiN-nanowires provide low noise single-photon detection over an extended bias current range which allows for operating the SSPDs in a regime where wire defects or constrictions have less influence on the detector performance. Thus, regardless of the bias current used, photon counting events can be clearly discriminated from electrical noise without the need for cryogenic amplifier stages due to the intrinsically high signal-to-noise characteristics of the SSPD output pulses. Therefore, in certain instances, detector devices comprising NbTiN nanowires display superior functionality as compared to devices comprising NbN nanowires.

As described elsewhere herein, the use of silicon nitride waveguides allows for the realization of devices for the detection for both visible and infrared light. Further, silicon nitride waveguides allow for integration of the detector devices of the invention directly on-chip. By implementing a traveling wave detector geometry in this material platform, efficient single photon detection is achieved for both wavelength regimes. The described detectors are an ideal match for integrated quantum optics as they provide crucial functionality on a wideband transparent waveguide material.

In one embodiment, device 100 comprises one or more couplers for coupling an incoming light source, for example an optical fiber or fiber array, to the device. In one embodiment, device 100 comprises one or more grating couplers. For example, in certain embodiments, the waveguide layer of the device comprises one or more grating couplers. The grating couplers may be patterned onto or into any surface of waveguide layer 20 (see FIG. 8A). Contact of a fiber or fiber array to the grating coupler provides for low-loss optical coupling of the source to the detector device. In certain embodiments, the fiber or fiber array is aligned to the coupler using nanopositioners. The photon flux inside waveguide layer 20 is controlled precisely by carefully calibrating the grating coupler transmission and by using calibrated attenuators. In certain embodiments, adjustment of the period and filling factor of the grating allows for altering the operating wavelength of waveguide 20 and detector device 100. The present invention is not limited to any particular type of coupler, but rather encompasses any type or method of optical coupling known in the art.

Figure 19:
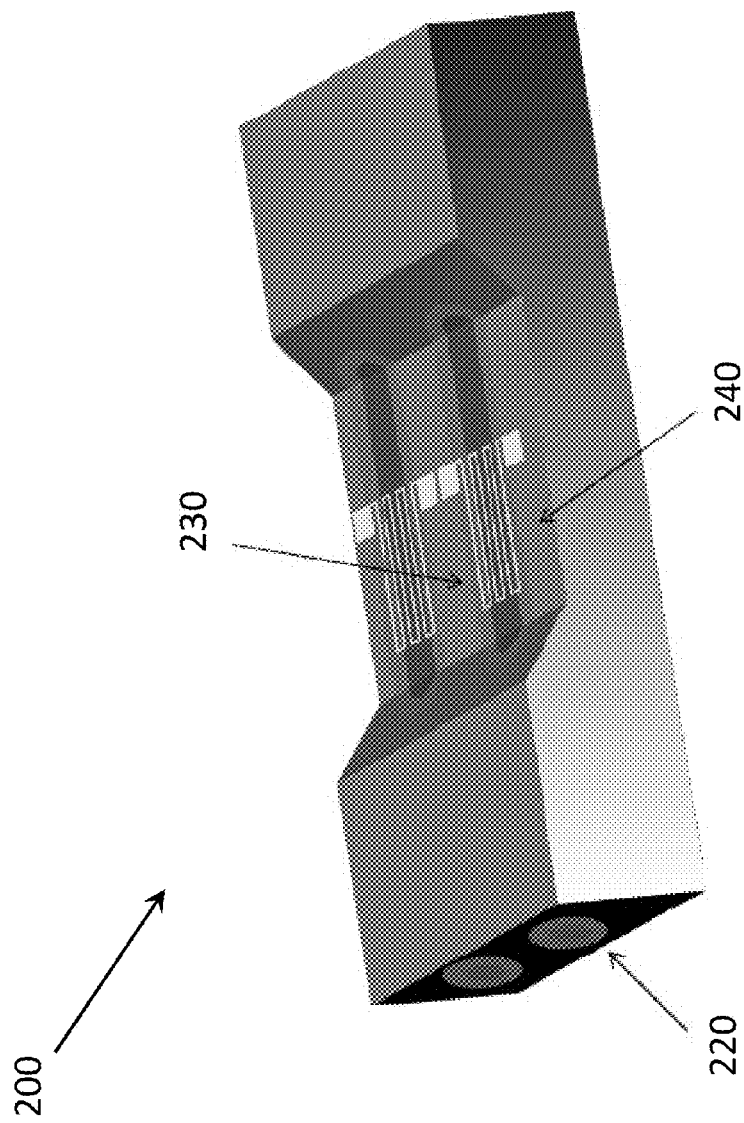
FIG. 19 depicts an exemplary device of the present invention comprising a buried waveguide and patterned superconducting nanowires within an etched pit or cavity.

In one embodiment, the device comprises a buried waveguide which can be mode matched to a fiber in order to effectively couple the fiber to the device. For example, FIG. 19 depicts an exemplary device 200 comprising a glass waveguide 220 which is mode matched to a fiber. In one embodiment, device 200 comprises a pit or cavity 240 in which the superconducting nanowire 230 is patterned onto waveguide 220. Glass waveguide 220 can be manufactured, for example, by foundry services. The design features a scalable approach to make large array of single photon detectors. Since the insertion loss from fiber to the detector is minimized, the system efficiency is dramatically improved in the design.

Figure 20:
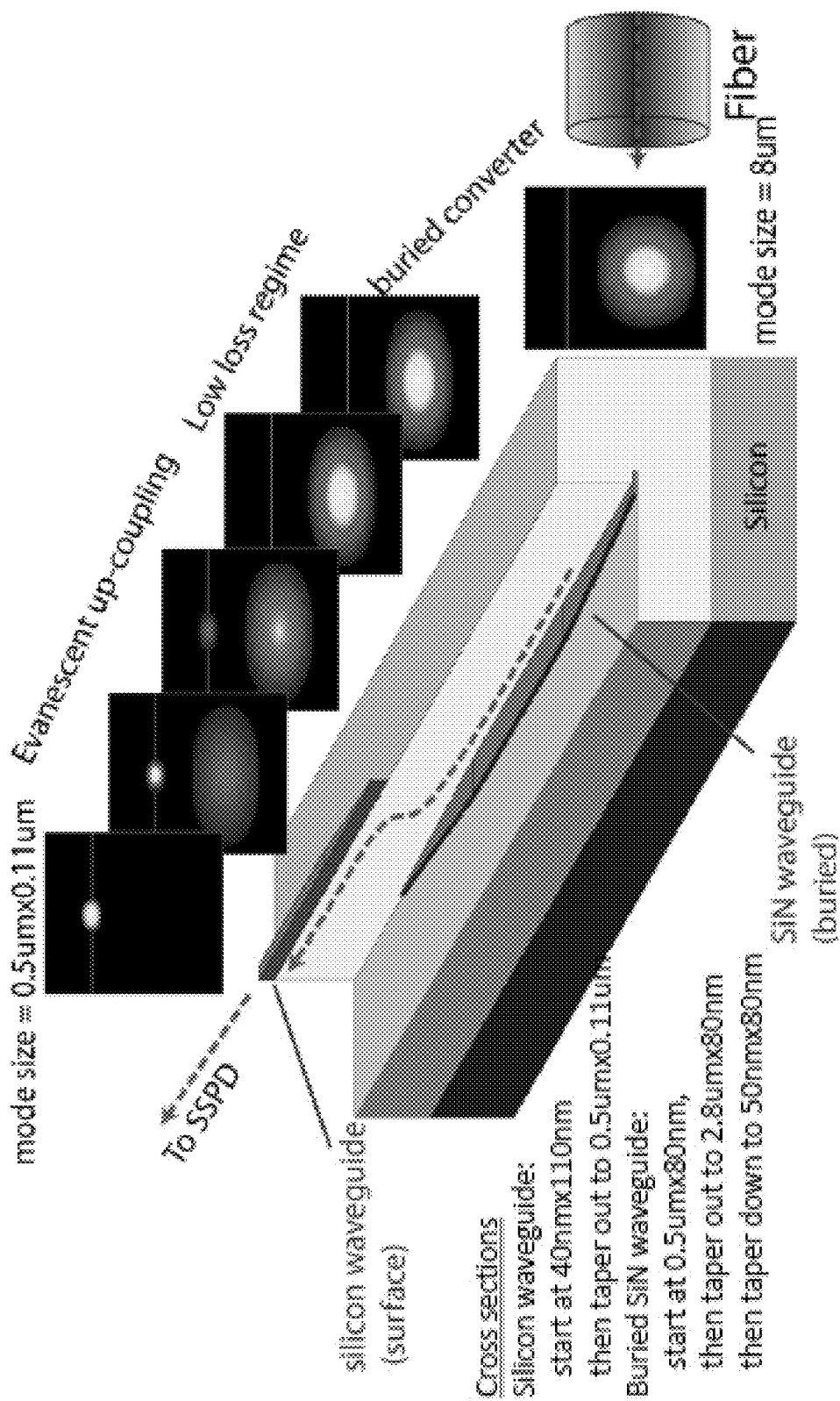
FIG. 20 depicts an exemplary device of the present invention comprising a buried waveguide and a surface waveguide.

FIG. 20 depicts an exemplary device comprising both a buried waveguide and a surface waveguide. In one embodiment, the buried waveguide is an ultra-thin, high aspect ratio, large mode waveguide, made of, for example, silicon nitride. In one embodiment, the surface waveguide interfaces with superconducting nanowires for the detection of the single photons. The buried waveguide and surface waveguide are designed to be evanescently coupled with little to no loss. For example, the aspect ratio of the buried waveguide is adjusted to produce a circular mode for optimal coupling to a fiber. The circular mode of the buried waveguide is then converted into a wider, low-loss oval mode, which evanescently couples with the surface waveguide. In certain embodiments, one or both of the buried waveguide and surface waveguide are tapered to adjust the mode of the waveguides. For example, in one embodiment, the buried waveguide has dimensions of about 0.5 µm×80 nm at the coupling to the fiber, widens out to about 2.8 µm×80 nm and then tapers down to about 50 nm×80 nm. In one embodiment, the surface waveguide has dimensions of about 40 nm×110 nm where coupled to the buried waveguide, and tapers out to about 500 nm×110 nm. It should be understood to those skilled in the art that the waveguide may be tapered in any appropriate manner. That is, the tapering described above are just examples to illustrate how optical mode can be converted in between different sections. Other combination tapering dimensions are also possible.

In one embodiment, the nanowire of the device is operably connected to an electrode. In one embodiment, the nanowire is connected to the electrode via triangular strips of conductive material (e.g. NbTiN). In certain embodiments, the electrode is used to transmit the output from the nanowire, supply bias current to the nanowire, or both. In one embodiment, the electrode is an electrode pad. The electrode may be made of any suitable metallic material, including, but not limited to platinum, palladium, silver, copper, and gold. In certain embodiments, readout of the SSPDs is realized by approaching a RF-probe to the electrode. In certain embodiments, the electrode is operably connected to one or more amplifiers, for example a low-noise high-bandwidth amplifier. The output may then be measured, recorded, and analyzed using a single photon counting system, oscilloscope, or the like. It is demonstrated herein, that the output of the device has a high signal to noise ratio and thereby allows for clear distinguishing of photon detection events from noise.

In one embodiment, the device of the present invention is made through the patterning of a substrate and the depositing of the superconducting nanowire material. For example, in one embodiment, the device is realized by patterning a waveguide layer (e.g. silicon nitride) on silicon wafers. In one embodiment, the silicon wafer comprises a buried oxide layer (BOX), which acts as a cladding. In certain embodiments, a film of superconducting material is deposited on top of the waveguide layer. Deposition of the film may be conducted using any suitable methodology known in the art, including, but not limited to dc magnetron sputtering, physical vapor deposition, metal-organic chemical vapor deposition, atomic layer deposition, and molecular beam epitaxy. The features of the nanowire and waveguide layer can then be patterned using standard techniques known in the art, including, but not limited to electron beam lithography, reactive ion etching (RIE), plasma etching, and the like. For example, in one embodiment, electrode pads and markers for alignment of the subsequent detector and waveguide patterns are defined in a first electron beam lithography step using polymethyl methacrylate (PMMA) positive resist. The contact pads and alignment markers are realized using electron-beam evaporation of a Cr adhesion-layer and an Au-film followed by lift-off in acetone. In certain embodiments, the nanowire features are defined using high resolution electron beam lithography on hydrogen silsesquioxane (HSQ) resist. The features can then be subsequently transferred into the superconducting material layer in a timed RIE step using CF4 chemistry. In one embodiment, the waveguide layer is then patterned in an electron beam lithography step employing ZEP520A positive resist. In another embodiment, the waveguide layer is patterned using a HSQ resist in 6% concentration. In one embodiment, timed RIE is conducted through the waveguide layer to the interface with the buried oxide layer using CHF3 chemistry. In one embodiment, inductively coupled plasma etching in a chlorine atmosphere is used to etch the waveguide layer.

In one embodiment, the present invention includes a chip comprising one or more integrated SSPD device of the present invention. As described herein, the device of the present invention allows for its integration directly on-chip, thereby allowing for on-chip single photon detection. In certain embodiments, the chip comprises a photonic circuit, where the SSPD device of the invention is used for optical information processing of the photonic circuit. The chip of the present invention can thus be used in a wide range of quantum and nanophotonic applications, where the need for integrated information processing of circuitry is needed.

In one embodiment, the chip comprises a plurality of integrated SSPD devices. For example, in certain embodiments, the chip comprises an array or a matrix of devices, wherein at least one of the devices is optically coupled to a fiber or other light source. In certain embodiments, one or more of the plurality of devices are designed, as described elsewhere herein, to have different operating wavelengths. That is, one or more of the devices may be tuned to detect photons of a particular wavelength. This allows the plurality of devices on the chip to detect photons of a wide range of wavelengths. For example, in one embodiment, each of the plurality of devices is tuned to detect a particular wavelength.

Figure 21:
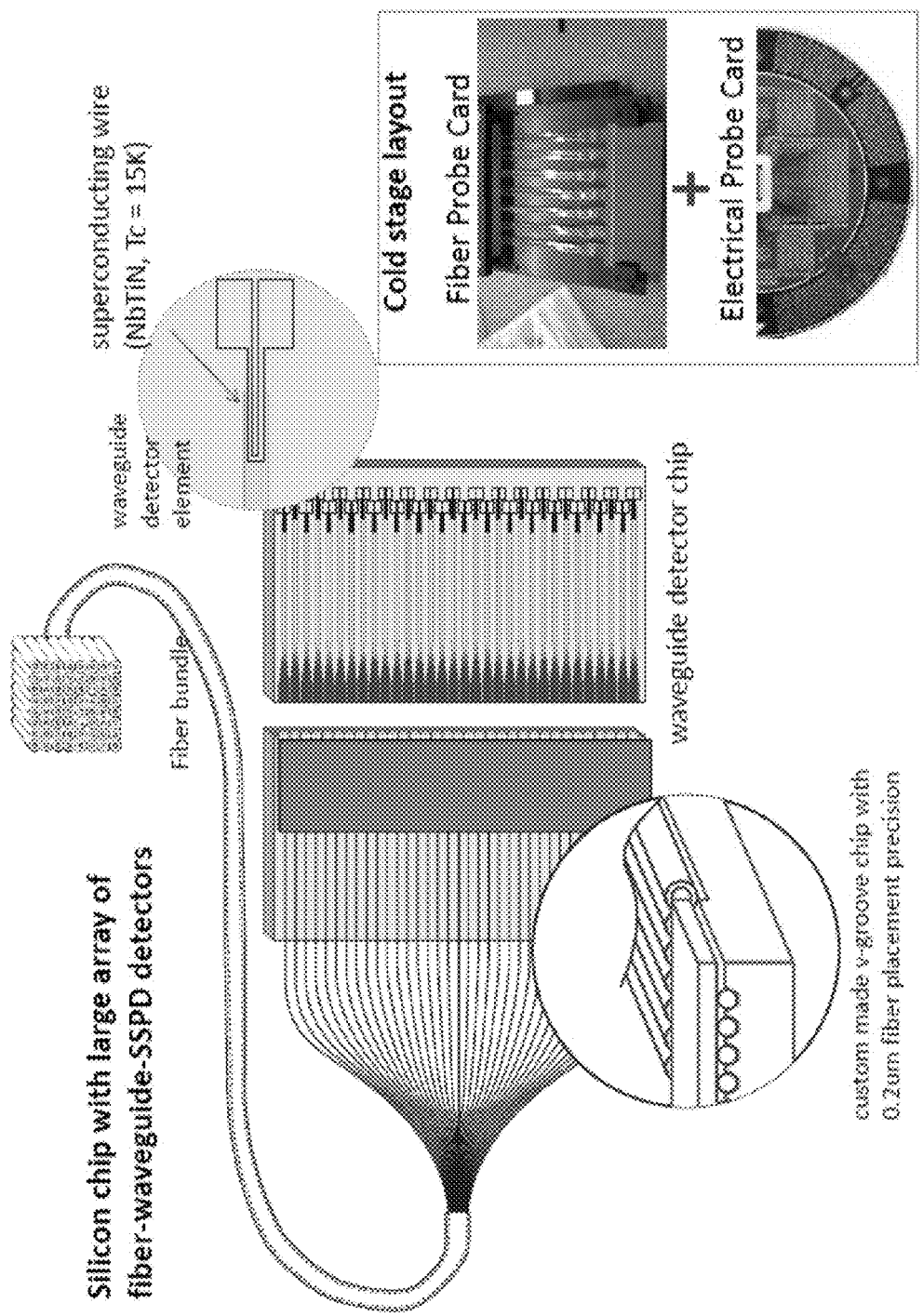
FIG. 21 depicts an exemplary chip of the present invention comprising an array of SSPD devices.

For example, FIG. 21 depicts an exemplary chip comprising an array of SSPD detectors of the present invention. In one embodiment, the chip comprises a plurality of waveguides, each comprising a superconducting wire on the surface of the waveguide. The chip may be coupled to a fiber array or fiber bundle, allowing a plurality of fibers to be individually coupled to the plurality of waveguides of the chip. In one embodiment, the chip comprises v-grooves to allow for precise fiber placement to provide for low-loss coupling of the fiber to the waveguide. In one embodiment, the chip comprises a sample holder at low temperature (cold stage), which comprises a bundled fiber array for providing optical access to the chip and an electrical probe array to provide electrical signal extraction from the detectors (FIG. 21 right).

Figure 22:
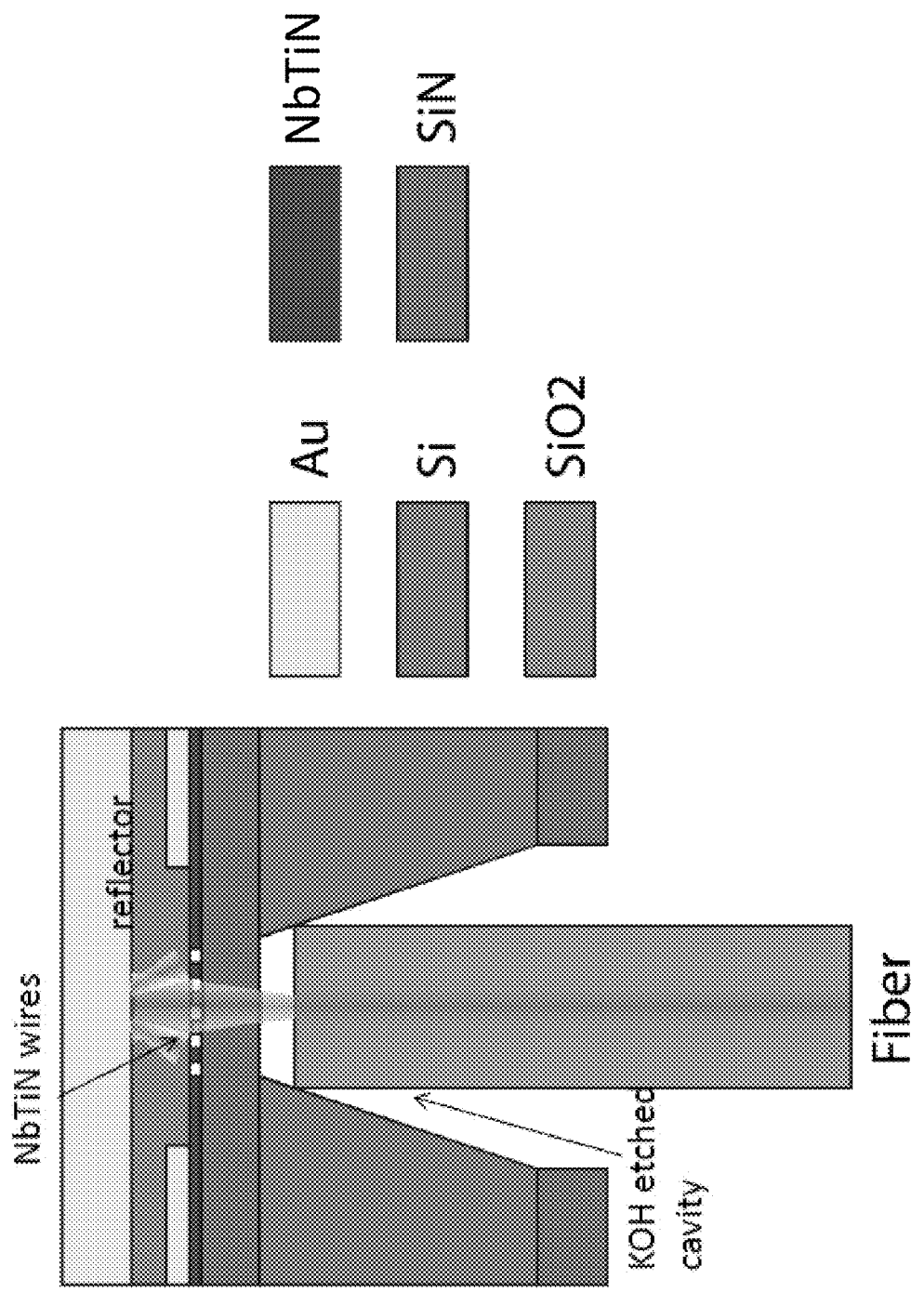
FIG. 22 depicts an exemplary device of the present invention comprising a substrate having a cavity for engaging a fiber, thereby providing self-aligned fibers to the detector.

FIG. 22 depicts an alternative single photon detector of the present invention, where a fiber is self-aligned to the detector device. As shown in FIG. 22, the device comprises a substrate comprising a cavity, in which a fiber may engage the device. In certain embodiments, the device comprises a substrate layer comprising a cavity, a silicon nitride layer atop the substrate layer, and one or more superconducting nanowires atop the silicon nitride layer. In one embodiment, the light from the fiber travels perpendicularly through the substrate layers. The cavity allows for the fiber to be specifically aligned to the one or more superconducting nanowires patterned above the cavity. In one embodiment, the nanowires are fabricated on a transparent micromachined membrane. Light from the aligned fiber passes through the membrane before being detected by the nanowire. In one embodiment, the device comprises an insulator layer (e.g. $SiO_2$) above the one or more nanowires. In one embodiment, the device comprises a reflector layer positioned above the nanowires, which in certain instances is used to enhance the absorption rate of the administered photons. This design allows self-alignment between the fiber and detectors, without the help of translation stages. It also permits scalable fabrication of large number of detector arrays. Fiber bundles can be used to interface with an array of detectors. Since no alignment is required, in certain instances these devices are more robust to manufacture and easier to operate.

The present invention includes a method for detecting single photons. The method of the invention allows for high efficiency, low-noise, and high temporal resolution detection of single photons. Thus, the method may be applied to a wide variety of applications including, but not limited to, optical time domain reflectometry, quantum information processing, imaging circuit analysis, and medical diagnostics.

In one embodiment, the method comprises detecting single photons during optical time domain reflectometry (OTDR) in order to evaluate the condition of an optical fiber (Schuck et al. 2013, Appl Phys Lett, 102: 191104). As described herein, the present method provides significant improvement over prior OTDR methods, as the presently described SSPD provides superior functionality over prior photon detection methods and systems. In one embodiment, the method comprises optically coupling an optical fiber to the detection device of the present invention and applying one or more laser pulses to the optical fiber. In one embodiment, the backscattered photons are collected from the fiber and guided to the SSPD device, which detects the presence and timing of the photons. This method may be used to evaluate defects or damage in long distance optical fibers or alternatively employed in free space for laser ranging.

In one embodiment, the method comprises detecting single photons for medical diagnostics. For example, in certain embodiments, the method comprises detecting single photons during imaging a tissue or sample of interest. In certain embodiments, the tissue or sample is in an in vitro, ex vivo, or in vivo environment. The high efficiency and low-noise characteristics of the SSPD allow for the detection of small amounts of light emitted from the sample, thereby providing exquisite imaging sensitivity. For example, in certain embodiments, the method comprises collecting transmitted or reflected light from a tissue or sample and routing the light to a SSPD device or array.

In one embodiment, the present invention comprises a system for single photon detection. In one embodiment, the system comprises one or more SSPD devices described herein, where each of the one or more devices comprises a superconducting nanowire positioned atop of a waveguide layer (FIG. 18). In one embodiment, the system comprises one or more devices comprising a cavity for engaging a fiber for providing self-aligned fiber coupling (FIG. 22). In one embodiment, the system an optical fiber, fiber array, or the like, which is optically coupled to the SSPD device. In certain embodiments, the system comprises a splitter, for example a 50:50 splitter, which directs at least a portion of the light in the fiber to a reference or calibration port. In certain embodiments, the fiber is optically coupled to the waveguide layer of the SSPD device via one or more grating couplers. As described elsewhere herein, the one or more grating coupler may be optimized to provide the desired operating wavelength of the device. In certain embodiments, the system comprises a plurality of SSPD devices, with one or more of the plurality of devices tuned to detect photons at different wavelengths. Thus, the system can be designed to detect photons across the visible and infrared spectrum.

In one embodiment, the system comprises an electrode in communication with the nanowire of the one or more SSPD device. The electrode may be any suitable electrode which is capable of delivering and receiving current to and from the nanowire. In one embodiment, the system comprises an external current source which is used to supply a bias current to the nanowire. In one embodiment, the system comprises an RF-probe, which is contacted with the electrode to read out the output of the nanowire and deliver bias current to the nanowire. The system may also comprise one or more amplifiers, one or more filters, or the like which can be used to modulate the output of the detector device.

In one embodiment, the system of the present invention comprises a cryostat. For example, in certain instances, the device or chip of the invention resides within a cryostat to provide adequate working temperature. In one embodiment, the cryostat allows cooling without introducing vibrational noise. As would be understood by those skilled in the art, any suitable commercial cryostat or user-designed cryostat may be used in the present system. In one embodiment, the cryostat holds the device at or near the critical temperature of the superconducting material of the nanowire. In one embodiment, the cryostat holds the device at temperature of about 0K to about 50K. In one embodiment, the cryostat holds the device at temperature of about 1K to about 5K.

In one embodiment, the present invention comprises a system for detecting light in body tissue or sample. The system may be used, for example, as a diagnostic tool for diagnosing or monitoring a wide range of conditions. The ultra-sensitive and low-noise detectors of the present invention allow for the ability to localize low levels of emitted light from tissues or samples. This allows for imaging at tissue depths previously unable to be examined.

Figure 23:
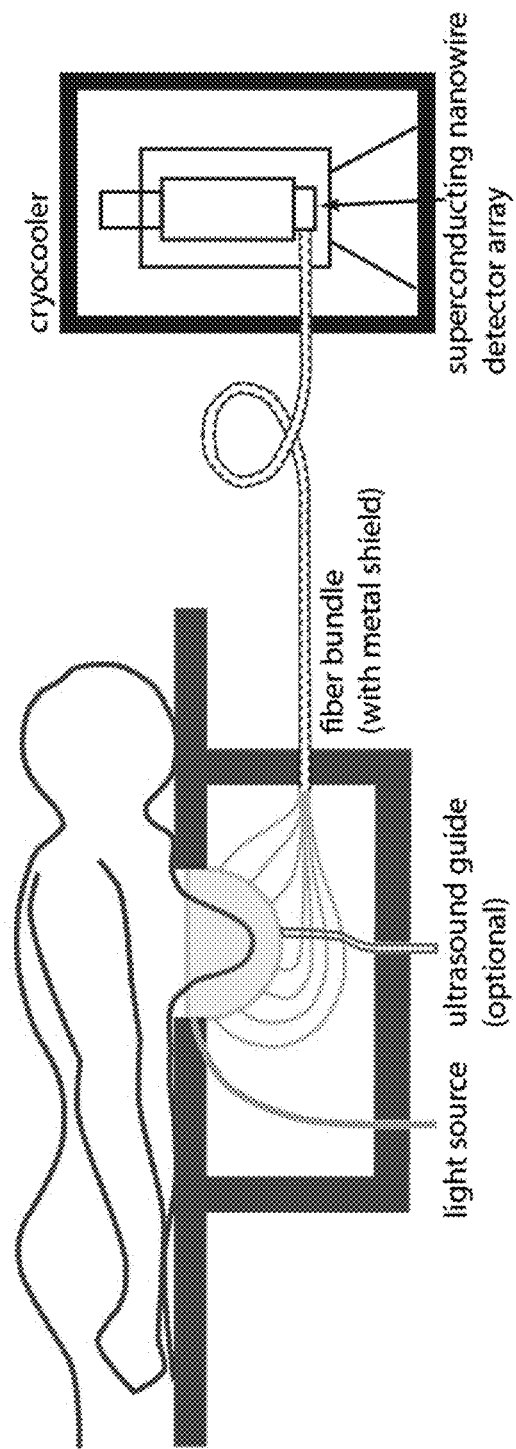
FIG. 23 depicts an exemplary system of the invention for detecting photons from tissue.

FIG. 23 depicts an exemplary system used for optical mammography. In one embodiment, the system comprises at least one fiber to administered light to the tissue or sample being exampled. In certain embodiments, the administered light may be modulated light or pulsed light (frequency domain or time domain approach) of varying wavelength (e.g. 600 nm-2000 nm). In one embodiment, the system comprises a guide, for example an ultrasound guide, to aid in the positioning of the tissue or fibers. In one embodiment, the system comprises a fiber bundle comprising an array of fibers for collecting the transmitted or reflected light from the examined tissue or sample. The fiber array routs the collected light to a detector or detector array. In one embodiment the detector or detector array is housed or mounted within a cryostat (e.g, cryocooler). In certain embodiments, the system comprises additional electronic components, including but not limited to, an RF probe, filter, amplifier, and the like to retrieve the signals from the detector or detector array.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Example 1

NbTiN Superconducting Nanowire Detectors for Visible and Telecom Wavelengths Single Photon Counting on Si3N4 Photonic Circuits Described herein is the demonstration of niobium titanium nitride (NbTiN) superconducting nanowires patterned on stoichiometric silicon nitride waveguides for detecting visible and infrared photons. The use of silicon nitride on insulator on silicon substrates allows for the simultaneously realization of photonic circuits for visible and infrared light and the integration of such circuits with nanowire detectors directly on-chip. By implementing a traveling wave detector geometry in this material platform, efficient single photon detection is achieved for both wavelength regimes. The waveguide coupled SSPDs presented here is a development primarily addressing the needs of integrated photonics and quantum information processing (Pernice et al., 2012, Nat. Commun., 3: 1325; Sprengers et al., 2011, Appl. Phys. Lett., 99: 181110). The described detectors are an ideal match for integrated quantum optics as they provide crucial functionality on a wideband transparent waveguide material.

Presented herein is a material system based on niobium titanium nitride (NbTiN) SSPDs on SiN waveguides to achieve high on-chip detection efficiency for visible and infrared photons on a scalable platform. The highly efficient detection of single photons achieved here is a result of patterning the detectors directly on top of the SiN waveguides in a traveling wave design (Hu et al., 2009, IEEE Trans. Appl. Supercond., 19: 336). This allows for very large interaction lengths of the guided light field with the nanowire on the waveguide surface. For a sufficiently long nanowire, the incoming photons are fully absorbed in contrast to traditional fiber-coupled meander-type SSPDs which absorb photons in a few nanometer thin film under normal incidence (Gaggero et al., 2010, Appl. Phys. Lett., 97: 151108; Tanner et al., 2010, Appl. Phys. Lett., 96: 221109).

Two types of SiN photonic circuits are fabricated on the same chip, one for operation at 775 nm and one for 1550 nm wavelength, as shown in FIG. 1A. Each circuit is composed of a pair of optical grating couplers, a 50:50 waveguide splitter, and the detector region which connects to a pair of electrode pads. The grating couplers are used to couple light from an optical fiber array into single mode waveguides on the chip. Their operating wavelength (visible vs. infrared) is adjusted by optimizing the period and filling factor of the grating. The 50:50 waveguide splitter (Fong et al., 2010, Appl. Phys. Lett., 97: 073112) routes half of the coupled light to the detector region and the other half to a reference port which allows for the precise determination of the number of photons arriving at the detector region. Transmission spectra recorded at the calibration port are shown in FIG. 1B for the telecom band and in FIG. 1C for the visible light devices, showing broadband transmission in both wavelength regimes. After careful alignment of the chip with respect to the fiber array using low-temperature compatible nano-positioners, −10.9 dB transmission loss per coupler on the infrared device measured at 1542 nm and −13.1 dB loss per coupler on the visible device determined at 768 nm input wavelength is observed.

The devices are realized by patterning stoichiometric silicon nitride on silicon wafers covered with a buried oxide layer (BOX). The SiN layer has a thickness of 330 nm to achieve single (TE) mode waveguide operation in both wavelength regimes by adjusting the waveguide widths. In combination with the underlying 3.3 μm BOX layer, which acts as a cladding, low optical transmission loss and optimal coupling efficiency for the on-chip input/output grating couplers is achieved. The detectors are fabricated from an 8 nm thin NbTiN film which is deposited by dc magnetron sputtering on top of the SiN layer. The sheet resistance of the as deposited 8 nm film was measured as 231 Ω/sq. Electrode pads and markers for alignment of the subsequent detector and waveguide patterns are defined in a first electron beam lithography step using polymethyl methacrylate (PMMA)

positive resist. The contact pads and alignment markers are realized using electron-beam evaporation of a 6 nm Cr adhesion-layer and a 200 nm Au-film followed by lift-off in acetone. High resolution electron beam lithography on hydrogen silsesquioxane (HSQ) resist defines the nanowire detector features which are subsequently transferred into the NbTiN layer in a timed reactive ion etch (RIE) step using CF4 chemistry. The waveguide layer is then patterned in a final electron beam lithography step employing ZEP520A positive resist and a carefully timed RIE through the SiN to the interface with the buried oxide layer using CHF3 chemistry. The inset of FIG. 1A shows a scanning electron microscope (SEM) image of the detector region after removal of the ZEP resist. The U-shaped nanowire is protected by a thin layer of HSQ resist which remained after the NbTiN etch, as visible on top of the waveguide. From the SEM images, the alignment tolerance of the electron beam pattern generator (Vistec EBPG 5000+100 kV) is estimated to be better than 50 nm which allows for centering the nanowire on the waveguides with high accuracy. The nanowire-ends are connected via large NbTiN patches to ground and signal electrode pads. Electrical readout of the SSPDs is realized by approaching a RF-probe to the contact pads.

A schematic of the traveling wave design is shown in FIG. 2A. The NbTiN nanowire on top of the waveguide has a thickness of 8 nm, a wire width of 75 nm, a wire spacing of 90 nm, and length of 40 µm (footprint). The SiN waveguides are designed to support only the fundamental quasi-TE mode at 775 nm and 1550 nm for visible and infrared devices, respectively. FIG. 2B and FIG. 2F show calculations of the electrical component of the optical field distribution for the fundamental mode profiles of 775 nm light in a 330×600 nm² SiN waveguide and 1550 nm light in a waveguide of 330×1000 nm² cross section, respectively. The strong spatial mode confinement due to the high refractive index contrast between the waveguide material (SiN) and its environment (vacuum/oxide) allows for very compact optical device design as desired for large scale photonic circuit implementations. Similar simulations for the waveguide sections which carry the superconducting thin film show how the evanescent tail of the light field couples strongly to the NbTiN nanowire. In FIG. 2C and FIG. 2G, field enhancement at the nanowire sides both for the 775 nm and 1550 nm field distributions is observed, respectively. The large change in the imaginary part of the refractive index from the bare waveguide to the NbTiN covered region then leads to strong absorption of the incoming light. The real part of the refractive index, on the other hand, only changes by 0.7% for the 1550 nm (0.1% for the 775 nm) mode such that the transition from the bare to the nanowire covered waveguide section is smooth. Negligible reflection at this interface is also expected from the large difference in SiN to NbTiN film cross section (103:1 for the 600 nm wide waveguide and 172:1 for the 1 µm wide waveguide) leading only to a small spatial expansion of the mode profile in the NbTiN covered waveguide section.

A numerical analysis of the NbTiN nanowire absorption properties is presented in FIG. 2D for 775 nm and in FIG. 2E for 1550 nm light. The three-dimensional finite-difference time-domain (FDTD) simulations yield an absorption rate of 0.33 dB/µm for 1550 nm light in the NbTiN nanowire covered region of the waveguide, and 0.71 dB/µm for the 775 nm case. The stronger absorption value for visible light is also consistent with the larger imaginary part obtained from the calculations of the visible light mode in the NbTiN covered waveguide section as compared to the infrared mode (FIG. 2C and FIG. 2G). These absorption rates are lower than those obtained for NbN nanowires on silicon waveguides (Pernice et al., 2012, Nat. Commun., 3: 1325) due to the larger cross section of the SiN waveguides used here. An absorption of 95.1% of the incident 1550 nm photons and 99.8% of the incident 775 nm photons is estimated along the 40 µm long SSPD. Such high absorption efficiency (AE) is a prerequisite for high on-chip detection efficiency, OCDE=AE*QE, where QE is the quantum efficiency of the detector.

The fabricated devices are then characterized experimentally. The optical measurement setup consists of continuous wave lasers for 1520-1570 nm (New Focus 6428) and 765-780 nm (New Focus TLB 6712) wavelength launching light via calibrated optical attenuators (for 1550 nm/775 nm), polarization controllers, and a fiber array into a liquid helium (LHe4) cryostat fitted with a 1 K refrigerator. The sample is mounted on a stack of nano-positioners inside the cryostat such that the grating couplers (see FIG. 1) can be aligned to the fibers for optimal transmission through the device. The optical output from the calibration coupler port is collected with another optical fiber in the same fiber array and detected with a calibrated photo-detector. The nanowire detector is current biased and read out via an RF-probe which is brought into contact with the electrode pads on the chip (FIG. 1). Using a programmable current source (Keithley 2400) connected to the RF-probe via a 10 kHz low-pass filter and a 6 GHz bias-T, the bias current is scanned across the nanowire at a temperature of 1.57 K and switching currents of 17.76 µA is observed for both detectors on the 775 nm and 1550 nm devices. The close match of the critical current values for two independent nanowire detectors highlights the high reproducibility of the NbTiN nanowire fabrication process across the chip.

To calculate the on-chip detection efficiency, it is necessary to determine the number of photons inside the waveguide reaching the SSPD, which is given by $N_d = P_{in} \times T_{gc,in} \times T_{50:50} \times T_{ext}/E_\gamma(\lambda)$. Here, the attenuation by the input grating coupler $T_{gc,in}$ can be determined by measuring the transmission at the reference port $P_{ref} = P_{in} \times T_{gc,in} \times T_{50:50} \times T_{gc,ref}$ for input power $P_{in}$. Due to the optical reciprocity of the optical grating couplers, the transmission loss at the input, $T_{gc,in}$ is identical to that at the reference port, $T_{gc,ref}$, as confirmed on separate calibration devices. Accounting, furthermore, for transmission through the 50:50 waveguide splitter, $T_{50:50}$, the on-chip optical power is obtained from the measured laser input power, $P_{in}$, after adding external attenuation on the order of $T_{ext}$=90-100 dB. The exact attenuation value is determined separately for each measurement series both for 768 nm and 1542 nm input light by using the same calibrated photo-detector as above. Note that the linearity of the attenuators from typical laser input power to operation at single-photon level has been confirmed independently (Pernice et al., 2012, Nat. Commun., 3: 1325). The number of photons arriving at the detector then follows from dividing the on-chip optical power with the photon energy $E_\gamma(\lambda=768 \text{ nm})=2.587 \times 10^{-19}$ J and $E_\gamma(\lambda=1542 \text{ nm})=1.288 \times 10^{-19}$ J, respectively. The dark count rate for both detectors was below 10 Hz and hence does not contribute appreciable to the number of photons arriving at the detector (approximately five orders of magnitude higher). It was found that the dark counts are caused mainly by straylight coupled through the cladding of the fibers leading into the cryostat when the laser is disconnected, as also confirmed by variations of the dark count rate with the ambient light level.

Figure 3:
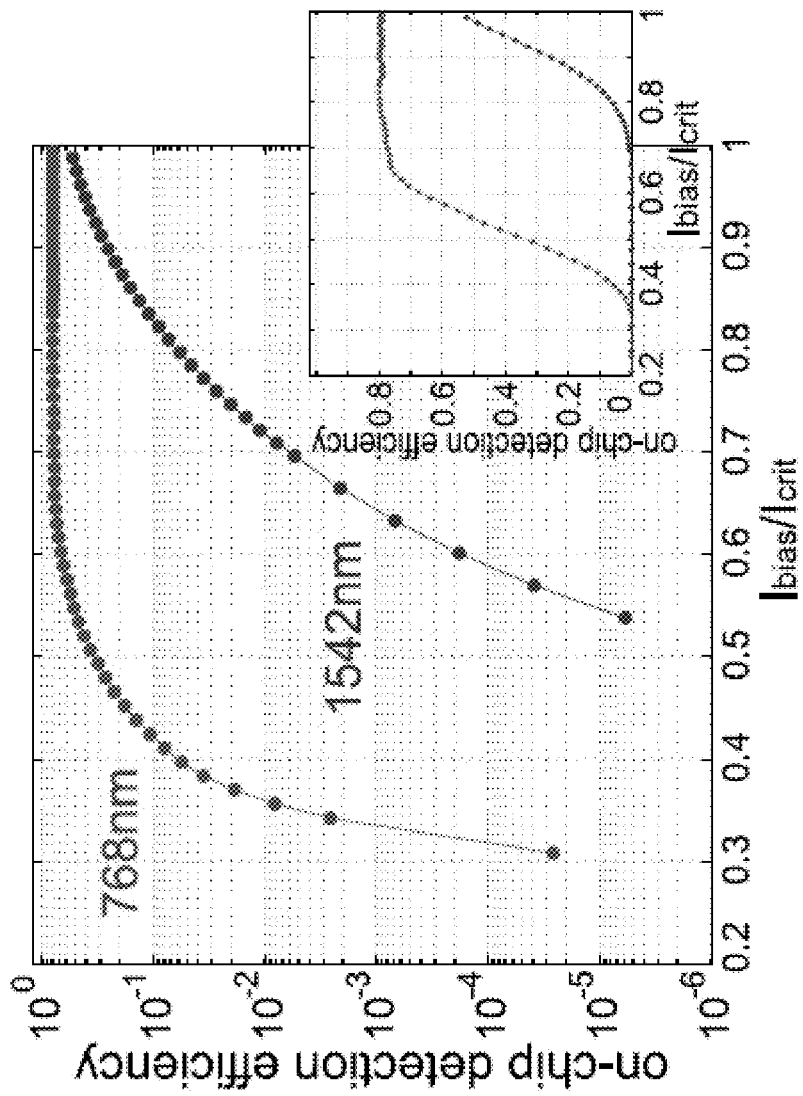
FIG. 3 depicts the on-chip detection efficiency for NbTiN nanowire SSPDs with 75 nm wire width and 40 μm length (footprint) as a function of bias current in units of the critical current for 768 nm photons and for 1542 nm photons. Inset: The same data on a linear scale reveal how the on-chip detection efficiency for 768 nm photons saturates around 80% over a bias current range of 70%-100% of the critical current, while it monotonically increases to 52.5% at 99% $I_{crit}$ for 1542 nm photons.

The detector output pulses are amplified with low-noise high-bandwidth amplifiers and recorded on a single photon counting (SPC) system (PicoHarp 300). The high signal-to-noise ratio of the output pulses after amplification allows the clear distinguishing of photon detection events from electrical noise. Using a high-bandwidth oscilloscope, it is found that the output-pulse width as 1.4 ns at full width half maximum for these detectors of 2×40 µm length by using low-noise amplifiers with small low frequency cut-off values which cause only minor output voltage overshoot. Operation in the single photon regime is further confirmed by observing a linear dependence of the photon count rate on the photon flux directed to the device. The on-chip photon detection efficiency as a function of bias current is then obtained from the ratio of recorded detector output pulses to the on-chip photon number (see above) as shown in FIG. 3. For infrared photons of 1542 nm wavelength, a maximal on-chip detection efficiency of 52.5% is found, measured at 99% of the critical current. Similarly, for visible light (768 nm), the corresponding detector achieves a maximal on-chip detection efficiency of 80.1%. In this case, it is observed that the on-chip detection efficiency saturates around 80% starting from a bias current of 70% of the critical current. The inset of FIG. 3 shows the on-chip detection efficiency as a function of bias current on linear scale highlighting the saturation behavior for the visible photon detection rate, whereas the detector does not reach saturation for infrared photons. The saturation behavior is explained by the linear dependence of the hotspot diameter on the incident photon energy (Verevkin et al., 2002, Appl. Phys. Lett., 80: 4687). At high bias current, a 768 nm photon provides sufficient energy to always cause a hotspot which is large compared to the wire dimensions such that every photon absorbed in the superconducting film leads to an output pulse of the SSPD. The detection of lower energy 1542 nm photons, on the other hand, does not reach high quantum yield in the nanowire used here, even when biased very close to the switching current, as expected from the exponential dependence of quantum efficiency on wavelength (Korneev et al., 2005, IEEE Trans. Appl. Supercond., 15: 571; Semenov et al., 2003, Appl. Phys., 21: 171). A slightly higher absolute detector sensitivity for visible light in the waveguide coupled SSPDs is furthermore expected according to the above reported absorption characteristics for 780 nm and 1550 nm light (see FIG. 2). As described elsewhere herein, detector performance can be optimized by engineering the nanowire dimensions.

The uncertainty of the measured detection efficiency values is determined by the uncertainty of the 50:50 waveguide splitting and the optical power measurements employed in the grating coupler and attenuator calibration procedures. A 5.9% total uncertainty of the photon number arriving at the detector is obtained after propagating the 4% splitter uncertainty, the 3% calibration uncertainty of the photo-detector (Newport 818-IS-1, NIST traceable), and a 0.5% linearity uncertainty through the grating coupler and attenuator calibration procedure. Here, changes of the on-chip photon number due to polarization drift are not accounted for. Since the device transmission is optimized at the reference port before each measurement run (including calibration procedures), the on-chip detection efficiency values given above are worst case numbers in this respect. It is noted, however, that no significant polarization drifts are observed once the cryostat has reached stable operation temperature. This is also evident from the data presented in the inset of FIG. 3 which does not show significant changes in detector count rate in the saturated regime over the course of the measurement time of 10-1 s per data point.

The data presented herein demonstrate the integration of superconducting single photon detectors with photonic circuits for visible and infrared light on a scalable platform for chip-scale quantum optical technology. High on-chip detection efficiency of 52.5% for telecom band photons and 80.1% for visible wavelength photons is demonstrated over a large bias current range, achieved in an NbTiN on SiN material system. The efficient interface between high-performance single photon detectors, visible and infrared photonic waveguides constitutes a crucial ingredient for developing future large scale quantum optical implementations.

Example 2

Waveguide Integrated Low Noise NbTiN Nanowire Single-photon Detectors with Milli-Hz Dark Count Rate Superconducting nanowire single-photon detectors are an ideal match for integrated quantum photonic circuits due to their high detection efficiency for telecom wavelength photons. Quantum optical technology also requires single-photon detection with low dark count rate and high timing accuracy. Presented herein are very low noise superconducting nanowire single-photon detectors based on NbTiN thin films patterned directly on top of $Si_3N_4$ waveguides. A large variety of detector designs are systematically investigated and their detection noise performance is characterized. Milli-Hz dark count rates are demonstrated over the entire operating range of the nanowire detectors which also feature low timing jitter. The ultra-low dark count rate, in combination with the high detection efficiency inherent to the travelling wave detector geometry, gives rise to a measured noise equivalent power at the $10^{-20}$ $W/Hz^{1/2}$ level.

It is shown herein that ultra-low dark count rates can be achieved with amorphous NbTiN-on-SiN nanowire single-photon detectors. The present results represent an improvement of several orders of magnitude over SSPDs made from NbN which typically only achieve low dark count rates ($R_{dc}$) when the bias current is set far below the critical current (Natarajan et al., 2010, Appl. Phys. Lett., 96(21): 211101; Pernice et al., 2012, Nat. Comm., 3: 1325; Korneev et al., 2005, IEEE Trans. Appl. Supercond., 15(2): 571-574; Yamashita et al., 2011, Appl. Phys. Lett., 99(13): 131105). Furthermore, highly efficient single-photon detection is achieved by engineering the detector and waveguide dimensions at the nanoscale. The detectors thus feature very low NEP on a fully scalable platform, addressing the most urgent needs of integrated quantum optical information processing (Pernice et al., 2012, Nat. Comm., 3: 1325; O'Brien, 2007, Science, 318(5856): 1567-1570) and time correlated single-photon counting applications.

The materials and methods employed in these experiments are now described.

Optical and Electrical Access of the SSPDs

The sample chip is mounted on a stack of nano-positioners inside a liquid helium cryostat capable of reaching temperatures as low as 1.5 K. Photons from continuous wave (cw) lasers at 768 nm and 1542 nm wavelengths are delivered to the chip via an optical fiber array. Transmission of light from the fiber array into the waveguide is achieved with optical grating couplers patterned into the SiN layer. Different detectors are then optically addressable by positioning the corresponding grating coupler under the fiber array using the low-temperature compatible positioners. The photon flux inside the waveguide is controlled precisely by carefully calibrating the grating coupler transmission and by using calibrated attenuators (Pernice et al., 2012, Nat. Comm., 3: 1325). This calibration procedure is repeated for each device, typical coupling losses are around −11 dB for 1542 nm photons and −13 dB for 768 nm light. The on-chip detection efficiency can then be calculated by dividing the count rate observed at a given bias current value by the photon flux inside the waveguide (Schuck, et al., 2013, Appl. Phys. Lett., 102(5): 051101). Considering error contributions from each measurement component and the on-chip photonic devices, the resulting uncertainty of the absolute photon number arriving at the detector is at most 5.9%. For electrical access the nanowires are connected on the chip to gold electrode pads fabricated in an electron beam lithography step using a lift-off technique. These pads are then contacted with an RF-probe to supply the bias current and read out the SSPD photo-response via a 6 GHz bandwidth bias-T. After cooling the devices down to 1.6 K the critical current is determined, which ranges from 13 µA for the narrowest to 20 µA for the wider nanowires. The SSPD output pulses are amplified and recorded with a single-photon counting system.

Jitter Measurement and Pulse Characterization

For the jitter measurement the cw-laser source is replaced with a 2.4 ps-pulsed laser (PolarOnyx) and the output pulses of a 40 µm long, 75 nm wide nanowire SSPD is recorded with a high bandwidth oscilloscope (6 GHz, 20 GSa/s) after pulse amplification with high bandwidth (>10 GHz) low noise amplifiers. The shape of the output pulse was empirically fitted with a bi-exponential function $S_p = a(1-e^{-(t-t_2)/t_1}) + be^{-(t-t_2)/t_2}$, where the first part accounts for the initial voltage pulse rising sharply at $t_1$ as the nanowire switches to the normal conducting state and the second part describes the exponential decay of the pulse at $t_2$ as the nanowire relaxes back to the superconducting state. Note that the fit shown in FIG. 7A deviates from the measured data especially at the onset of the pulse and at longer decay times of the falling edge, because the bandwidth limitations of the electrical instrumentation used for the jitter measurements are not taken into account.

To estimate the limiting jitter value of the measurement setup a thermal noise model is assumed and the RMS noise voltage $V_{rms} = (4 k_B T \Gamma_{os} R_L)^{1/2} = 70.5$ µV at T=300 K is calculated using the limiting amplifier bandwidth of the oscilloscope $\Gamma_{os}$=6 GHz and the Boltzmann constant $k_B$. From the difference of critical current (16 µA) and the measured return current (3.8 µA) the amplitude of the output pulse before amplification is obtained as 0.61 mV for an input impedance of 50Ω. While the SSPD output is assumed to be characterized by an exponentially rising voltage pulse for the bi-exponential fit in FIG. 7A, the slope of the rising pulse edge is determined herein from the measurement data shown in FIG. 7B.

The results of the experiments are now described

Low Dark Count Rate NbTiN Detectors

Superconducting nanowire detectors are fabricated from 8 nm thin NbTiN films deposited on SiN-on-insulator wafers (details of the fabrication process is described elsewhere herein and in Schuck, et al., 2013, Appl. Phys. Lett., 102(5): 051101), as shown in FIG. 4A and FIG. 4B. To test these detectors under realistic conditions for practical detector applications wideband transparent waveguides are patterned out of the SiN-substrate layer to route visible and infrared photons with low loss to the nanowire-covered SSPD-region. Optical links to the SSPD-sample chip mounted inside a liquid helium cryostat are provided via a fiber array.

Dark count rate measurements are first performed during optimal alignment of the fiber array to the on-chip waveguides, as it would be the case during regular detector operation. Although the cryostat itself is well shielded, residual stray light does penetrate through the optical fiber into the cryostat and further to the detector via the waveguide ("mounted" detector). The resulting dark count rate for a 75 nm-wide NbTiN nanowire of 40 µm length is shown in FIG. 4C and was recorded at 1.6 K under "dark" laboratory conditions, i.e. all laboratory light sources are reduced to minimal illumination levels. Under these conditions a maximal dark count rate was found to be 100 mHz at >96% of the critical current, which was 18 µA for this detector. The rate then gradually decreases to 2 mHz at 55% $I_c$.

To assess the intrinsic dark count rate of the SSPDs the detector output pulses was also recorded after displacing the fiber array from the on-chip waveguide couplers to avoid stray light being guided from the fiber to the (now "unmounted") detector. A further decrease of the number of dark counts was observed as compared to the above setting, reaching a maximal rate of 50 mHz at 99% of the critical current. In this case the lowest dark count rate of 1 mHz was recorded at 60% $I_c$ where the detection efficiency remains high (see FIG. 5). At even lower bias currents the dark count rate is so low, that the data acquisition time of 30 minutes per measurement point does not allow the acquisition of enough counts to report meaningful statistics. The NbTiN nanowire SSPDs thus achieve low intrinsic dark count rates over their entire bias current range.

In a third series of measurements the ambient illumination level was increased to daylight conditions and the dark count rate was again recorded, which now reaches a maximal value of 7.7 Hz confirming the sensitivity of the detectors to ultra-low light levels. For none of the three curves recorded at 1.6 K is the observation of an exponential rise of the dark count rate at bias currents close to the critical current as reported in previous studies (Natarajan et al., 2010, Appl. Phys. Lett., 96(21): 211101; Dorenbos et al., 2008, Appl. Phys. Lett., 93(13): 131101; Korneev et al., 2005, IEEE Trans. Appl. Supercond., 15(2): 571-574; Yamashita et al., 2011, Appl. Phys. Lett., 99(13): 131105). This is attributed to the fact that the dominant decoherence mechanisms of the superconducting state, e.g. unbinding of vortex-antivortex pairs and vortex hopping over the edge barrier (Yamashita et al., 2011, Appl. Phys. Lett., 99(13): 131105; Bartolf et al., 2010, Phys. Rev. B., 81(2): 024502), are suppressed below the stray light level of the apparatus in this temperature range for 8 nm thick NbTiN nanowires. Reducing stray light levels even further may allow for the study of the origin of intrinsic dark count rates in nano-patterned NbTiN structures below 2 K with this setup.

To verify that bias-current assisted thermal fluctuations persist in the NbTiN nanowires, the sample is heated to 5 K and the dark count rate is measured when biasing the wire close to the critical current. As shown in FIG. 6C, an exponential dependence of the dark count rate on the bias current is indeed observed in this case. During this measurement ambient light levels were reduced to a minimum but the data acquisition time per point was too short to resolve the stray light background at lower bias current.

Detector Geometry Optimization

Figure 4:
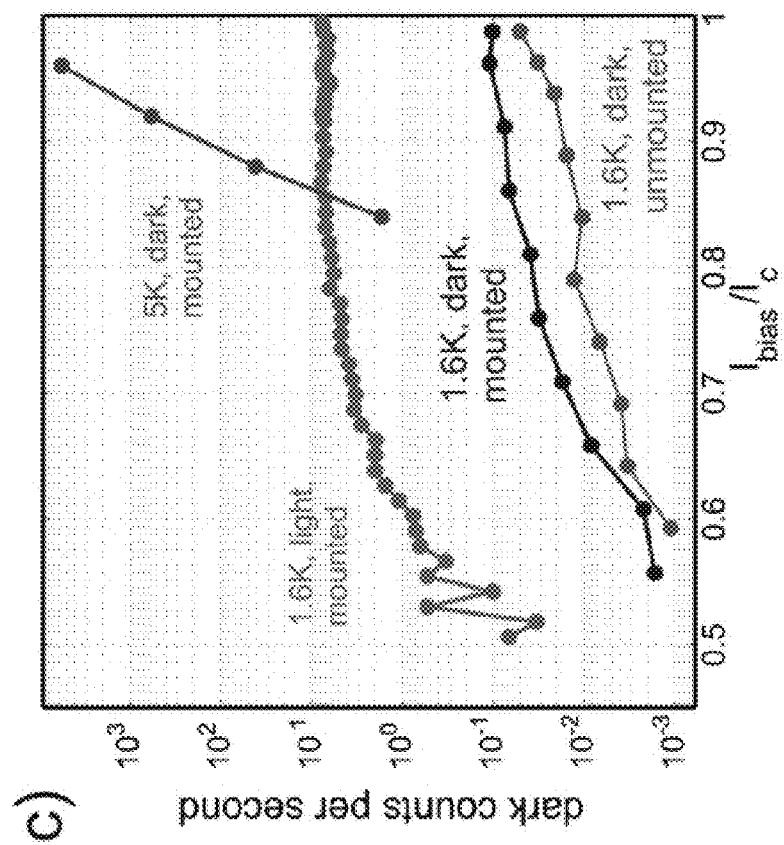
FIG. 4, comprising
Figure 4:
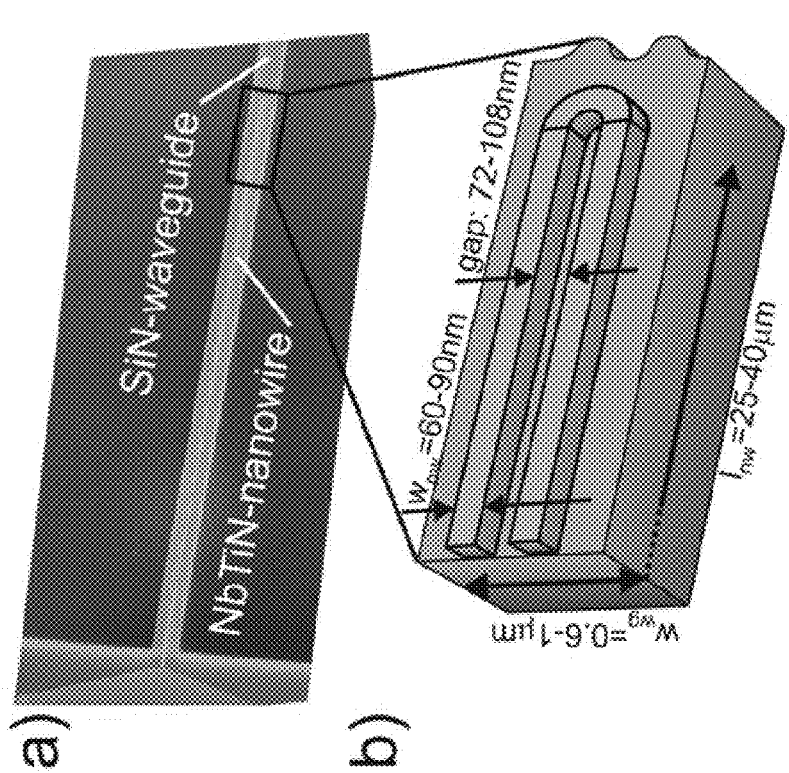

To simultaneously achieve low noise and high detection efficiency over a broad bias range a traveling wave design (Pernice et al., 2012, Nat. Comm., 3: 1325; Schuck, et al., 2013, Appl. Phys. Lett., 102(5): 051101; Hu et al., 2009, IEEE Trans. Appl. Supercond., 19: 336; Ghamsari & Majedi, 2008, IEEE J. Quantum Elect., 44(7): 667-675) is employed, as shown in FIG. 4, and the geometry of the nanowires is optimized. Because a relatively high percentage of the incoming photons will be absorbed at the 180 degree turn of the nanowire (where the light is first incident) rounded bends are employed at this point (see FIG. 4B). When current flows around a bend it will crowd at the inner edge, leaving the outer side of the bend with less current density (Akhlaghi, et al., 2012, Opt. Express, 20(21): 23610; Hortensius et al., 2012, Appl. Phys. Lett., 100(18): 182602; Henrich et al., 2012, Phys. Rev. B., 86(14): 144504). In sharp-angled bend-geometries the current density is particularly low at outside corners. In contrast, the U-shaped wire geometry in the present detectors minimizes NbTiN areas which contribute to photon absorption but do not carry enough current to drive the corresponding wire section into a normal-resistive state and trigger an output pulse. To further determine the optimal detector dimensions such U-shaped NbTiN-nanowires are patterned of 90 nm, 75 nm, and 60 nm width over lengths of 25 μm and 40 μm.

Figure 5:
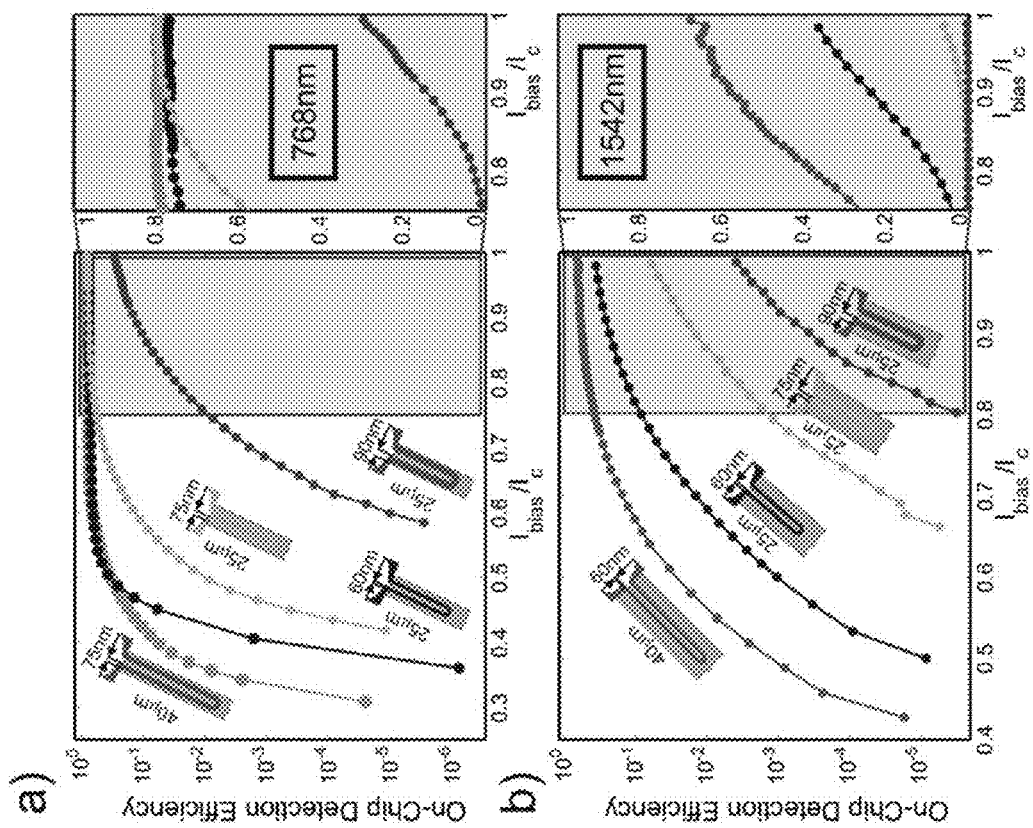
FIG. 5, comprising

The simulation and measurement results for various nanowire dimensions are summarized in Table 1. In the waveguide geometry, high photon absorption rates (>95%) can be achieved for waveguide-coupled visible and infrared photons (Schuck, et al., 2013, Appl. Phys. Lett., 102(5): 051101). The results of the measured detection efficiency for a variety of nanowire geometries are shown in FIG. 5 for both wavelength regimes. Notably, it is observed that the measured on-chip detection efficiency ($DE_{oc}$) is strongly dependent upon the nanowire width, while the absorption rate rather depends on detector length. This allows for independent optimization of the absorption efficiency ($\alpha_{tot}$) by increasing the nanowire covered length of the waveguide, while maximizing the quantum efficiency ($QE=DE_{oc}/\alpha_{tot}$) by decreasing the wire width.

For visible wavelength photons a sigmoidal dependence of the on-chip detection efficiency on bias current is observed before saturating at 80% in the 60 nm and 75 nm wide nanowires, as shown in FIG. 5A. This behavior is expected from the hotspot model (Marsili et al., 2011, Nano Lett., 11(5): 2048-2053; Verevkin et al., 2002, Appl. Phys. Lett., 80(25): 4687-4689), which implies that the detection efficiency depends on the hotspot size and reaches the saturation regime when the hotspot diameter approaches the nanowire width. For 60 nm wire width it is found that saturation of the detection efficiency sets in already for bias currents as low as 50% of the critical current. Consequently, increasing the nanowire length past 25 μm does not lead to improved detection efficiencies because practically all visible light in the waveguide is already absorbed at this length, see FIG. 5A and Table 1.

For telecom wavelength photons the superior performance of narrower nanowires is even more apparent, leading to an increase of the detection efficiency by roughly two orders of magnitude when decreasing the nanowire width from 90 nm to 60 nm, see Table 1. Due to the lower photon energy, however, the saturation regime is not quite reached for the SSPDs as the hotspot size and detection efficiency decrease with photon energy, similar to previous observations with telecom wavelength photons (Korneev et al., 2005, IEEE Trans. Appl. Supercond., 15(2): 571-574; Verevkin et al., 2002, Appl. Phys. Lett., 80(25): 4687-4689; Marsili et al., 2012, Nano Lett., 12(9): 4799-4804). Because the absorption rate of infrared photons is lower than that for visible light (see Table 1), it is however possible to achieve another substantial increase in detection efficiency by using longer nanowires. For a 40 μm long SSPD with 60 nm wide nanowires 68% detection efficiency for waveguide-coupled infrared photons is thus achieved.

Noise Equivalent Power for Waveguide-coupled Photons

Figure 6:
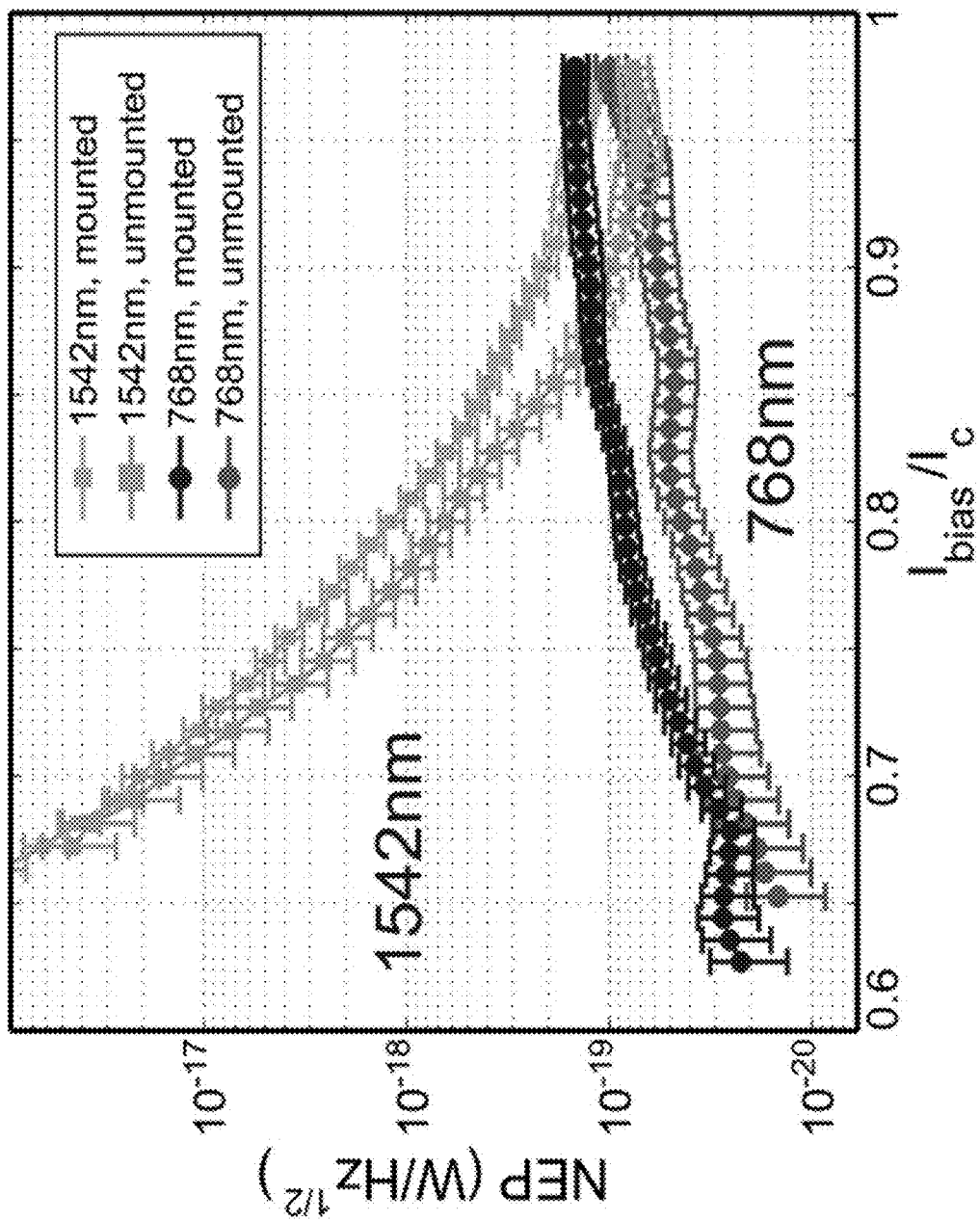
FIG. 6 depicts the noise equivalent power (NEP) as a function of normalized bias current for visible (768 nm) and infrared (1542 nm) photons under "dark" conditions.

The Noise equivalent power (NEP) is an important figure of merit for single-photon detector applications including optical time-domain reflectometry and laser ranging. The NEP critically depends on dark count rate ($R_{dc}$) and detection efficiency (DE), $NEP=h\nu*(2R_{dc})^{1/2}/DE$, where hν is the photon energy. The $NEP_{oc}$ for waveguide-coupled photons is calculated using the on-chip detection efficiency ($DE_{oc}$) data for visible (768 nm) and infrared (1542 nm) photons recorded with 40 μm long SSPDs of 75 nm nanowire width (see FIG. 5A and Table 1). In FIG. 6 the corresponding noise equivalent power is shown for the case of minimal stray light ("dark") conditions with the fiber array aligned to the on-chip waveguide ("mounted") or displaced from the waveguide ("unmounted").

The saturation behavior of the detection efficiency for 768 nm photons (see FIG. 5A) and the low dark count rates observed over the entire bias current range (see FIG. 4C) lead to noise equivalent power values in the low $10^{-19}$ W/Hz$^{1/2}$ regime, decreasing to $2.1*10^{-20}$ W/Hz$^{1/2}$ at 58% $I_c$ for visible light. The on-chip detection efficiency for 1542 nm photons on the other hand does not show appreciable saturation behavior but rather decreases monotonically with bias current. For infrared light the corresponding NEP hence reaches a minimum of $7.1*10^{-20}$ W/Hz$^{1/2}$ close to the critical current at 94% $I_c$. Since the dark count rate measurements are very time consuming and limited by stray light rather than material intrinsic mechanisms, the data given in FIG. 4C was used to calculate worst-case NEP values for the other detector geometries summarized in Table 1. Note that similar dark count rates are observed for all detectors under test at elevated stray light levels (laboratory under daylight conditions) with shorter data acquisition times though, i.e. no exponential increase at high bias currents. It is also noted that these NEP values refer to the on-chip detection noise performance. For off-chip applications, the transmission loss at the fiber-to-waveguide interface needs to be taken into account.

Single-photon Detection with Low Timing Jitter

Figure 7:
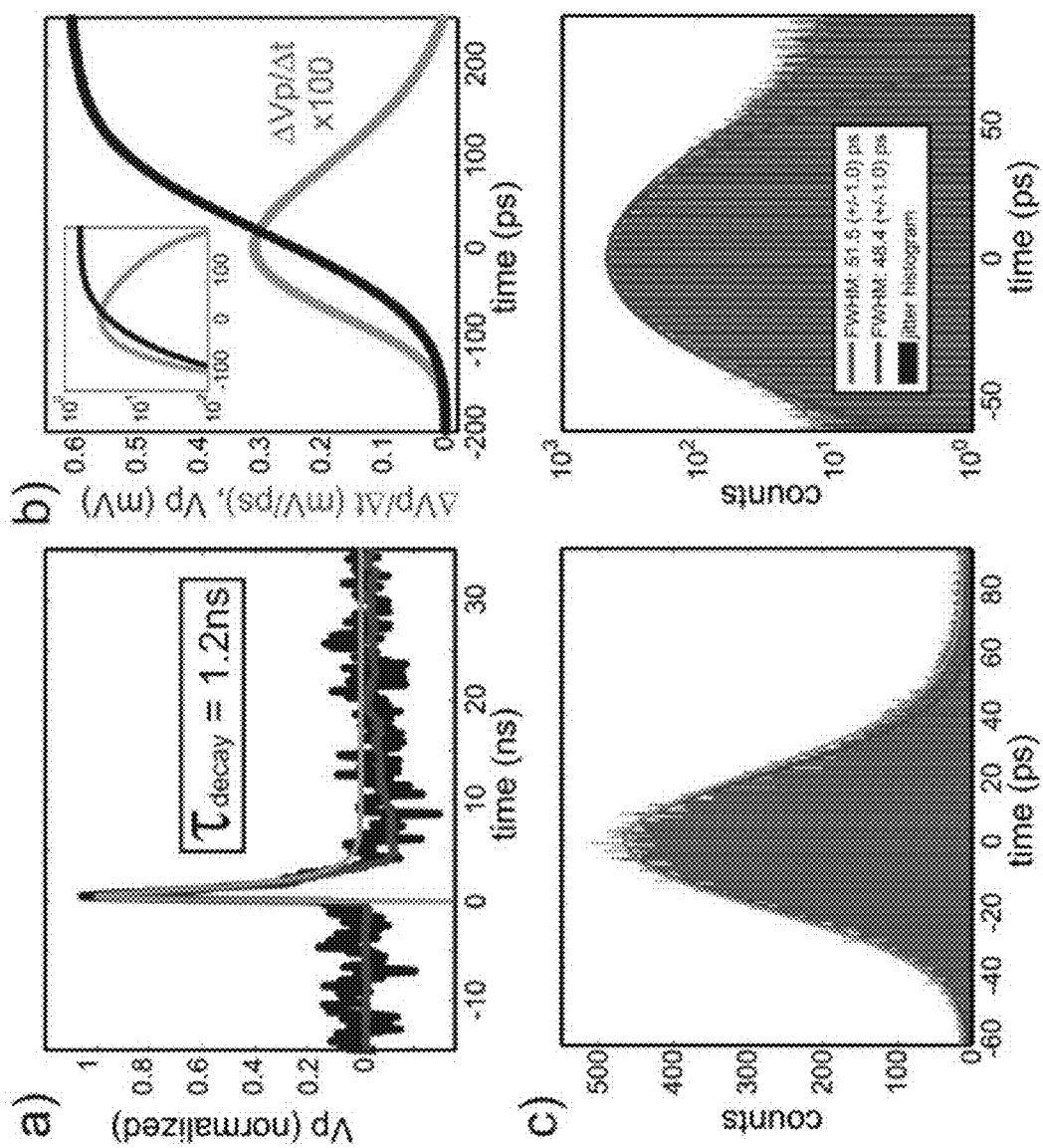
FIG. 7, comprising

For measurements with high timing accuracy and maximal detection efficiency, operation at high bias current is necessary to reduce the detector jitter occurring during the destruction of the superconducting state. High bias currents also result in higher signal-to-noise ratio of the detector output pulses and are hence required for unambiguous pulse discrimination to avoid "false counts" triggered by electrical noise (Marsili et al., 2011, Nano Lett., 11(5): 2048-2053). In FIG. 7 the performance of a nanowire SSPD is shown in terms of output pulse amplitude and timing jitter. A repre-

TABLE 1

Detector performance as a function of device dimensions

| $w_{nw}$ (nm) | $l_{nw}$ (μm) | λ (nm) | Δα/Δl (dB/μm) | $\alpha_{tot}$ (%) | $DE_{oc}$ (%) | $NEP_{min}$ (W/Hz$^{1/2}$) | $DE_{oc}/(R_{dc}*\delta t)$ |
|---|---|---|---|---|---|---|---|
| 60 | 25 | 1542 | 0.23 | 73.4 | 36.5 | $8.8*10^{-20}$ | $2.8*10^{11}$ |
| 60 | 25 | 768 | 0.57 | 96.2 | 77.3 | $1.9*10^{-20}$ | $6.5*10^{12}$ |
| 60 | 40 | 1542 | 0.23 | 88.0 | 67.7 | $4.0*10^{-20}$ | $8.6*10^{11}$ |
| 75 | 40 | 768 | 0.71 | 99.9 | 80.1 | $2.1*10^{-20}$ | $6.4*10^{12}$ |
| 75 | 40 | 1542 | 0.33 | 95.2 | 52.5 | $7.1*10^{-20}$ | $3.4*10^{11}$ |
| 75 | 25 | 768 | 0.71 | 98.3 | 79.2 | $5.2*10^{-20}$ | $2.0*10^{12}$ |
| 75 | 25 | 1542 | 0.33 | 85.0 | 6.0 | $6.7*10^{-19}$ | $2.6*10^{10}$ |
| 90 | 25 | 768 | 0.91 | 99.5 | 29.7 | $2.6*10^{-19}$ | $1.9*10^{11}$ |
| 90 | 25 | 1542 | 0.47 | 93.3 | 0.4 | $1.1*10^{-17}$ | $1.5*10^{9}$ | sentative single shot trace normalized to the maximum of the averaged curve of the SSPD voltage output is shown in FIG. 7A. A fit to the average pulse shape shown in FIG. 7B (inset) reveals a time constants of $\tau_1$=223 ps for the rising edge and $\tau_2$=1.2 ns for the decay. A kinetic inductance of the NbTiN nanowire of $L_k=\tau_2*R_L$=0.75 nH/μm is thus inferred for an input impedance of $R_L$=50Ω (Kerman et al., 2006, Appl. Phys. Lett., 88(11): 111116). This value is lower than previous reports on NbN (Pernice et al., 2012, Nat. Comm., 3: 1325) and implies that GHz counting rates could be achieved by reducing the nanowire length. During the jitter measurements the detector trigger point is set to roughly half the output voltage pulse height where the maximum slope of 3.1 μV/ps (see FIG. 7B) is reached. Assuming an RMS noise voltage of 71 μV an instrument limited jitter of 53 ps is thus estimated.

For the experimental determination of the detector jitter picosecond laser-pulses are used and a reference trigger signal is derived by splitting off part of the pulses with a fiber optic coupler for detection with a 20 GHz O/E converter. A histogram of the arrival time of the SSPD output pulses relative to the reference signal is shown in FIG. 7C. For strongly attenuated laser pulses (<<1 photon/pulse arriving at the detector) and operation of the SSPD close to the critical current the FWHM of the jitter histogram is found from a Gaussian fit as 48.4 (+/−1.0) ps. Plotting the jitter histogram distribution on a logarithmic scale (see FIG. 7C) reveals a slight asymmetry of the histogram envelope with respect to the Gaussian fit. This is attributed to the increased probability for observing higher time delays of the SSPD output pulse to the asymmetric S-shape of the rising slope of the detectors voltage output. The asymmetry is a consequence of the convolution of the exponentially rising SSPD output pulse due to Joule heating with the fast cooling towards restoring the superconducting state and the instrument bandwidth limitations (6 GHz) of the setup. While the involved processes require a complex physical model and are not yet fully understood (Delacour et al., 2012, Nano Lett., 12(7): 3501-3506; Tarkhov et al., 2008, Appl. Phys. Lett., 92(24): 241112), these dynamics are accounted for herein by using the derivative of the measured pulse front (see FIG. 7B) as weighting function to the Gaussian fit of the jitter data. Including also a background noise term, the envelope of the histogram is able to be reproduced as shown in FIG. 7C, and a slightly higher SSPD jitter value of $\delta t$=51.5 ps is obtained, which is in good agreement with the estimated instrumentation limit.

It is noted that the jitter value realized here with a waveguide-coupled NbTiN SSPD is lower than those found for most waveguide single-photon detectors (Reithmaier et al, 2013, arxiv:1302.3807; Tanner et al., 2012, Nanotechnology, 23: 505201; Sprengers et al., 2011, Appl. Phys. Lett., 99) but still somewhat higher than what can be achieved with integrated NbN-on-Si nanowire SSPDs (Pernice et al., 2012, Nat. Comm., 3: 1325). Despite the fact that NbTiN has material properties which make it very attractive for low noise superconducting detector applications, the deposition techniques are not yet as thoroughly investigated as the far more widely used NbN thin films on silicon or sapphire substrates. In particular the stoichiometry of NbTiN is less understood compared to NbN. It is thus expected that the thin film quality of NbTiN samples can be further optimized which will result in higher critical current values, in turn leading to higher output pulse amplitudes and a reduced instrument limited jitter value.

Low-noise Single Photon Detection Using NbTiN Nanowires

Presented herein is the realization of low noise single-photon detection over an extended bias current range of the NbTiN-nanowires which allows for operating the SSPDs in a regime where wire defects or constrictions have less influence on the detector performance. Even at bias currents far below the critical current photon counting events can be clearly discriminated from electrical noise without the need for cryogenic amplifier stages due to the intrinsically high signal-to-noise characteristics of the SSPD output pulses. Although challenging in fabrication, engineering the detector dimensions at the nanoscale thus allows for very low noise equivalent power values under realistic measurement conditions. Such low NEP makes these detectors an ideal choice for implementations of photon-counting optical time-domain reflectometers (Eraerds et al., 2010, Lightwave Technol., 28(6): 952-964) and a broad range of quantum information protocols, particularly in quantum cryptography (Takesue et al., 2007, Nat. Photon., 1(6): 343-348; Gisin et al., 2002, Rev. Mod. Phys., 74(1): 145-195.)

All three crucial detector features—timing jitter, dark count rate and detection efficiency—can further be combined into one figure-of-merit $DE_{oc}/(R_{dc}*\delta t)$. For the NbTiN-nanowire SSPDs presented here values in the $10^{11}$-$10^{12}$ regime are obtained (see Table 1), emphasizing the advantages over other single-photon detector technologies (Hadfield, 2009, Nat. Photon., 3(12): 696-705) and previous results with NbN-SSPDs on Si-waveguides (Pernice et al., 2012, Nat. Comm., 3: 1325). A comparison of NbTiN-on-SiN detectors presented herein compared to NbN-on-silicon detectors is provided in Table 2 below.

TABLE 2

| Performance comparison of superconducting nanowire detector | | | |
|---|---|---|---|
| | Quantum efficiency | Dark count rate | Noise equivalent power |
| NbN on silicon | 91% | $10^{-3}$ Hz | $10^{-18}$ W/Hz$^{1/2}$ |
| NbTiN on SiN | 80% | $10^{2}$ Hz | $10^{-20}$ W/Hz$^{1/2}$ |

The data presented herein demonstrate the production and performance of waveguide coupled SSPDs with sub-Hz dark count rate all the way up to the critical current where low jitter and high on-chip single-photon detection efficiency are realized. The availability of such low noise detectors, readily integrated with visible and telecom wavelength optical circuitry opens up a broad range of quantum information and nanophotonic applications directly on-chip. Integrating low noise superconducting nanowire single-photon detectors with nonclassical light sources (Reithmaier et al, 2013, arxiv:1302.3807; Matsuda et al., 2012, Sci. Rep., 2: 817) and waveguide quantum circuits (Bonneau et al., 2012, Phys. Rev. Lett., 108, 053601; Bonneau et al., 2012, New J. Phys., 14: 045003) on a complementary metal oxide semiconductor compatible material system shows a promising route to full-scale optical quantum information processing on a monolithic and truly scalable platform.

Example 3

Matrix of Integrated Superconducting Single-Photon Detectors with High Timing Resolution Presented herein is a large grid of individually addressable superconducting single photon detectors on a single chip (Schuck et al., 2013, IEEE Trans on Applied Superconductivity, 23(3): 2201007). Each detector element is fully integrated into an independent waveguide circuit with custom functionality at telecom wavelengths. One chip contains a large number of detector designs which can all be individually addressed and characterized. On the same chip various waveguide circuits are also implemented, which are scalable to photonic on-chip networks. This allows each circuit to be equipped with application specific SSPD designs, optimized for particular detector benchmark parameters, e.g., detection efficiency, dark count rate, timing resolution, speed, etc. High device density is achieved by fabricating the nanowire detectors in traveling wave geometry directly on top of silicon-on-insulator waveguides. The superconducting single photon detector matrix includes detector designs optimized for high detection efficiency, low dark count rate, and high timing accuracy. As an example, the high timing resolution of a particularly short nanowire design is exploited to resolve individual photon round-trips in a cavity ring-down measurement of a silicon ring resonator.

To achieve small device footprint the optical waveguides are fabricated from silicon-on-insulator substrates. The high refractive index contrast of silicon waveguides on oxide substrate layers results in strong light confinement and thus allows for very compact circuit layouts.

The SSPDs are realized as NbN nanowires patterned directly on top of the waveguides. This traveling wave design (Hu et al., 2009, IEEE Trans. Appl. Supercond., 19(3): 336-340; Sprengers et al., 2011, Appl. Phys. Lett., 99(18): 181110-1-181110-3) allows for achieving very large interaction length of an incident photon with a nanowire. Traditional meander-type detectors absorb incident photons in a thin-film of a few nanometer height under normal incidence. In the travelling wave design instead, incoming light is coupled to the NbN-film along the length of the nanowire (tens of micrometers) leading to significantly increased absorption for much shorter overall wire length as compared to a meander-type SSPDs. The detection mechanism happens on picosecond timescales and is highly efficient (Gol'tsman et al., 2001, Appl. Phys. Lett., 79(6): 705-707). In this case high photon absorption efficiency therefore directly translates to an increase in on-chip detection efficiency (OCDE).

Here it is also demonstrated how to exploit the high timing accuracy of the detectors to observe ballistic photon transport in cavity ring-down measurements. Variable photon delay on-chip, as demonstrated here with Si-microring resonators, has interesting applications in feed-forward schemes (Bonneau et al., 2012, Phys. Rev. Lett., 108(5): 053601-1-053601-5) and for photon number resolving detection (Divochiy et al., 2008, Nat. Photon., 2(5): 302-306).

Waveguide Integrated SSPD-Matrix

Device Layout

In the presently described layout, a single chip accommodates 240 SSPDs organized in 20 columns and 12 rows of devices which can all be addressed individually. FIG. 8A shows an optical micrograph of a section of such a detector-grid. A single element of the SSPD-matrix used for detector characterization is shown as an inset in FIG. 8A. It comprises three main components: optical grating couplers, balanced waveguide splitters and a nanowire SSPD, all connected by low-loss waveguides.

The optical grating couplers (FIG. 8B) are used to couple light from a fiber array into the single-mode waveguides on the chip and vice versa. By adjusting the grating period and filling factor the coupling efficiency is optimized for a given wavelength. On each chip up to five different grating coupler designs are included, for center wavelengths in the 1520-1570 nm range with a bandwidth of about 30 nm each. These grating couplers are optically reciprocal devices, i.e., the coupling loss at the input- and output ports is designed to be identical, which is confirmed on separate calibration coupler devices. To confirm correct coupler operation, all devices were prescreened and discarded in case they show transmission behavior deviating significantly from the set (>100) of reference calibration couplers. The coupler transmission of each individual device under test is then calibrated independently by using a reference output in every circuit. This calibration procedure is repeated for all measurement runs to precisely determine the number of photons propagating inside the waveguide towards the detector. A typical grating coupler shows a coupling loss of −13 dB at the wavelength of maximal transmission for this design.

A 50:50 waveguide splitter (FIG. 8C) is used to route the light in equal parts from the input to the reference output and the SSPD. Such splitter devices are a standard component of the nanophotonic toolbox and yield the desired intensities at the output within 0.2 dB around 1550 nm. Both splitting ratio and splitter loss have previously been evaluated in Mach-Zehnder interferometers exhibiting interference with 33 dB extinction and no discernible loss (Li et al., 2008, Nature, 456(7221) 480-484; Li et al., 2009, Nat. Photon., 3(8): 464-468).

The SSPD is a single U-shaped NbN-nanowire patterned directly on top of a waveguide (FIG. 8D). Each end of the wire is connected via triangular NbN strips to large electrode pads. These pads are made of a 200 nm gold layer on top of a 5 nm Cr adhesion layer defined in an electron beam lithography step and subsequent lift-off process. Electrical contact with the electrodes is established via an RF probe to current bias the nanowire and for readout. In the SSPD-matrix twelve different detector designs are employed with varying nanowire widths (70-100 nm) and total lengths (20-80 μm). For an absorption rate of 1 dB/μm of the U-shaped NbN thin-film on top of a Si-waveguide (determined in a separate transmission measurement with 100 nm wire width) all detectors achieve long interaction length while maintaining small device footprint.

Measurement Setup

Figure 9:
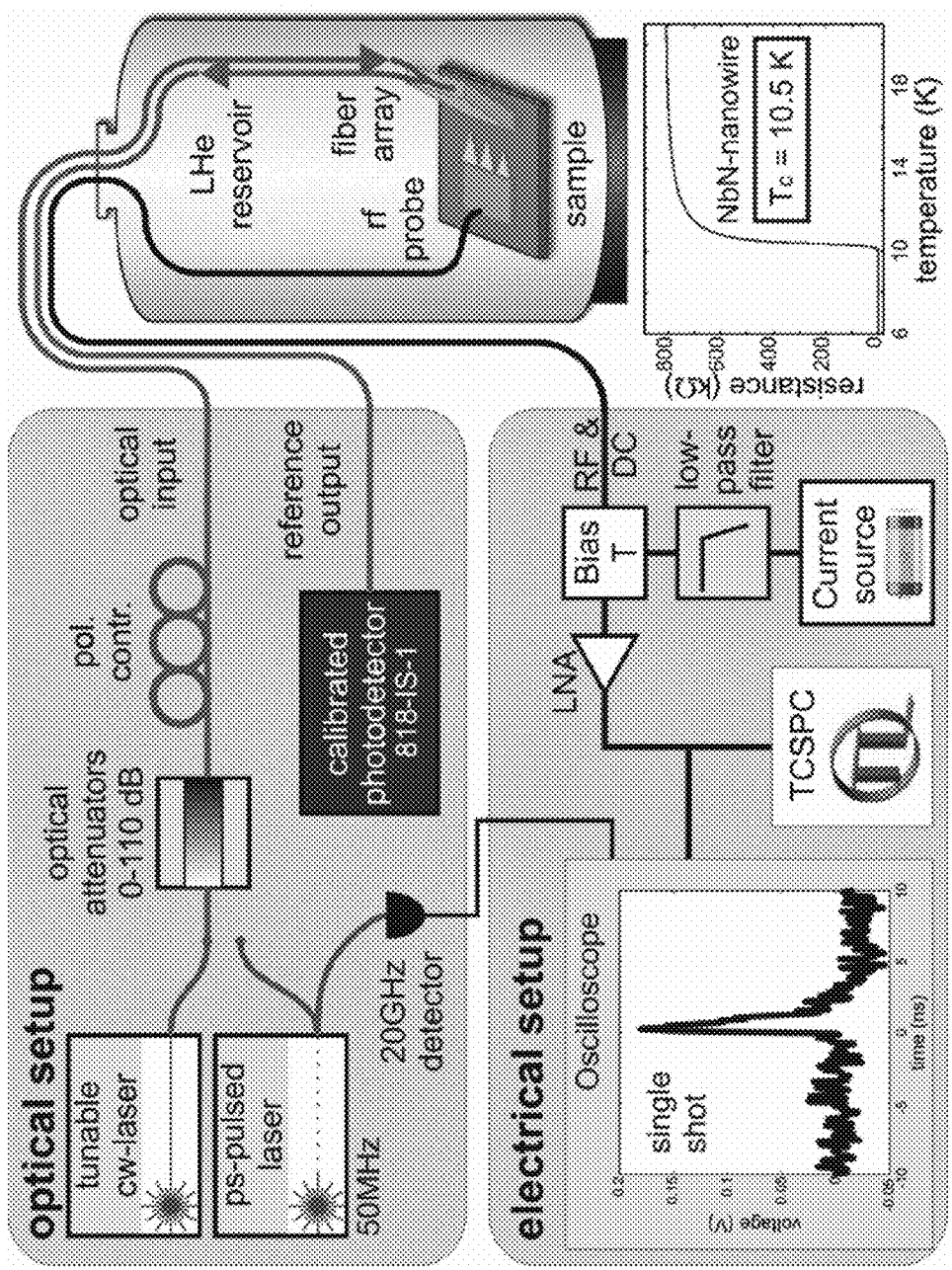
FIG. 9 depicts an exemplary measurement setup. The sample is mounted in a liquid helium cryostat and can be optically and electrically addressed via a fiber array and an RF probe, respectively. The fabricated nanowire devices typically show a critical current of 10.5 K. Optical setup: continuous wave or picosecond-pulsed laser sources (optionally) launch light via calibrated, adjustable optical attenuators into the optical input of a liquid helium cryostat. The optical output is detected with a calibrated photodetector; electrical setup: a current source (battery powered) supplies the bias current for the SSPD; the output pulses (see oscilloscope inset) are amplified with broadband, low-noise amplifiers (LNA) and registered either with a high-bandwidth oscilloscope or a time correlated single photon counting system (TCSPC, PicoQuant).

The measurement setup is illustrated in FIG. 9. Light from a tunable laser source or alternatively from a pulsed laser source is optically attenuated to provide a pre-determined photon flux. The optical attenuators are carefully calibrated both at typical laser output levels (0-10 dBm) using a calibrated photodetector as well as at single photon levels using a single-photon detector module (id200 by IDQ). The sample is mounted inside a He4-flow cryostat, which allows for reaching temperatures down to 1.4 K. The attenuated light is coupled into the device using a single mode optical fiber array, which provides eight optical input/output ports for simultaneous excitation and readout. Light collected at the reference port is recorded with a calibrated photodetector. The number of photons arriving at the detector is then determined from the transmission through the device (grating coupler calibration at the reference port), taking into account the waveguide splitter and the external attenuation.

Electrical connection is established with a multi-contact RF probe. The nanowires are current-biased with a low-noise (battery-powered) current source. The recorded signal is amplified by two stages of electrical amplifiers and analyzed either with a time-correlated single photon counting module or a fast digital oscilloscope.

The fiber array and RF probe in the current setup allows for simultaneously addressing two neighboring devices in the matrix at a time. Other devices are reached by repositioning the sample with respect to the fibers (RF probe) using low-temperature compatible translation stages. Thus, a large number of fabricated devices are able to be screened for their photon detection efficiency, dark count rate as well as their timing performance. Note that simultaneous operation of a larger number of devices on this chip can be achieved using existing RF-probes and fiber arrays with more elements.

The work presented herein is directed to the integration of highly efficient single photon detectors with optical waveguides. Hence, the main focus lies on optimizing the coupling of light traveling inside a waveguide to the nanowire detector for efficient absorption as desired in fully integrated photonic circuit applications. The on-chip detection efficiency measured here should therefore not be confused with the system detection efficiency usually quoted for stand-alone SSPDs. In case more efficient coupling from an optical fiber into the waveguide was desired it is possible to adapt the grating coupler design for higher efficiency (less than 1 dB loss) at the cost of a somewhat less robust fabrication procedure (Taillaert et al., 2004, Opt. Lett., 29(23): 2749-2751).

In the described measurement configuration appreciable levels of stray light are not detected with these detectors. To evaluate the influence of background light during measurement conditions it is confirmed that the detector count rate drops to the dark count level (i.e., no incident light) once the fiber array is displaced with respect to the grating couplers. Optical cross-talk between neighboring devices (250 μm separation) is analyzed by launching light into one device while monitoring the count rate of its neighboring detector which sees no input light otherwise. Again, no increase from the dark count level is observed unless the input power is increased by at least 30 dB. Stray light photons coupled into the substrate or reflected off the chip into the sample chamber only have a negligible chance to strike one of the detectors due to their tiny device footprints.

Device Fabrication and Surface Morphology

The devices are fabricated from silicon-on-insulator substrates (SOITEC) with a 110 nm silicon top layer on a buried oxide layer of 3 μm thickness. A 3.5 nm NbN thin-film is then deposited on the wafer using DC magnetron sputtering. The electrode pads and alignment marks for subsequent layers are defined in a first electron beam lithography (ebeam) step using PMMA as a lift-off resist. In a second ebeam step hydrogen silsesquioxane (HSQ) resist in 3% concentration is employed to define the nanowire detectors with high resolution. Following the development, carefully timed reactive ion etching (RIE) in CF4 chemistry is used to remove the exposed NbN thin-film without attacking the silicon layer underneath. In a third and final ebeam lithography step the waveguide circuits are then patterned using HSQ in 6% concentration. The resulting resist thickness is sufficient to hold up during the subsequent RIE and inductively coupled plasma etching step in a chlorine atmosphere.

Figure 10:
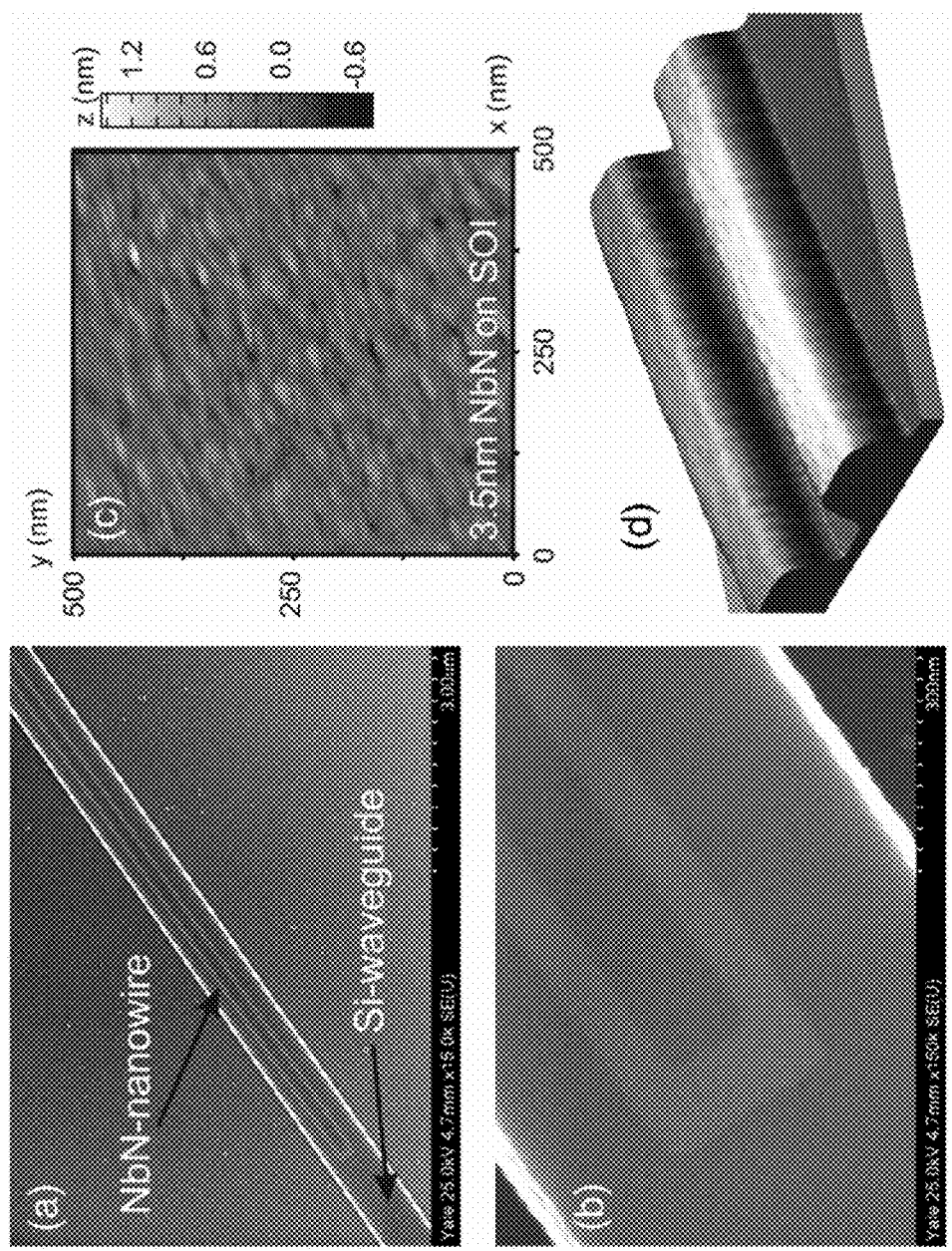
FIG. 10, comprising

The fabricated nanowire detectors are shown in FIG. 10. High-resolution scanning electron microscopy (SEM) images reveal an alignment accuracy better than 50 nm of the NbN-nanowire (85 nm wire width shown in FIG. 10B) on top of the 750 nm wide Si-waveguide. Note that the nanowire is buried under the HSQ masking layer which remained after etching. A large number of devices are inspected for wire uniformity and lateral defects that are significant compared to the nanowire dimensions are not found. In order to assess the thickness uniformity of the film high-resolution atomic force microscopy (AFM) is performed. As a reference, the surface roughness of the bare SOI-substrate is measured and an RMS value of 1.1 Å is obtained. After sputter deposition the AFM scan (see FIG. 10C) was repeated and an average RMS surface roughness of 1.6 Å was found, indicating that the NbN thickness variations do not exceed a few percent. The absolute value of the NbN film thickness (3.5-4 nm) was determined from calibrated deposition rate measurements which were independently confirmed by transmission electron microscopy. FIG. 10D shows an AFM scan of a nanowire section after the second lithography step. A layer of HSQ resist protects the NbN thin film from degrading during subsequent nanofabrication steps. From the SEM and AFM inspections it is demonstrated that the NbN nanowires are highly uniform both in lateral and medial dimensions.

Detector Performance

An ideal nanowire SSPD should feature high detection efficiency, low noise, high speed and short timing jitter. However, often high performance in one of these disciplines comes at the cost of another. Here various detector geometries are available within the SSPD-matrix to achieve a wide variety of performance characteristics. In this way different on-chip detector requirements can be optimally addressed by choosing the corresponding detector design: while quantum cryptography protocols require detectors with very low dark count rate, detector speed and efficiency may be a bigger concern in photon correlation experiments.

Figure 11:
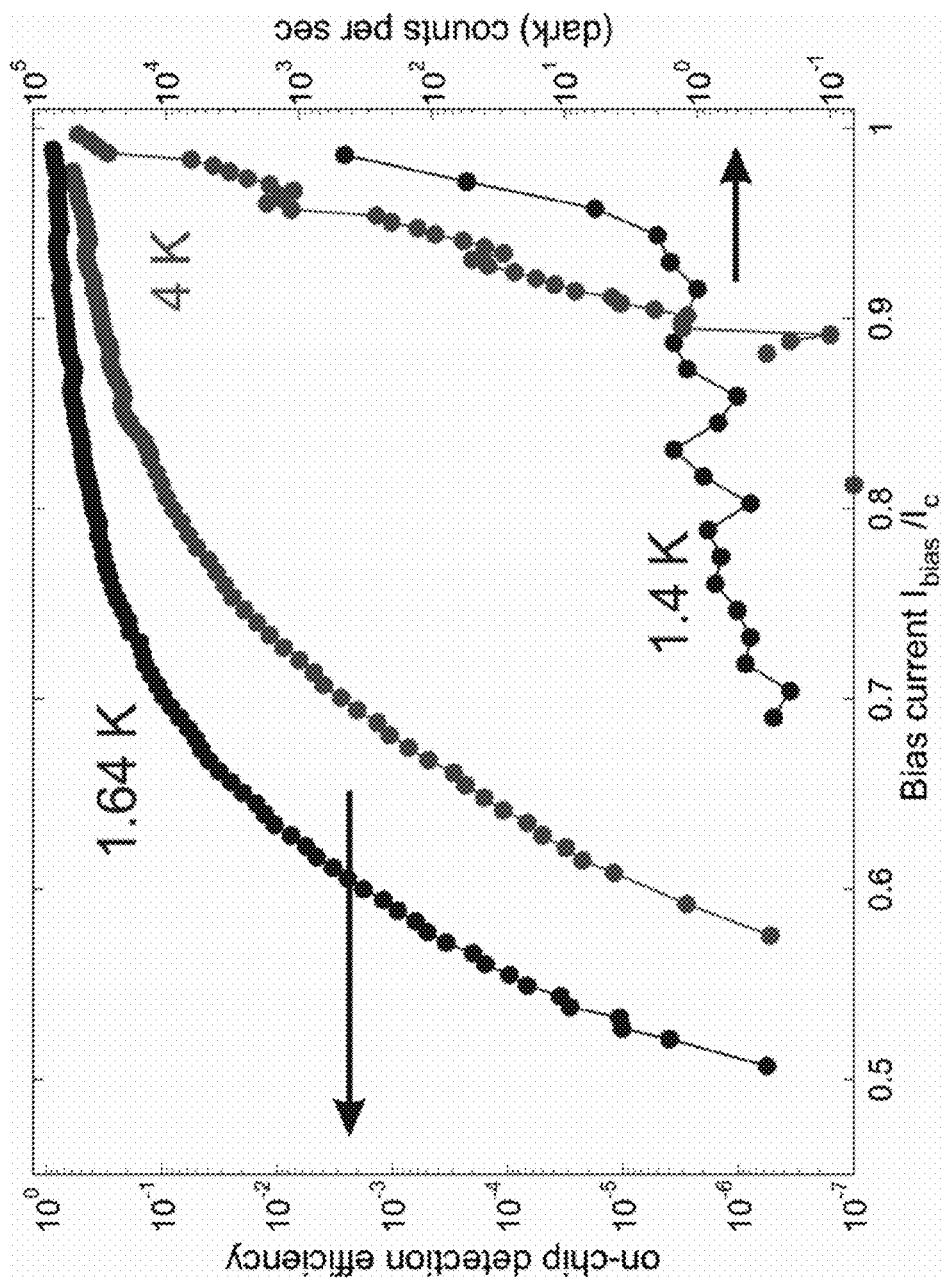
FIG. 11 depicts the measured detection efficiency and dark count rate for a 70-nm-wide and 80 μm-long detector device measured at 1.4, 1.64, and 4 K. At 1.64 K, a detection efficiency of 88% was found when the detector is biased close to $I_c$, which decreases to 59% at 4 K.

In FIG. 11 the results for a 70 nm wide and 80 μm long SSPD is presented, which has high performance in terms of on-chip detection efficiency reaching a maximum value of 88% (+/−5.9%) when operated at 1.64 K. The error value reflects the uncertainty of the absolute photon number arriving at the detector considering the contributions from all external and on-chip photonic components. Due to its small wire width the detector reaches high efficiency already when biased significantly below its critical current. This plateau behavior is characteristic of detectors with extremely narrow wires where the size of the hotspot originating from photon absorption approaches the nanowire width. In accordance with previous reports the onset of such a plateau is observed herein at 1.64 K for telecom wavelength photons (FIG. 11). A more pronounced plateau has only been observed with ultranarrow nanowires but not for wider nanowires (Marsili et al., 2011, Nano Lett., 11(5): 2048-2053). Note, that the high absolute on-chip detection efficiency is a result of the travelling wave design used here, allowing for very efficient absorption of photons, rather than increased quantum efficiency.

In terms of dark count rate the performance of this device is reasonable with 450 Hz at 1.4 K when biased at 99% of the critical current. Lower rates are typically found in wider and shorter wires which however did not reach equally high detection efficiency (for comparison a 85 nm wide, 60 μm long device with 50 Hz dark count rate reaching 55% detection efficiency is reported). The performance was also examined close to the LHe temperature at 4 K and it was found that the expected increase of dark count rate accompanied by a reduction of the on-chip detection efficiency to 59%.

Since this device is one of the longest ones in the matrix it has much higher kinetic inductance than shorter detectors resulting in a decay time of 1.4 ns. For high speed applications it will thus be advantageous to use the shortest detectors (20 μm in total length) in the matrix reaching 455 ps decay time.

Figure 12:
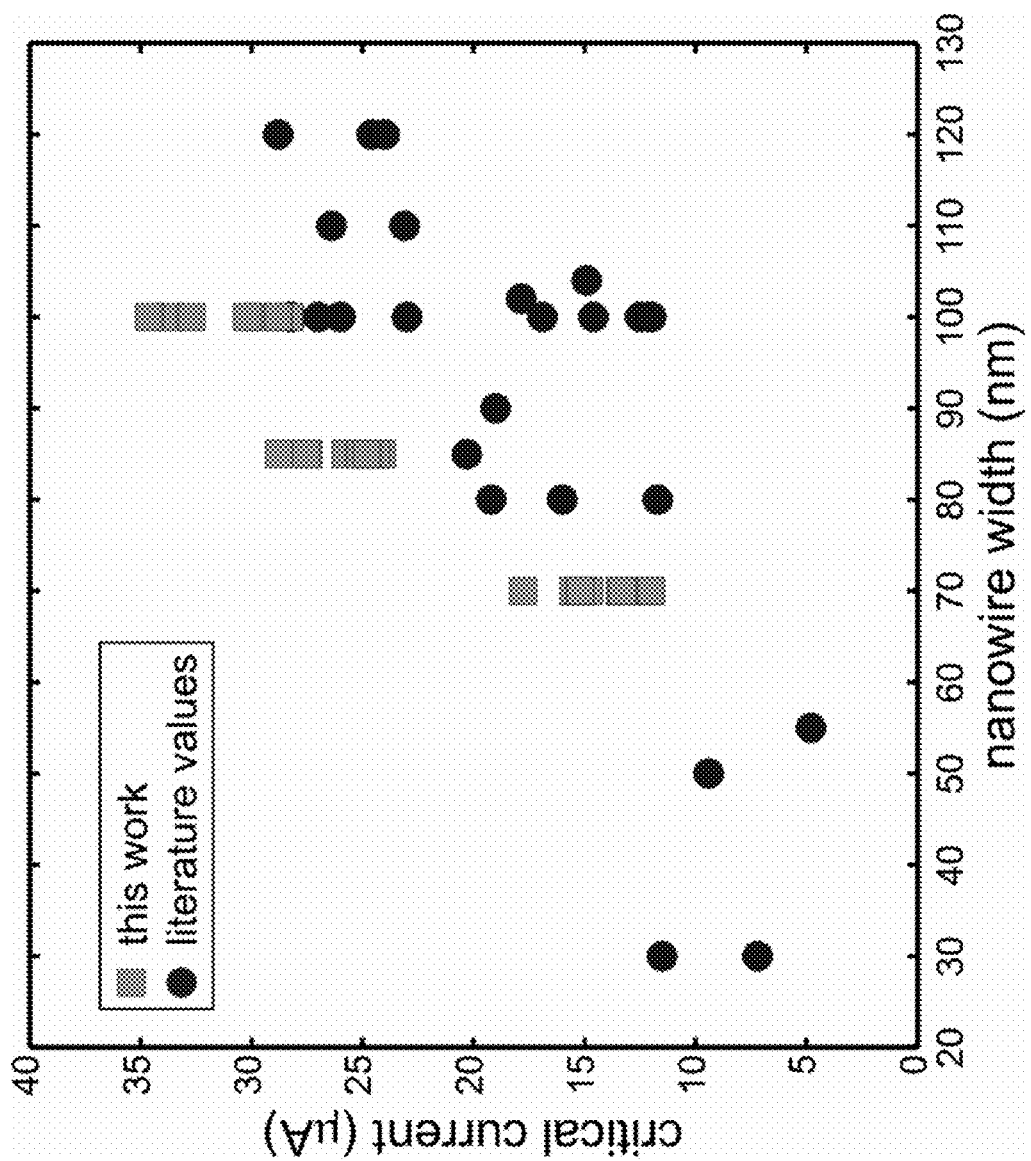
FIG. 12 depicts the typical critical current values measured for SSPDs with nanowire widths of 70, 85, and 100 nm (squares). For comparison, critical current values were plotted for NbN-nanowire SSPDs reported in the literature (dots). For similar nanowire dimensions, the devices of the present invention generally show higher critical current values than previously reported meander-type devices.

Furthermore, a large number of detectors were characterized in terms of critical current for the 1.4 K to 4 K temperature range. Generally high critical currents are desirable because it allows for operating the SSPD at higher bias current yielding higher output pulse amplitudes. Since the amplitude of the electrical noise is not affected by the bias current, higher signal-to-noise ratios are achievable at high bias current. The critical current of nanowires with different wire widths was estimated by measuring their switching current. The results are shown in FIG. 12 where the present devices are also compared to critical current values reported in the literature for state-of-the-art NbN-nanowire detectors. For the present devices high switching values are observed, which allow for their operation in the high signal-to-noise regime where pulse discrimination is possible without sacrificing detection efficiency. These results compare favorably with values measured in meander-type SSPDs which is attributed to the reduced length of the present devices. The high observed critical current values also support the demonstration of high nanowire uniformity drawn in the previous section since constricted devices should switch to the normal state at lower bias currents.

On-chip Photon Delay

Figure 13:
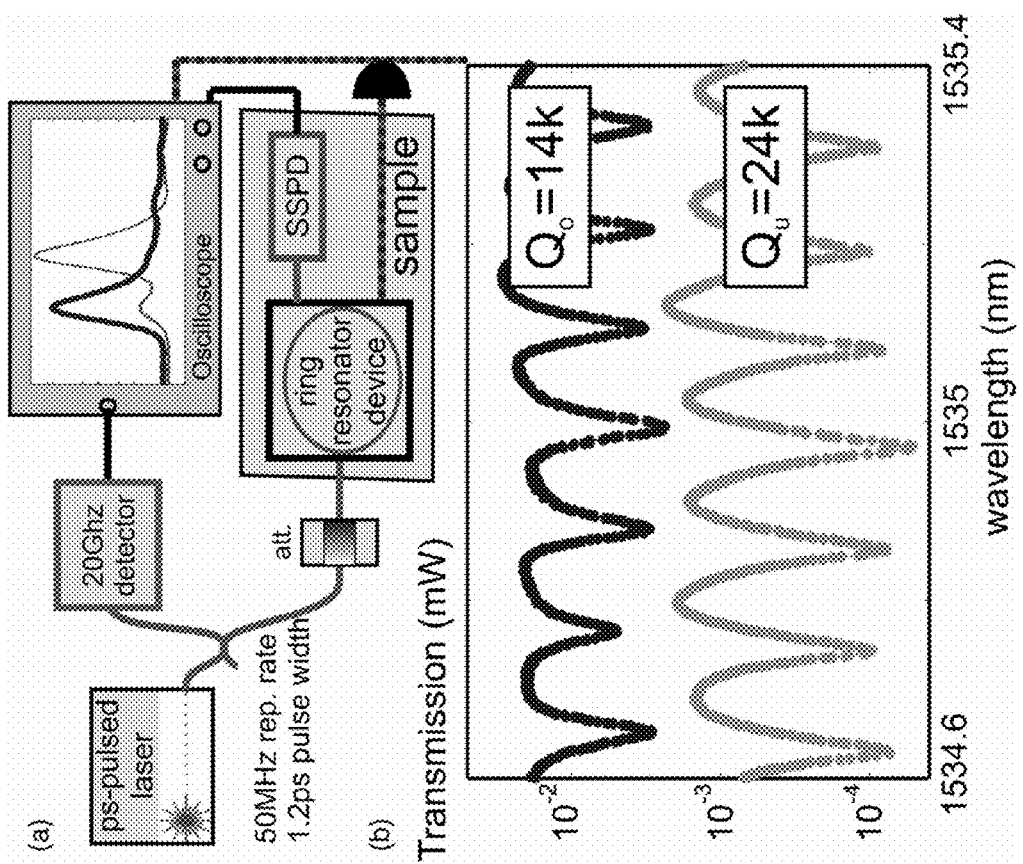
FIG. 13, comprising

To demonstrate the potential of waveguide integrated SSPD grids for custom functionality on-chip photon delay was examined. For this purpose, the matrix includes SSPDs with particularly high timing accuracy at the output of microring resonator devices. These detectors are used to perform cavity ring-down measurements resolving individual photon round-trips. The measurement setup is shown in FIG. 13.

The microring resonators couple evanescently to the waveguide leading to the detection region. By varying the gap between waveguide and cavity the optical coupling strength can be adjusted, allowing the ring to be operated in either the under- or overcoupled regime. Typical transmission spectra measured in the through port of the device are shown in FIG. 13B, illustrating the features of whispering-gallery resonances with optical quality factors on the order of a few tens of thousands. The free-spectral range of the resonator is small, because the length of the ring was chosen as 5.8 mm in order to provide a cavity roundtrip time exceeding the detector jitter.

A. Jitter Measurement

Figure 8:
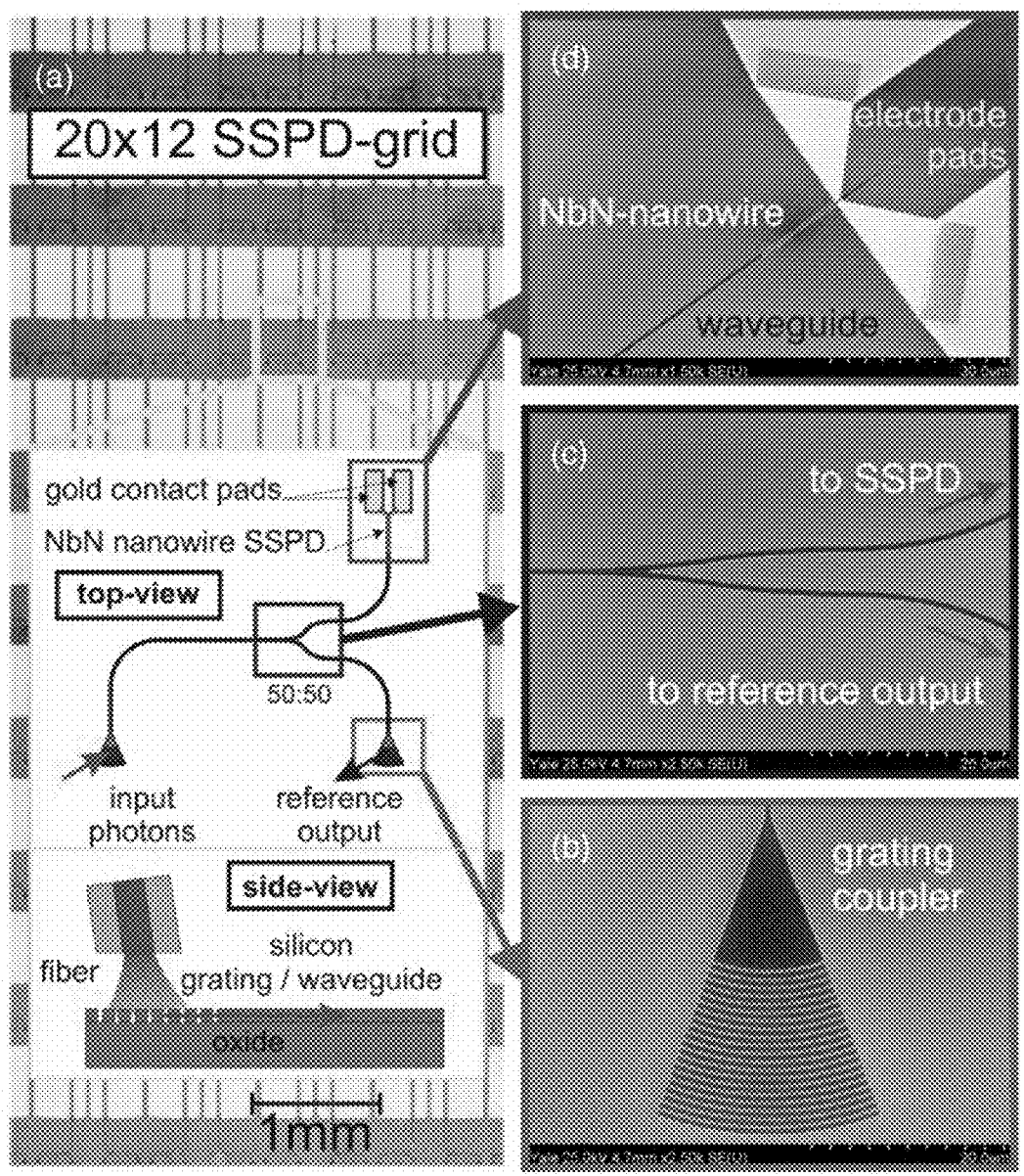
FIG. 8, comprising

In a first step the timing performance of a 20 μm long, 100 nm wide nanowire detector was characterized in a waveguide circuit similar to the one shown in FIG. 8. In order to resolve the intrinsic detector jitter a picosecond pulsed laser (Pritel), a 20 GHz bandwidth InGaAs photodetector (Agilent 83440) and a 20 GSa/s digital oscilloscope with 6 GHz real-time bandwidth (Agilent 54855A infiniium) are employed. As shown in FIG. 13, the pulsed laser output is split into two arms. The pulses in the upper arm are detected with the 20 GHz detector to provide a reference to the oscilloscope. This trigger signal is then compared to the SSPD output pulses after detecting a photon from a strongly attenuated pulse coupled into the sample chip via the lower arm. Running the oscilloscope in histogram mode allows for jitter measurements with true picosecond time resolution. Using the 20 GHz detector reference trigger as a start signal, the histogram is filled with stop signals triggered at the point of the maximum slope of the SSPD pulses (8 μV/ps before amplification). Using electrical amplifiers of more than 10 GHz bandwidth a SSPD jitter value of 18.4 ps is found by fitting the histogram distribution with a Gaussian function. In this case the intrinsic instrument jitter is limited by the oscilloscope bandwidth of 6 GHz.

B. Cavity Ring-Down for Ballistic Photons

Experiments were conducted using a ring resonator device allowing for the examination of its ring-down behavior in the time domain. Considering a resonator with a ring down time $\tau_0$ larger than the pulse width $T_p$ of the picosecond laser the pulses have to be treated as ballistic particles inside the resonator. Hence, the optical power circulating inside the cavity does not build up. A pulse of input intensity $I_{in}$ launched into the device will couple to the resonator and emerge in the through port as a train of pulses separated by the cavity round trip time, see FIG. 14. After passing the resonator the leading pulse will have an intensity $I_0=t^2 I_{in}$, where t is the transmission coefficient. Similarly, the intensity of subsequent pulses emerging from the through port can be written as $I_n=(1-t^2)^2 t^{2n-2} e^{-\alpha nL} I_{in}$, where L is the cavity circumference and a describes the linear absorption inside the cavity, which is small for high optical quality factor resonators.

To achieve the $\tau_0 > T_p$ condition for the ballistic photon case, ring resonators with circumference of 5.8 mm are utilized, giving rise to round-trip time of 73 ps—larger than both the detector jitter of 18.4 ps and 1.2 ps laser pulse duration.

Two cases are considered, an undercoupled and an overcoupled resonator.

C. Overcoupled Resonator

Figures 14A, 14B:
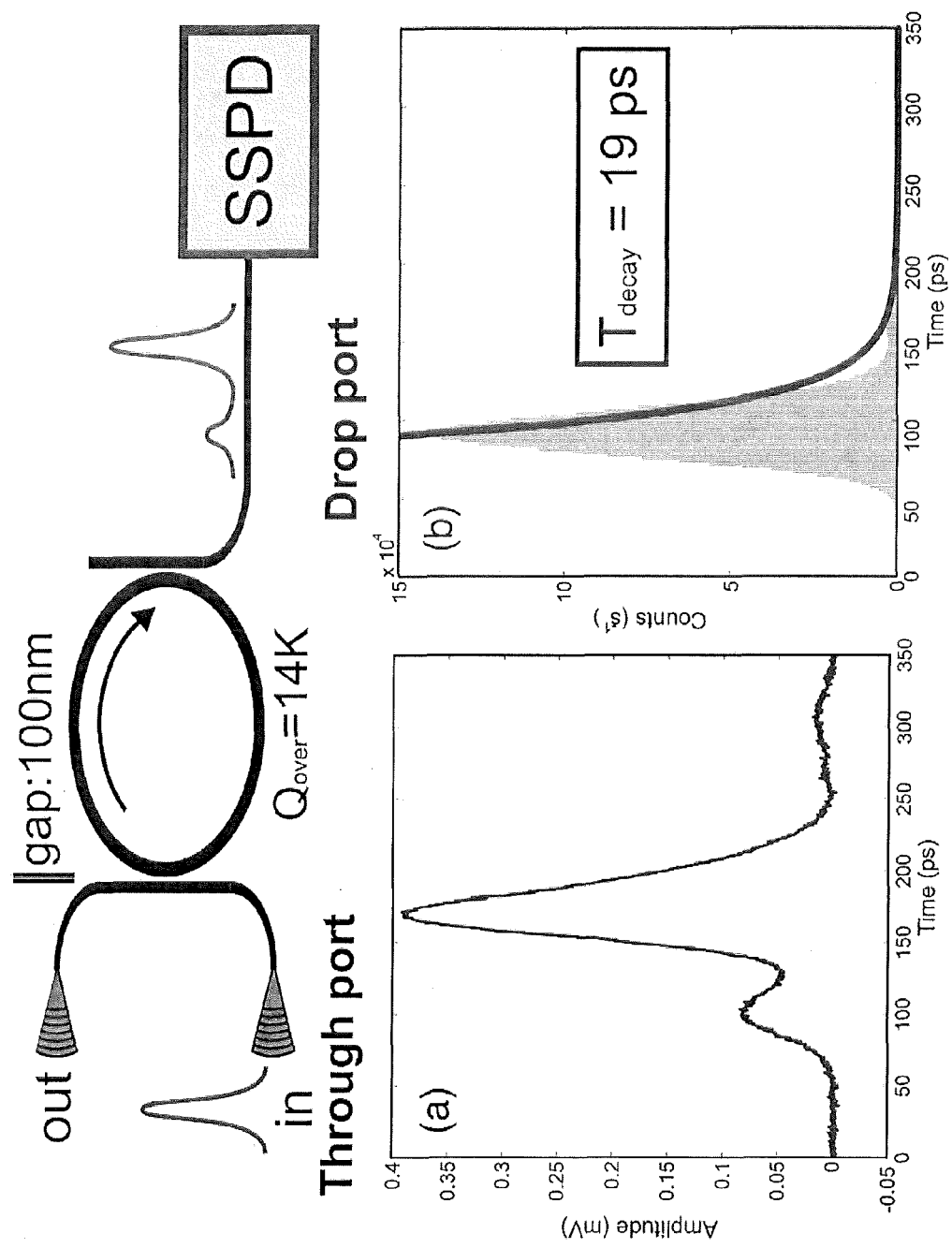
FIG. 14A through FIG. 14D, depicts ballistic transport measurement. Top: ring resonator in the overcoupled case (100 nm gap); Bottom: undercoupled case (200 nm gap).

To realize the overcoupled case the pulsed laser is launched into a device with 100 nm gap between the microring and the waveguides in the through and drop ports, see FIG. 14 (top). Here the transmission coefficient is small and the majority of the light is coupled from the feeding waveguide directly into the resonator. Hence, the leading pulse emerging from the through port has smaller amplitude than the first pulse coupled out after one round-trip (FIG. 14A).

The SSPD, with the same dimensions as the one used in the jitter measurement, is then employed to record the time-domain traces in the drop port. The detector is biased at 86% of the critical current which yields fair detection efficiency (15%) at dark count rates below 1 Hz. FIG. 14B shows the fast decay of photons in the ring resonator which are efficiently coupled out already after just one round-trip such that only two peaks are clearly discernible. A cavity decay time of 19 ps is extracted from an exponential fit to the data in the overcoupled case, corresponding to an optical quality factor of 11 900.

For comparison the optical quality factor of the resonator is also determined from optical transmission spectra recorded at the through port using a tunable laser source. The spectrum shown in FIG. 13B (upper curve) exhibits optical resonance dips separated by a small free spectral range corresponding to the large ring circumference. A Lorentzian fit yields a quality factor of 14 000 in good agreement with the value extracted from the cavity decay.

D. Undercoupled Resonator

Figures 14C, 14D:
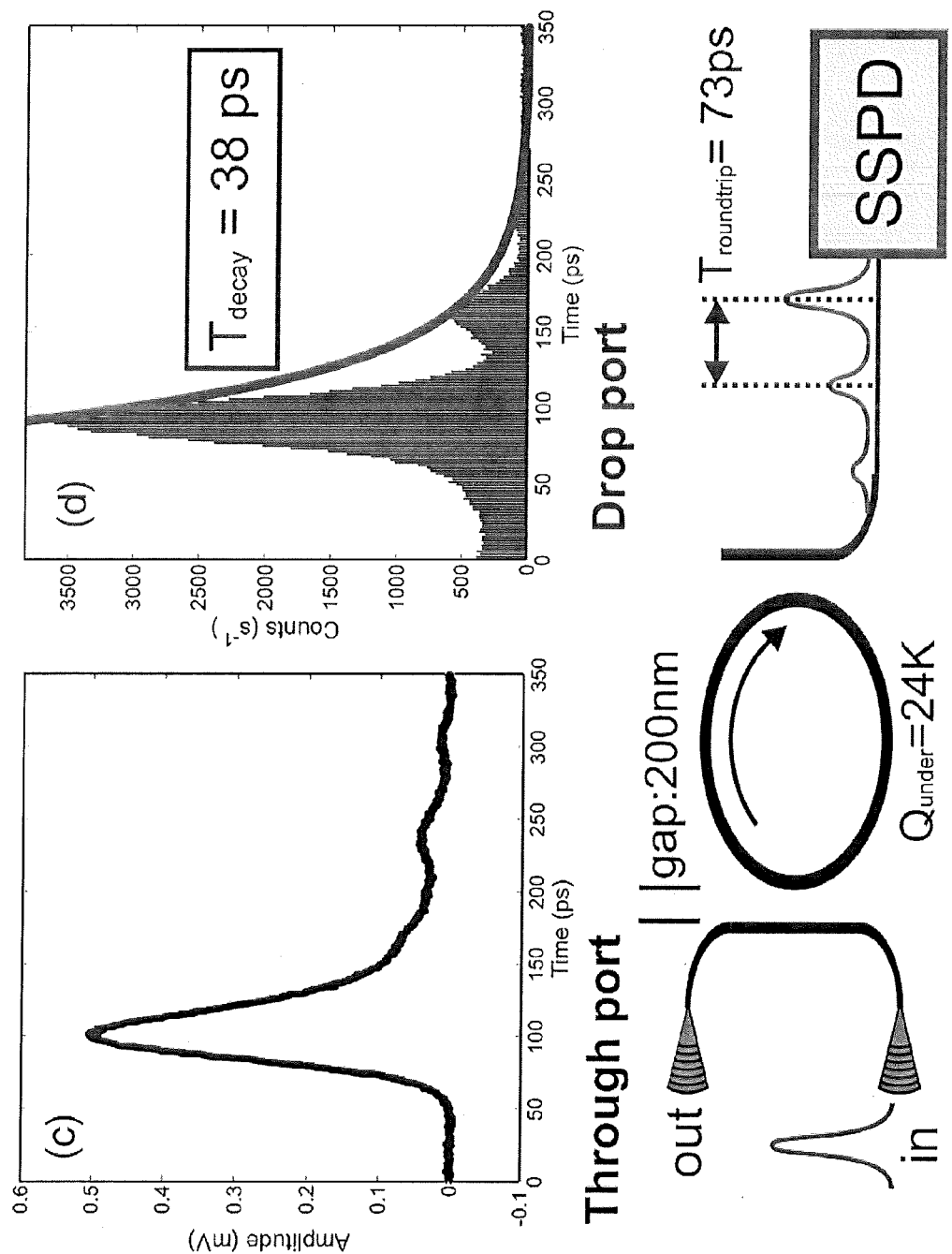

The undercoupled case is realized in a microring device with 200 nm coupling gap such that less light is coupled from the feeding waveguide into the ring resonator, see FIG. 14 (bottom). Otherwise the measurement configuration is the same as before (FIG. 13). Here the transmission coefficient is large and most of the light is directly transmitted in the through port leading to large intensity of the leading pulse (FIG. 14C). On the contrary the light which entered the cavity now decays much slower from the cavity and longer pulse trains in the drop ports are observed as shown in FIG. 14D. The separation of the pulses again confirms the cavity round-trip time of 73 ps. An exponential fit to the four observed pulse fronts yields a cavity decay time of 38 ps for the undercoupled case, corresponding to an optical quality factor of 23 000.

For comparison transmission spectra are recorded in the through port and optical resonances with quality factors of 24 000 are found, in good agreement with the cavity decay time.

Integrated SSPD Grid

Demonstrated herein is a grid of SSPDs fully embedded with waveguide circuits on a silicon platform. Manufacturing waveguide integrated SSPDs in such large grids offers the possibility to use this platform as a test-bed for detector development as well as for photonic circuit characterization. The chip contains a large variety of detector geometries and waveguide designs optimized for application specific functionality. The individually addressable detectors show optimal performance for example in terms of high on-chip detection efficiency (88%), or low dark count rate (<100 Hz), or high timing resolution (<20 ps), or combinations thereof. The integration of nanophotonic circuits with large numbers of customizable detector designs on a scalable platform allow for satisfying many of the needs of the quantum information and photonics community (O'Brien, 2007, Science, 318(5856): 1567-1570).

As an example how a photonic circuit can be optimally characterized using a tailor-made detector design time-domain multiplexing in microring resonators were examined. Individual cavity round-trips of strongly attenuated optical pulses are resolved. It is expected that reducing the propagation loss (Bauters et al., 2011, Opt. Exp., 19(24) 24090-24101) brings on-chip photon buffering, feed-forward schemes (Bonneau et al., 2012, Phys. Rev. Lett., 108(5): 053601-1-053601-5) and photon number resolving detection (Divochiy et al., 2008, Nat. Photon., 2(5): 302-306; Achilles et al., 2003, Opt. Lett., 28(23): 2387-2389) within reach.

Example 4

Optical Time Domain Reflectometry with Low Noise Waveguide-coupled Superconducting Nanowire Single-photon Detectors Optical time domain reflectometry over 200 km of optical fiber is demonstrated herein using low-noise NbTiN superconducting single-photon detectors integrated with Si3N4 waveguides. The small detector footprint enables high timing resolution of 50 ps and a dark count rate of 3 Hz with unshielded fibers, allowing for identification of defects along the fiber over a dynamic range of 37.4 dB. Photons scattered and reflected back from the fiber under test can be detected in free-running mode without showing dead zones or other impairments often encountered in semiconductor photon-counting optical time domain reflectometers.

Optical time domain reflectometry (OTDR) is an efficient, nondestructive technique to diagnose the physical condition of an optical fiber in situ (Barnoski and Jensen, 1976, Appl. Opt., 15: 2112; Barnoski et al., 1977, Appl. Opt., 16: 2375; Eraerds et al., 2010, Lightwave Technol., 28: 952). By launching laser pulses into the fiber and detecting the returning light from reflecting and scattering sites, it is possible to get information about attenuation properties, loss and refractive index changes in the fiber-under-test (FUT) (Derickson, 1998, Fiber Optic Test and Measurement, Prentice Hall.). Defects in the fiber-link can be localized with high spatial resolution over distances of more than a hundred kilometers by analyzing the returning optical signal in the time-domain. The achievable measurement range and two-point resolution of an OTDR system crucially depend on the detector used to monitor the weak backscattered signal. With increasing distance the light scattered or reflected along the FUT suffers from stronger attenuation and eventually reaches the detector noise level. Hence, the sensitivity of an OTDR system is determined by the noise equivalent power (NEP) of the detector which ultimately limits the measurement range.

Most commercial fiber-link characterization systems employ linear detectors, for example, p-i-n or avalanche photodiodes (APDs). This mature technology is well suited for in-field measurements. However, conventional OTDR systems are fundamentally limited by the bandwidth dependence of the NEP for linear photodetectors: high two-point resolution requires high receiver bandwidth which in turn reduces the OTDR sensitivity because the detector (amplifier) noise is proportional to the square-root of its bandwidth (Wegmuller et al., 2004, Lightwave Technol., 22: 390; Healy, 1984, Opt. Quantum Electron., 16: 267). The competitive relation between resolution and measurement range therefore critically limits their suitability for monitoring an increased number of passive optical components and longer fiber distances with high resolution as, e.g., in next generation optical access networks.

Higher sensitivity can be achieved in photon-counting (ν) OTDR, employing single-photon detection techniques. The main advantage of ν-OTDR systems over their conventional counterparts stems from the lower NEP of single-photon detectors as compared to linear detectors, resulting in larger dynamic range and higher two-point resolution (Eraerds et al., 2010, Lightwave Technol., 28: 952; Healy, 1984, Opt. Quantum Electron., 16: 267). Such ν-OTDR schemes have been demonstrated with InGaAs/InP APDs operated in Geiger-mode (Eraerds et al., 2010, Lightwave Technol., 28: 952; Wegmuller et al., 2004, Lightwave Technol., 22: 390), using silicon photon-counting modules in combination with telecom to visible frequency up-conversion (Diamanti et al., 2006, Opt. Lett., 31: 727; Legre et al., 2007, Opt. Express, 15: 8237), and with nanowire-meander superconducting single photon detectors (SSPDs) (Hu et al., 2012, Lightwave Technol., 30: 2583; Fujiwara et al., 2010, Opt. Express, 18: 22199). APDs suffer significantly from various detection noise mechanisms, namely, afterpulsing (Eraerds et al., 2010, Lightwave Technol., 28: 952), charge persistence (Wegmuller et al., 2004, Lightwave Technol., 22: 390), and memory effects (Dalla Mora et al., 2012, Appl. Phys. Lett., 100: 241111), which degrade the signal and result in dead zones. Their use in ν-OTDR systems therefore relies on (rapid) gating and complex signal control systems. SSPDs on the other hand can be operated in free running mode and combine low NEP at telecom wavelengths with high timing resolution (Hadfield, 2009, Nat. Photonics, 3: 696; Gol'tsman et al, 2001, Appl. Phys. Lett., 79: 705; Pernice et al., 2012, Nat. Commun., 3: 1325), which has previously been exploited for quantum key distribution (Takesue et al., 2007, Nat. Photonics, 1: 343) and time-of flight ranging (Warburton et al., 2007, Opt. Lett., 32: 2266; Tanner et al., 2011, Appl. Phys. Lett., 99: 201110).

Demonstrated herein is a ν-OTDR system using a low-noise waveguide-coupled superconducting nanowire single-photon detector in travelling wave geometry (Schuck et al. 2013, Appl Phys Lett, 102: 191104). Low dark count rates are achieved by fabricating niobium titanium nitride (NbTiN) nanowires with a minimized footprint directly on top of a waveguide. NbTiN is chosen for its low noise SSPD performance (Dorenbos et al., 2008, Appl. Phys. Lett., 93:

131101; Miki et al., 2009, Appl. Phys. Express, 2: 075002; Schuck et al., Sci. Rep. 3: 1893). Travelling wave detectors achieve high detection efficiency for telecom wavelength photons (Pernice et al., 2012, Nat. Commun., 3: 1325; Hu et al., 2009, IEEE Trans. Appl. Supercond., 19: 336) despite reduced nanowire dimensions as compared to traditional meander-type SSPDs (Hadfield, 2009, Nat. Photonics, 3: 696; Gol'tsman et al, 2001, Appl. Phys. Lett., 79: 705). Operation in free-running mode allows for the diagnosis of more than 200 km of optical fiber. The observed OTDR trace shows no artificial features or dead zones.

Figure 15:
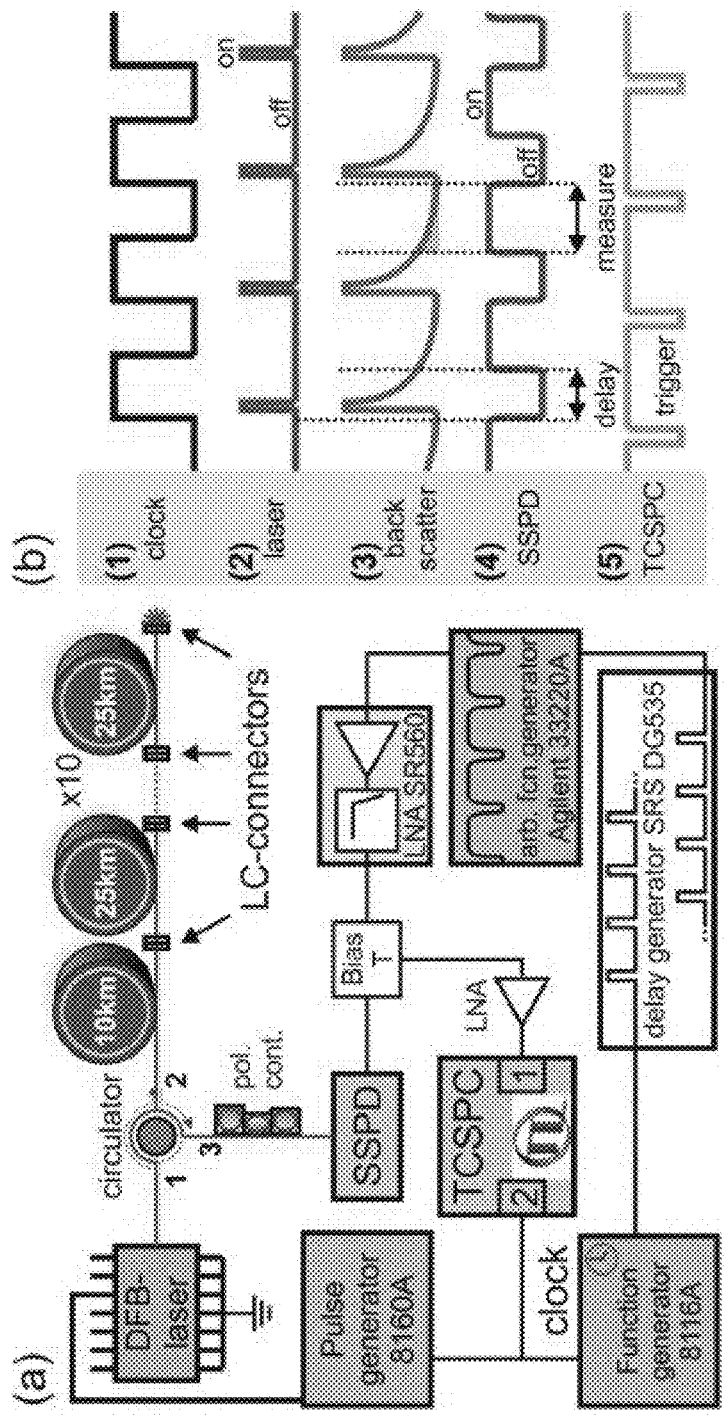
FIG. 15, comprising FIG. 15A and FIG. 15B, (a) OTDR setup. Pulses from a DFB Laser are launched into the FUT consisting of 11 spools of SMF-28 fiber. The signal reflected back from the FUT is coupled out with a circulator and detected with a low noise NbTiN nanowire SSPD. For investigation of particular FUT-sections, the bias current through the nanowire SSPD can be switched on and off. The corresponding time trace is programmed with an arbitrary function generator and the relative gating window with respect to the laser pulses is adjusted with a delay generator. The bias current is supplied from a battery powered low noise amplifier (LNA). The output pulses from the SSPD are amplified and fed into a time-correlated single-photon counting unit (TCSPC). (b) A reference clock (1) synchronizes the laser pulses (2), the backscattered signal (3), the SSPD gating (4), and the TCSPC data acquisition system (5).

The presently described photon-counting OTDR setup is shown in FIG. 15A. Laser pulses are launched into the FUT via ports 1→2 of a circulator which couples the backscattered photons out via ports 2→3 and guides them towards the NbTiN nanowire SSPD housed in a liquid helium cryostat. The FUT consists of one 10.6 km spool of bare SMF-28 fiber with FC/APC connectors followed by ten 25.3 km SMF-28 fiber spools with LC/PC-connectors. All fibers are connected in series with standard mating sleeves. To identify the last spool after 263 km of fiber in an OTDR measurement, the final LC-connector is left un-terminated to cause reflection at the glass-to-air interface (up to 4%).

For OTDR applications, it is desirable to have a laser source supplying short pulses of high power at a user-defined repetition rate. Given a detector of sufficient timing accuracy, the achievable two-point resolution is then determined by the laser pulse length. High laser power results in a larger number of photons scattered back towards the detector and thus reduces the data acquisition time needed to achieve a given OTDR measurement range. To unambiguously identify defects in the fiber, it is furthermore necessary to adjust the pulse repetition rate $R_{rep}$ to the total length of the FUT, $L_{tot}$. Overlapping echoes from two consecutive pulses are avoided when $R_{rep}^{-1} \leq 2L_{tot} c_f$, where $c_f$=4.9 ns/m is the propagation delay for telecom wavelength photons in a fiber. Here, customized pulses of width $\tau_p$=50 ns and adjustable repetition rate are generated from a DFB laser diode (SEI, SLT5413) supplying 10.5 mW of pulse peak power at 1550 nm wavelength. The repetition rate is set using a function generator (HP8116A) which acts as a clock to the whole OTDR system, i.e., laser, SSPD, and data acquisition system (see FIG. 15A and FIG. 15B). To maximize the OTDR measurement sensitivity, the clock rate is adjusted to 300 Hz, exceeding the corresponding 263 km length of the fiber-under-test such that photons reflected from the open fiber end are able to travel back to the circulator before the next pulse is launched. The laser pulse width and height are set with a pulse generator (HP8160A) in burst mode, which is triggered by the clock frequency. The output of the pulse generator is applied directly to the laser diode cathode, with the anode set to ground. Importantly, this allows for the ability to slightly reverse-bias the diode to switch it completely off in between pulses. Otherwise, any background light (even the diodes incoherent spontaneous emission below the lasing threshold) would severely compromise the measurement of the weak backscattered signal from the FUT.

The backscattered photons from the FUT are coupled out at circulator port 3 and guided to the travelling wave NbTiN superconducting nanowire single-photon detector inside the cryostat at 1.6 K. Coupling of light from the optical fiber into the on-chip photonic waveguide is achieved with an optical grating coupler. The SSPD is realized as an 8 nm thin, 75 nm wide U-shaped NbTiN-nanowire of 40 µm length on top of a 1 µm wide SiN photonic waveguide (Schuck et al., 2013, Appl. Phys. Lett., 102: 051101), see FIG. 16A. In this traveling wave geometry (Hu et al., 2009, IEEE Trans. Appl. Supercond., 19: 336), approximately 95% of all photons in the waveguide are absorbed by the NbTiN-nanowire (Schuck et al., 2013, Appl. Phys. Lett., 102: 051101), resulting in a detection efficiency of 53% at telecom wavelengths when biased close to the critical current of the wire (Schuck et al., Sci. Rep. 3: 1893). Accounting for the photon coupling loss from the fiber into the SiN waveguide, a maximal system detection efficiency of 4.3% is obtained. Importantly for OTDR measurements, SSPDs fabricated from NbTiN (rather than the more commonly used NbN) have been found to exhibit attractive low noise characteristics (Dorenbos et al., 2008, Appl. Phys. Lett., 93: 131101). For the NbTiN nanowire SSPD used here, a dark count rate of less than 10 Hz over the entire bias current range is found, mainly limited by stray light (Schuck et al., Sci. Rep. 3: 1893). The resulting system $NEP_{sys} \approx 10^{-17}$-$10^{-18}$ W/sqrt (Hz) close to the critical current is dependent on ambient light conditions, see FIG. 16B. For an OTDR measurement in daylight conditions, it is expected to operate rather at the upper end of the NEP-range (i.e., $10^{-17}$ W/sqrt(Hz)) since ambient light leaks into the bare fiber and is efficiently guided to the on-chip detector.

The SSPD could, in principle, be operated continuously in free running mode. However, it is found that the (residual) circulator transmission from port 1→3 is sufficient to cause a large number of detection events which exceed the weak backscattered signal by far. The light bypassing the FUT can cause a large amount of undesired detection events and even drive the SSPD into the normal state, where it is insensitive to photon absorption. Therefore, the bias current is reduced in synchronization with the clock frequency to switch the SSPD completely off for the short time when the laser pulses pass through the circulator. For the remaining time, the bias current is kept at approximately 95% of the critical current in free-running mode, thus detecting the OTDR signal trace of photons reflected back from anywhere within the FUT (traces (3) and (4) of FIG. 15B). The clock signal is derived from the same reference used to trigger the laser. A delay generator (SRS DG535) allows us to precisely switch off the detector with respect to the launch time of the laser pulse (see traces (1), (2), and (4) in FIG. 15B). The off period of the detector is set with an arbitrary function generator (Agilent 33220A) also triggered on the clock signal. The shape of the corresponding output pulses is designed to suppress transient oscillations of the bias current (which would exceed the nanowire critical current during the on-off switching). A battery powered low noise amplifier (SR560), which also acts as a low pass filter, supplies the bias current to the SSPD via a 100 kΩ resistor and a bias-T (ZFBT-4R2G+). Thus the SSPD is effectively reset at the clock frequency and it is able to be operated in free running mode for the rest of the clock cycle. Note that the main purpose of the gating is only to switch the detector off during the time when the laser pulse has not yet reached the FUT. In addition, this gating can also be used to investigate only particular sections of the FUT by adjusting the delay and on-time window.

The SSPD output is amplified with high-bandwidth low noise amplifiers and fed into a time correlated single-photon counting system (TCSPC, PicoHarp 300). This TCSPC unit is operated in time-tagged time-resolved (TTTR) mode recording all detection events with 4 ps resolution. While this suggests sub-centimeter precision, defect localization is ultimately limited by the timing accuracy of the counting system jitter of approximately 50 ps (Schuck et al., Sci. Rep. 3: 1893). To extract the temporal delay of each detection event with respect to the launch time of the laser pulses, the second channel of the TCSPC unit is used to record the pulses derived from the clock frequency (see FIG. 15B, traces (1) and (5)). List-files of all arrival times are then created for both channels from which the time delay Δt between photon detection events in channel 1 with respect to the clock signal recorded in channel 2 is calculated. This time delay translates to the distance $\Delta s=\Delta t/(2c_f)$ which the photon travels before being scattered or reflected back. Since the SSPD is operated in free running mode while a pulse is propagating in the FUT, the entire OTDR trace is reconstructed by calculating the waiting time distribution recorded with the TCSPC unit.

Figure 17:
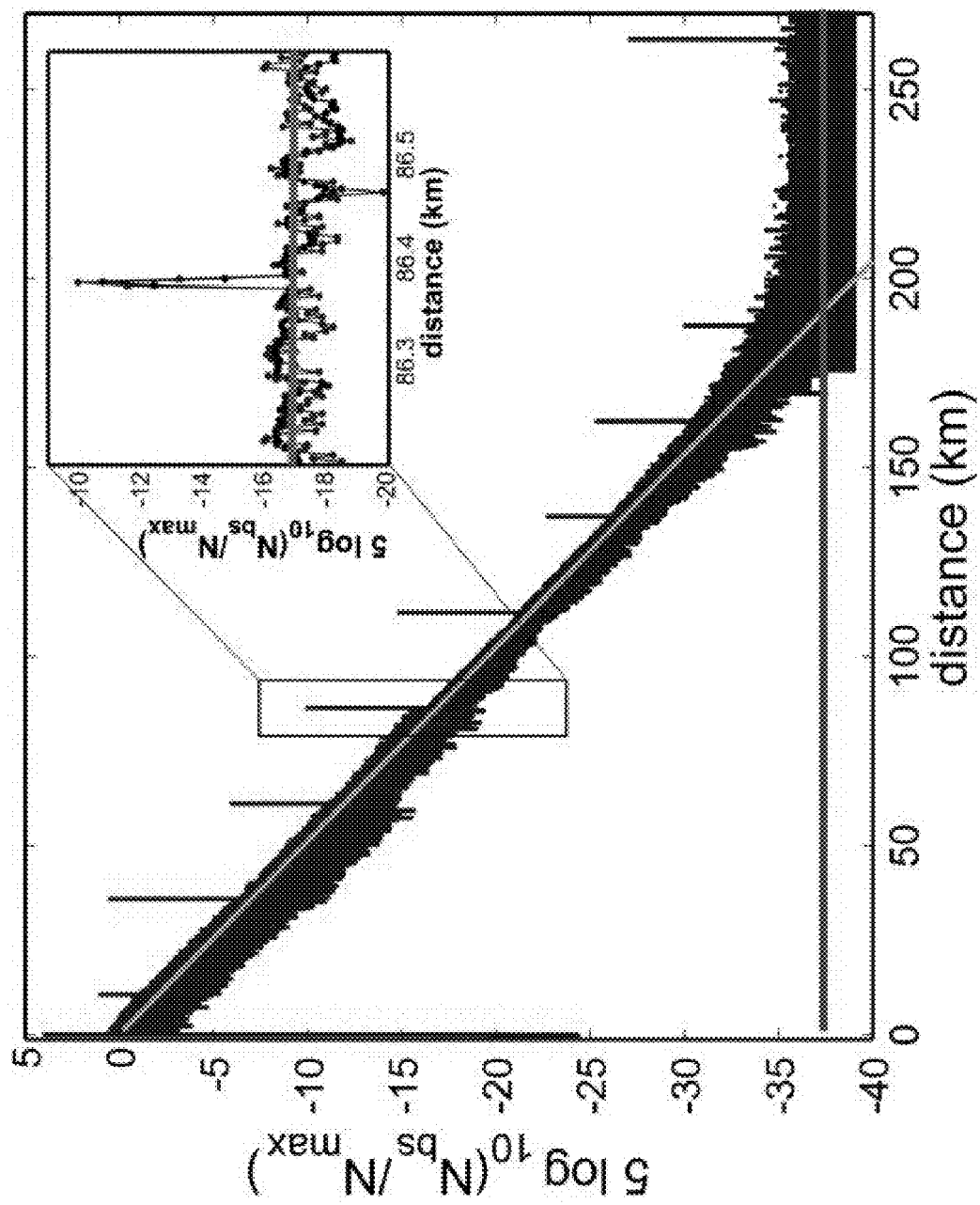
FIG. 17 depicts the OTDR traces of the backscattered photons ($N_{bs}$) measured using laser pulses of 50 ns width. Each peak is associated with the Fresnel reflection of the laser pulse from the connector pair of adjacent fiber spools. The reflection from the open fiber end after 263 km is strong enough to rise above the noise level. The inset shows the overlapping reflections from the connector at 86 km for the two measurements (0-120 km and 80-270 km). The rms noise level was calculated from the data at the tail of the OTDR trace (233-263 km). The measurement range extracted from the intersection of the slope with the rms noise level is 37.4 dB.

The resulting time trace of backscattered photons detected with the low-noise SSPD is shown in FIG. 17 as a function of fiber length. To reduce the total amount of generated data in the list-files, the trace is acquired in two steps. An OTDR measurement of the initial 0-120 km of fiber is first performed by adjusting the SSPD bias current and repetition rate accordingly. For the measurement of the remaining fiber stretch, the repetition rate was then set to cover all 263 km of fiber. In this case, the arbitrary function generator is programed to only switch the SSPD to the high bias current regime after photons from the first approximately 80 km have already passed. This allows the ability to increase the measurement sensitivity by averaging over longer times, omitting the vast amount of detection events originating from reflections in the initial part of the fiber which are already accounted for by the first (shorter) measurement. Both traces are then matched in the region where they overlap (86-111 km). Since they were acquired with respect to the same clock signal, the backscatter features nicely overlap as shown in the inset of FIG. 17 for a section at 86 km.

The OTDR trace exhibits a number of peaks caused by Fresnel reflections from the refractive index change at the tiny air gap between two fibers at each fiber connector. The first 10.6 km fiber spool followed by at least eight 25.3 km spools can be clearly identified by means of the reflection peaks before the noise level is reached, as shown in FIG. 17. The different peak heights can be attributed to the fact that some connectors are better mated than others. Despite the noise at the end of the measurement range, the strong reflection from the glass to air transition at the open fiber end after 263 km (eleven fiber spools) is still visible in the OTDR measurement. The OTDR data also allow for the extraction of the round-trip attenuation due to Rayleigh scattering in the fiber-under-test from the linear slope of the trace. The attenuation of each fiber spool can be obtained by fitting the slope of the corresponding part of the OTDR trace. As an example, in FIG. 17, the exponential fit to the data of the fifth spool (86-111 km) is shown for both measurements (0-120 km and 80-270 km) yielding an attenuation of 0.196 dB/km in either case. To extract the rms noise level observed as the tail of the OTDR trace in FIG. 17, the data in the 233-263 km region is used, where the contribution from backscattered photons is negligible. The dark count rate during the OTDR measurement can be estimated by integrating the absolute number of (dark) counts per second in the last 30 km of fiber and extrapolation to a full laser pulse cycle. A dark count rate of 3 Hz is thus obtained, corresponding to a NEP of approximately $8 \times 10^{-18}$ W/sqrt(Hz) at a bias current of 95% of the critical current, consistent with the independently determined NEP shown in FIG. 16B. From the intersection of the slope with the rms noise level at 191 km of fiber, the measurement range of the ν-OTDR system is then determined as 37.4 dB.

Figure 16:
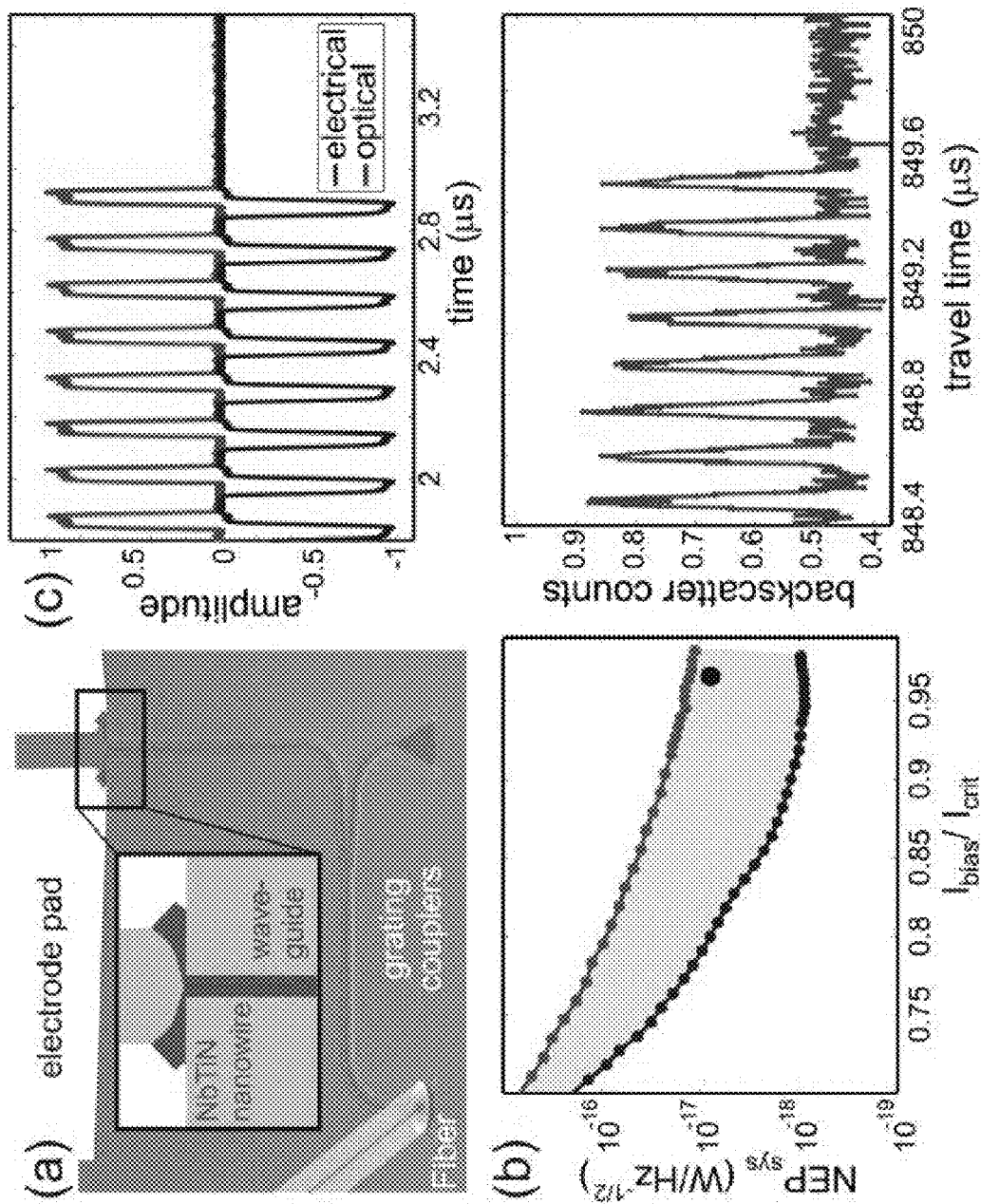
FIG. 16, comprising FIG. 16A through FIG. 16C depicts an exemplary device and functionality thereof

The data in FIG. 17 were acquired with laser pulses of 50 ns width, which sets the limit of the achievable two-point resolution to about 10 m. Since dispersion effects are negligible for such long pulses, it is observed that the width (50 ns) of the reflection peaks (see FIG. 17 inset, for example) does not change over the entire measurement range. A train of such 50 ns pulses with a period of 150 ns is shown in FIG. 16C. The counts were accumulated in 10 min and all pulses in the OTDR trace remain clearly discernible as they are derived from the pulse generator signal applied to the laser diode. No evidence of dead zones or other measurement artifacts (e.g., from afterpulses) commonly encountered in time-gated applications using APDs are found. In order to achieve higher resolution, shorter pulses are desirable since the detector timing jitter (50 ps) essentially permits localization of defects with down to 1 cm accuracy (Minaeva et al., 2012, Frontiers in Optics, Optical Society of America). The shortest optical pulses that could be generated from the DFB laser in the present setup were 15.4 ns long, corresponding to a two-point resolution of about 3 m in optical fiber. However, due to a reduced pulse amplitude in this regime the pulse duration was increased to 50 ns, where the maximum pulse power of 10.5 mW was reached. For the SMF-28 fiber used here (zero-dispersion length $\lambda_0=1313$ nm, typical zero dispersion slope $S_0=0.086$ ps/(nm$^2$·km)), a two-point resolution of ≤10 cm is achievable over 200 km length using 100 ps pulses with the low jitter SSPD.

Photon-counting OTDR is demonstrated herein with superconducting nanowire single photons over a measurement range of more than 200 km in telecom optical fiber. OTDR data are acquired with high resolution by operating the SSPD in free-running mode during pulse propagation in the fiber-under-test. The increased OTDR measurement range as compared to conventional (Eraerds et al., 2010, Lightwave Technol., 28: 952) as well as many other photon-counting OTDR implementations (Wegmuller et al., 2004, Lightwave Technol., 22: 390; Diamanti et al., 2006, Opt. Lett., 31: 727; Legré et al., 2007, Opt. Express, 15: 8237; Hu et al., 2012, Lightwave Technol., 30: 2583; Fujiwara et al., 2010, Opt. Express, 18: 22199) is a consequence of the low noise equivalent power of the NbTiN-nanowire SSPD. Note that the SSPD used here features high detection efficiency for photons traveling in on-chip photonic waveguides. However, the system detection efficiency is reduced by the fiber-to-waveguide coupling loss which could, for example, be improved with somewhat more involved grating coupler designs or inverted tapers (Taillaert et al., 2004, Opt. Lett., 29: 2749). Higher coupling efficiency then directly translates to a lower NEP and in turn increased dynamic range of the OTDR system. The spatial resolution of 10 m (3 m over shorter distance) for the OTDR system was only limited by the pulse width of 50 ns (15 ns) achievable for the laser used here. Due to the high timing accuracy (50 ps) of the SSPDs (Schuck et al., Sci. Rep. 3: 1893), it is anticipated that defects in a fiber can be localized with ≤10 cm precision when using laser systems with sub-nanosecond pulse duration. The full potential of the low-noise nanowire SSPD for OTDR applications can also be assessed by combining detection efficiency η, dark count rate D, and timing jitter Δt, into one figure of merit $H=\eta/(D \cdot \Delta t)=2.9 \times 10^8$, which compares favorably with other detector technologies (Hadfield, 2009, Nat. Photonics, 3: 696). While the SSPD is operated in a liquid helium cryogenic system, which is not always a viable choice in OTDR measurements, closed cycle refrigerators offer an attractive alternative for operating SSPDs in a more rugged environment (Natarajan et al., 2012, Supercond. Sci. Technol. 25: 063001). The combination of low noise equivalent power and high timing resolution thus makes SSPDs a promising choice for fulfilling the requirements of next generation OTDR applications.

Example 5

Atomic Layer Deposition Process to Make Thin SSPD Nanowires

Described herein is the evaluation of the atomic layer deposition (ALD) for the deposition of superconducting material for the production of nanowires of the SSPD.

It has been previously shown that rf magnetron sputtering on (100) MgO single-crystal substrates can produce deposited NbN with a critical temperature ($T_c$) of 16.0K (Wang et al., 1996, J Appl Phys, 79: 7837). Experiments were conducted to use magnetron sputtering to deposit NbN or NbTiN onto various substrates. It was found that magnetron sputtering on 110 nm silicon-on-insulator wafers produces deposited NbN with a Tc of 10.5K. Further, magnetron sputtering on SiN produced a 100 nm layer of deposited NbTiN with a Tc of 12K and an 8 nm layer with a Tc of 7.1K.

Atomic layer deposition is an alternative to physical vapor deposition and metal-organic chemical vapor deposition. It is used, for example, in DRAM manufacturing of high k-dielectrics and for pinhole-free diffusion barriers and nucleation layers. ALD has a low deposition rate which is good for SSPDs.

ALD has been used to deposit superconducting NbN thin films (Ziegler et al., 2013, Supercond. Sci. Technol. 26: 025008) on an Oxford OpALALD system with ICP source. It was demonstrated that a 40 nm NbN film was deposited on 25 nm Al2O3 on silicon, where the film had a Tc of 10.2K. The process comprise a 4 step cycle including 1) exposing to precursor (TBTDEN) producing a saturated monolayer; 2) performing an Ar-purge to remove residual TBTDEN; 3) using remote H plasma to reduce precursor monolayer to NbN monolayer; and 4) performing a subsequent Ar-purge. One NbN monolayer is deposited per cycle, each layer having a thickness of about 0.064 nm. The 40 nm NbN layer was deposited in 18 hours. The parameters critical to this process include the plasma pressure and exposure time, which can effect resistivity, the deposition temperature, and oxygen (residual water) which can react with the precursor.

Experiments were conducted to investigate using ALD to deposit NbTiN. Deposition was conducted on a Cambridge Nanotech System in order to deposit a 4 nm, 8 nm, 20 nm and 100 nm layer on 330 nm SiN on oxide substrate. The process cycle comprised first a TiN precursor loop which included a TiN precursor pulse and N2 plasma. The next step was the NbN-loop, which included Nb precursor boost, Nb precursor pulse and N2 plasma. The NbN-loop was then repeated. Each cycle produced 2.23 Å of stoichiometric NbTiN. Table 3 lists the results of the deposited layers.

TABLE 3

| NbTiN atomic layer deposition | | |
|---|---|---|
| Thickness target | Thickness measured | Square resistance (Ohm) |
| 4 nm | 5.68 nm | 2464.6 |
| 8 nm | 7.8 nm | 521.8 |
| 20 nm | 18.46 nm | 180.6 |
| 100 nm | 98.94 nm | 27.08 |

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A device for the detection of single photons in the visible and infrared spectrum, the device comprising a buried waveguide layer in a substrate and a superconducting nanowire, wherein the substrate comprises a cavity exposing at least a portion of the buried waveguide layer, and wherein the superconducting nanowire is positioned atop the exposed portion of the buried waveguide layer.

2. The device of claim 1, wherein the waveguide layer is made of a material selected from the group of silicon nitride, aluminum nitride, gallium nitride, sapphire, diamond, silicon, gallium phosphide, silicon oxide, and magnesium oxide.

3. The device of claim 1, wherein the superconducting nanowire comprises two longitudinal segments running along the length of the waveguide and wherein the longitudinal segments are attached to each other at one end by a curved region, thereby forming a U-shaped nanowire.

4. The device of claim 1, wherein the nanowire has a thickness of about 0.5 nm to about 100 nm.

5. The device of claim 1, wherein the length of the nanowire is about 1 μm to about 200 μm.

6. The device of claim 3, wherein the width of at least one of the longitudinal segments is about 30 nm to about 100 nm.

7. The device of claim 1, wherein the substrate is a wafer comprising an insulator layer.

8. The device of claim 1, wherein the thickness of the waveguide layer is about 10 nm to about 5000 nm.

9. The device of claim 1, wherein the width of the waveguide layer is about 10 nm to about 5000 nm.

10. The device of claim 1, wherein the device comprises at least one grating coupler for coupling of an optical fiber to the device.

11. The device of claim 1, wherein the nanowire is connected to an electrode.

12. The device of claim 1, wherein the device is integrated within a photonic chip.

13. The device of claim 1, wherein the superconducting nanowire is composed of a material selected from the group of NbN, NbTiN, MgB2, High Tc cubrates including YBCO, and iron based superconductors.

14. A device for the detection of single photons in the visible and infrared spectrum, the device comprising:
a substrate layer having a cavity;
a silicon nitride layer atop the substrate layer and cavity;
a superconductor nanowire atop the silicon nitride layer, wherein the nanowire is positioned above the cavity;
an insulator layer atop the superconducting nanowire; and
a reflector layer atop the insulator layer.

15. The device of claim 14, wherein the superconducting nanowire is composed of a material selected from the group of NbN, NbTiN, MgB2, High Tc cubrates including YBCO, and iron based superconductors.

16. The device of claim 14, wherein the cavity comprises a geometry such that an optical fiber self-aligns to the superconducting nanowire when inserted into the cavity such that light from the optical fiber passes through the silicon nitride layer and to the superconducting nanowire.

17. A system for the detection of single photons in the visible and infrared spectrum comprising:
- at least one device for detecting a photon, the at least one device comprising a buried waveguide layer in a substrate and a superconducting nanowire, wherein the substrate comprises a cavity exposing at least a portion of the buried waveguide layer, and wherein the superconducting nanowire is positioned atop the exposed portion of the buried waveguide layer;
- at least one optical fiber optically coupled to a waveguide of the at least one device; and
- a tool for measuring the output of the superconducting nanowire of the at least one device.

18. The system of claim 17, wherein the waveguide layer is made of a material selected from the group of silicon nitride, aluminum nitride, gallium nitride, sapphire, diamond, silicon, gallium phosphide, silicon oxide, and magnesium oxide.

19. The system of claim 17, wherein the superconducting nanowire is made of a material selected from the group of NbN, NbTiN, MgB2, High Tc cubrates including YBCO, and iron based superconductors.

20. The system of claim 17, wherein the superconducting nanowire comprises two longitudinal segments running along the length of the waveguide and wherein the longitudinal segments are attached to each other at one end by a curved region, thereby forming a U-shaped nanowire.

21. The system of claim 17, wherein the nanowire is connected to an electrode.

22. The system of claim 17, wherein the at least one device is integrated within a photonic chip.

23. The system of claim 17, wherein the system comprises an external current source for delivering a bias current to the superconducting nanowire.

24. The system of claim 17, wherein the system comprises an RF-probe for detecting the output of the nanowire.

25. The system of claim 17, where the at least one device is housed within a cryostat.

26. A device for the detection of single photons in the visible and infrared spectrum, the device comprising a buried waveguide layer in a substrate, a superconducting nanowire, and a surface waveguide layer evanescently coupled to the buried waveguide layer, wherein the superconducting nanowire is positioned atop the surface waveguide layer.

* * * * *